United States Patent [19]

Ort et al.

[11] Patent Number: 5,659,626
[45] Date of Patent: Aug. 19, 1997

[54] FINGERPRINT IDENTIFICATION SYSTEM

[75] Inventors: James R. Ort, Kenmore; Douglas L. Lange, Snyder; Frederick W. Kiefer, Williamsville; Raymond J. Dennison, West Seneca, all of N.Y.

[73] Assignee: Calspan Corporation, Buffalo, N.Y.

[21] Appl. No.: 326,757

[22] Filed: Oct. 20, 1994

[51] Int. Cl.$^6$ ........................................... G06K 9/00
[52] U.S. Cl. ................................... 382/125; 382/260
[58] Field of Search ........................... 382/124, 125, 382/203, 204, 260, 266, 286

[56] References Cited

U.S. PATENT DOCUMENTS

| | | | |
|---|---|---|---|
| D. 303,251 | 9/1989 | Morishita et al. | D14/107 |
| 3,419,287 | 12/1968 | Rudie | 382/125 |
| 3,564,266 | 2/1971 | Klotz, Jr. | 377/19 |
| 3,893,080 | 7/1975 | Ho et al. | 382/125 |
| 3,928,842 | 12/1975 | Green et al. | 382/124 |
| 4,015,240 | 3/1977 | Swonger et al. | 382/125 |
| 4,047,154 | 9/1977 | Vitols et al. | 382/125 |
| 4,083,035 | 4/1978 | Riganati et al. | 382/125 |
| 4,135,147 | 1/1979 | Riganati et al. | 382/125 |
| 4,151,512 | 4/1979 | Riganati et al. | 382/125 |
| 4,185,270 | 1/1980 | Fischer, II et al. | 382/125 |
| 4,208,651 | 6/1980 | McMahon | 382/125 |
| 4,229,023 | 10/1980 | Luz | 283/77 |
| 4,310,827 | 1/1982 | Asai | 382/125 |
| 4,325,570 | 4/1982 | Estrada | 283/69 |
| 4,607,384 | 8/1986 | Brooks | 382/124 |
| 4,646,352 | 2/1987 | Asai et al. | 382/125 |
| 4,685,145 | 8/1987 | Schiller | 382/272 |
| 4,747,147 | 5/1988 | Sparrow | 382/125 |
| 4,752,966 | 6/1988 | Schiller | 382/125 |
| 4,785,171 | 11/1988 | Dowling, Jr. et al. | 382/124 |
| 4,790,564 | 12/1988 | Larcher et al. | 382/125 |
| 4,817,183 | 3/1989 | Sparrow | 382/125 |
| 4,872,203 | 10/1989 | Asai et al. | 382/124 |
| 4,876,726 | 10/1989 | Capello et al. | 382/124 |

(List continued on next page.)

FOREIGN PATENT DOCUMENTS 1181176 1/1985 Canada.

OTHER PUBLICATIONS

Direct Estimation and Error Analysis for Oriented Patterns—Image Understanding, vol. 58, No. 3 Nov. pp. 383–398, 1993, Shu et al.

Fingerprint Pattern Classification—Pattern Recognition vol. 17, No. 3 pp. 295–303, 1984 (Great Britain), Kawagoe et al.

*Primary Examiner*—Leo Boudreau
*Assistant Examiner*—Phuoc Tran
*Attorney, Agent, or Firm*—E. Paul Forgrave

[57] ABSTRACT

A method for locating minutia in a gray scale image of a fingerprint using a pair of filters, called "Gabor" and "Minutia" filters, includes determining direction and spacing of ridges at regularly spaced pixels, aligning filters by ridge direction, determining outputs of filters where Gabor Filter has high level output when in parallel ridge flow and, due to phase discontinuity at a minutia, low level output when in neighborhood of a minutia. The Minutia filter exhibits opposite phenomenon, having low level output in parallel ridge flow and high output in neighborhood of a minutia. A method for creating a state map of a fingerprint includes determining image quality, identifying minutia locations, determining areas of good quality where minutia are present, areas of good quality where no minutia are present and areas where quality is below a predetermined value to reliably determine presence or absence of minutia. A method for determining location of, associating, and determining number of ridges between cores and deltas in digitized gray scale of a fingerprint image by Direct Estimation of Orientated Patterns includes determining ridge angle and frequency at regularly spaced pixels, computing gradients of ridge angles, ordering gradient according to size, creating vector field of image, measuring curling of vector field, locating cores and deltas, tracing path of constant value ridge angle between deltas and cores, calculating line integral of vector frequency along straight line from delta to core.

15 Claims, 34 Drawing Sheets

Microfiche Appendix Included
(1 Microfiche, 69 Pages)

U.S. PATENT DOCUMENTS

| | | | |
|---|---|---|---|
| 4,905,293 | 2/1990 | Asai et al. | 382/126 |
| 4,944,021 | 7/1990 | Hoshino et al. | 382/125 |
| 4,947,442 | 8/1990 | Tanaka et al. | 382/125 |
| 5,040,223 | 8/1991 | Kamiya et al. | 382/127 |
| 5,040,224 | 8/1991 | Harn | 382/124 |
| 5,050,220 | 9/1991 | Marsh et al. | 382/124 |
| 5,109,428 | 4/1992 | Igaki et al. | 382/125 |
| 5,140,642 | 8/1992 | Hsu et al. | 382/124 |
| 5,177,792 | 1/1993 | Morita | 382/125 |
| 5,187,747 | 2/1993 | Capello et al. | 382/124 |
| 5,420,937 | 5/1995 | Davis | 382/125 | f 0002988

Enlarged Ridge Flow

Enlarged Ridge Flow With Minutiae

Spatial Impulse Response of Gabor Filter

Spectral Impulse Response of Gabor Filter

Spatial Impulse Response of Minutia Filter filter cross section (at center)

EXTRACT MINUTIAE LIST – STEP 1

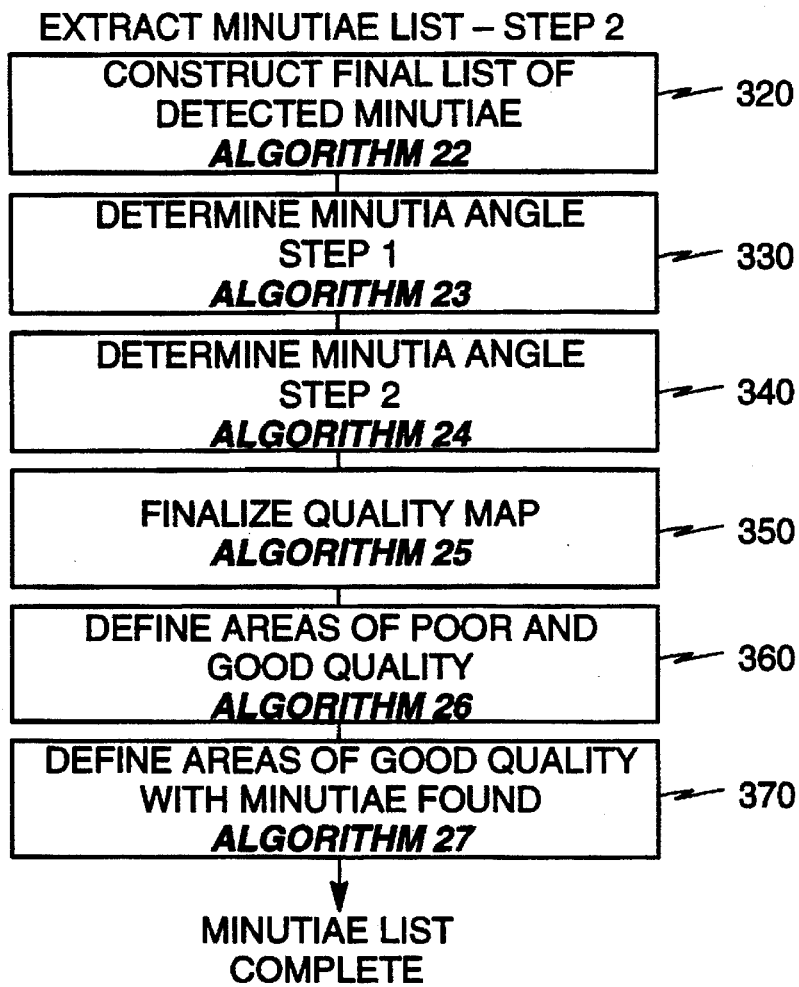
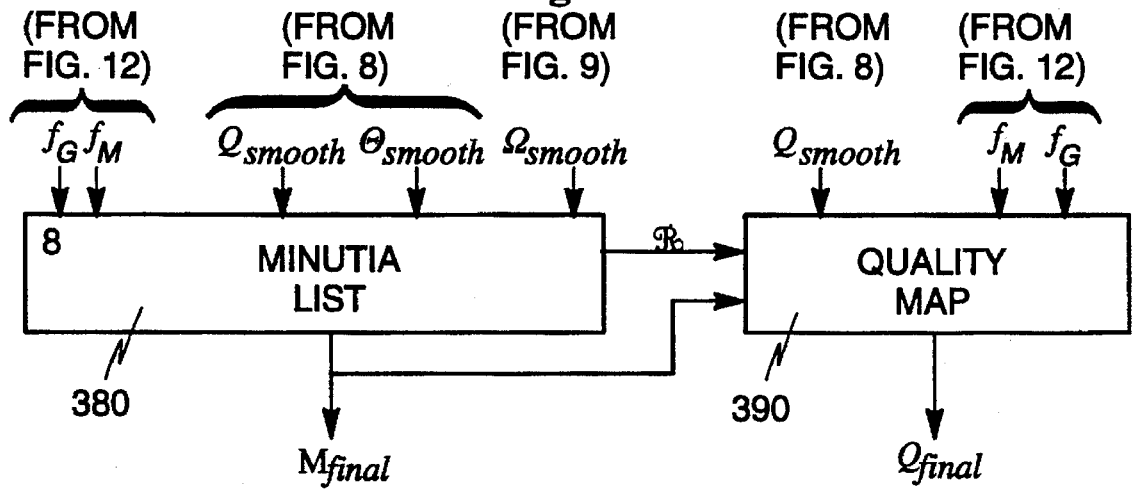

| KEY | |
|---|---|
| ✓ – | NEW ENTRY |
| X – | EXISTING ENTRY |

| IDX | X POS | Y POS | TYPE | CONFIDENCE | CONDITION | DIVERGENCE | CURL | GRADIENT | QUALITY | ASSOCIATED FEATURES ASSOC_ 1 2 3 4 5 | RDGCNT_ 1 2 3 4 5 | PIXCNT_ 1 2 3 4 5 | N_ASSOC |
|---|---|---|---|---|---|---|---|---|---|---|---|---|---|
| 1 | ✓ | ✓ | | | | | | ✓ | ✓ | | | | |
| 2 | ✓ | ✓ | | | | | | ✓ | ✓ | | | | |
| ... | ... | ... | | | | | | ... | ... | | | | |
| $n_{feat}$ | ✓ | ✓ | | | | | | ✓ | ✓ | | | | |

$\Delta_{feat}$ State

Matrix Entries End Of Step 1

| 1 | X | X | ✓ | ✓ | ✓ | ✓ | ✓ | X | X | | | | |
| 2 | X | X | ✓ | ✓ | ✓ | ✓ | ✓ | X | X | | | | |
| ... | ... | ... | ... | ... | ... | ... | ... | ... | ... | | | | |
| $n_{CD}$ | X | X | ✓ | ✓ | ✓ | ✓ | ✓ | X | X | | | | |

$\Delta_{CD}$ State

Matrix Entries End Of Step 2

| 1 | X | X | X | X | X | X | X | X | X | ✓ | ✓✓ | ✓✓ | ✓ (2) |
| 2 | X | X | X | X | X | X | X | X | X | ✓ | ✓ | ✓ | ✓ (1) |
| 3 | X | X | X | X | X | X | X | X | X | | | | ✓ (0) |
| 4 | X | X | X | X | X | X | X | X | X | ✓✓ | ✓✓ | ✓✓ | ✓ (2) |
| 5 | X | X | X | X | X | X | X | X | X | ✓✓✓ | ✓✓✓ | ✓✓✓ | ✓ (3) |
| 6 | X | X | X | X | X | X | X | X | X | ✓ | ✓ | ✓ | ✓ (1) |

$\Delta_{final}$ State

Up To 3 Cores (rows 1-3)

Up To 3 Deltas (rows 4-6)

Matrix Entries End Of Step 3

# FINGERPRINT IDENTIFICATION SYSTEM

MICROFICHE APPENDIX

A microfiche appendix containing computer program listings is provided with this application and includes one microfiche card of 69 frames.

BACKGROUND OF THE INVENTION

This invention relates to an improved fingerprint identification system. Fingerprints are routinely used to identify individuals of unknown or uncertain identity, or to verify the identify of a person. A primary application is in law enforcement, and secondary applications are in security, credit, and entitlement program management.

An individual's fingerprints are unique and have been used to learn the identification of an individual by comparison searching through a fingerprint database that contains the name of the possessor of the fingerprints or by comparing a current fingerprint of claimed person to a fingerprint the person filed on record when earlier establishing his or her identity. Standard file image formats have been adopted for recording the 10 finger fingerprint images. The inked impression cards used for recording contain additional textual information specific to the individual, generally information such as: sex, race, height, weight, hair color, eye color, name, and alias names.

Prior art systems for fingerprint identification have included techniques for beating key features of a fingerprint, such as minutiae, which are features defined by bifurcations or endings of ridge flows in an image of the fingerprint, and for locating and identifying other features, such as cores and deltas, in order to classify fingerprints into class types of whorls, loops, arches, tented arches. It is important that few key features be missed and few false features be recorded. Prior art systems, however, have not provided a complete or reliable extraction of important fingerprint features.

There are generally two types of comparison searching. The first search compares a ten-print card to a file of ten-print cards. For ten-print to ten-print comparisons, the particular finger number is known for each fingerprint image; the rolled inked impression images are, in the norm, complete; the orientation of the fingers is known; and the quality of the images is normally good. This is, of coarse the result of imposing a standard format and a known process for registering the inked impressions of the fingerprints on the ten-print cards.

The second search technique is a latent print (or mark) to ten-print cards. A latent print is a fingerprint obtained in the field from the scene of a crime. A latent print image is lifted from some arbitrary surface through a variety of techniques. In contrast with ten-print cards, latent prints are generally partial prints; the finger number is generally not known with certainty; they are of poorer image quality; their orientation is often not known; and there may be only a single fingerprint available for searching.

Sometimes, a third type of search, latent-to-latent, is made when trying to determine if the same unknown person was present at two or more scene of crime locations.

Fingerprint images today are available on ten-print cards, which are digitized and stored electronic computer records. They can be received in digital electronic form via radio or wire links from external sources and remote terminals. Real-time or livescan devices obtain fingerprints by means of an optical or ultrasonic scanner that reads a fingerprint directly off of the finger. The real time sharing of information and cross searching across distributed network fingerprint databases is the current direction for fingerprint identification systems operation.

When a fingerprint database becomes large, it becomes unmanageable to use human experts to perform the searching operation, therefore the need for automated systems. Automated systems, which have been in operation for over 20 years, examine the images and extract and store the features that describe the fingerprint; they also store any supporting alphanumeric textual information appearing on ten-print cards or with the latents, the textual data is that which would be of benefit in performing comparisons.

A typical automated fingerprint identification system includes a set of repository fingerprint cards 10 (FIG. 1) which represent an existing database of ten-print cards kept by the FBI, other law enforcement agency, or private security, credit, entitlement or other organization. These cards contain the fingerprints of known individuals, along with other pertinent information. Card 12 represents a single ten-print card of a candidate whose fingerprints are to be compared with those in the existing database 10 and latent print 14 represents a single fingerprint of an unknown individual. The candidate and latent prints are also called search prints.

An optical Scanner 20 scans the image of each fingerprint on cards 10 and 12 and latent print 14 to provide a digitized version of the gray scale image of each fingerprint. The digitized fingerprint gray scale images from Scanner 20 may be stored in storage device 25 or sent directly to an Encoder 30. The Encoder 30 extracts certain useful information from the gray scale image, such as the location of fingerprint features of cores, deltas, and minutiae. The Encoder 30 provides certain information to a Classifier 40, which in turn determines the pattern class of each fingerprint. Some automated systems may leave the more difficult and critical operations, such as classification, to manual (operator) means or operator assisted means.

A Products File 50 stores several items of feature information in digital format regarding each fingerprint. While illustrated in FIG. 1 and described herein as a card file, the Products File 50 is typically a digitized computer database. For each fingerprint, the Products File typically stores the pattern class determined by the Classifier, and the core, delta, and minutia information determined by the Encoder 30. A manual input device 55 is also provided to enter pattern class, if necessary, along with any known textual data describing the individual whose fingerprints are recorded. A candidate Products File 60 may be created from either a Search Candidate's print card 12 or a copy of his/her latent print(s) 14.

When conducting a search comparison, the feature information of the Search Candidate is hierarchically and sequentially compared with the textual and feature record for each known individual whose fingerprints reside in the repository for the Products File database.

The components of the system used in searching are depicted in FIG. 2, where the selection and matching of one or more of a candidate's fingerprints, as contained in a candidate's Products File will be described. Information from the repository Products File 50 is made available to a Search Filter 70. This filter limits the number of repository fingerprints to be compared based on textual data and the pattern class of the Search Candidate's fingerprints, and sometimes on additional fine grain classification data. The fingerprints of selected file repository candidates fingerprints from the Search Filter 70 are then compared with the Search Candidate's fingerprints in the Matcher component 80, and finally, the best match is found in selection stage 90.

The search always seeks to find that one to one correspondence of fingerprint features that would provide strong assurance that the search prints and file prints belong to the same individual. The systems typically score the results of the comparisons and produce a rank ordered list of a fixed number of list positions (typically 4 to 10). It is then up to a trained fingerprint examiner to examine the set of search prints in comparison to file sets of prints for the list named File Candidates with highest scores. The examiner must determine whether there is indeed a match to one of the File Candidates appearing on the list.

The sequence of search typically proceeds in a down selection process, first eliminating those File Candidates whose personal descriptions are dissimilar, then those with differing classification, and finally those with differing subordinate classifications. The filter down selection processor narrows the list of File Candidates to successively smaller and smaller lists (that is, fewer candidates).

The Matcher component 80 of the system performs the final comparative analysis between search print and each file print. It matches minutiae between search print and file print. Matching minutiae is performed through mathematical calculation that evaluates and scores how closely minutiae in the search print are to having the same spatial and angular positioning as the candidate file print being considered. The evaluative process typically proceeds first to align the two prints, then attempts to find correspondence by pairing minutiae in the search fingerprint with what appears to be its most probable counterparts in the file fingerprint, and then proceeds to calculate and evaluate spatial and angular differences. The comparative process is complete when matching comparisons between Search Candidate prints and all candidate file prints have been made and a score for each file print comparison is available. The scores are then evaluated and those with scores that definitely indicate large dissimilarity in minutiae pattern are eliminated from the list. The remainder of the list contains File Candidates with similar and closely matching minutiae patterns. The higher the score the more that the Search Candidate's fingerprints closely match the File Candidate's fingerprints and the greater probability that the Search Candidate is the same as the File Candidate person on record in the repository file database. The list is rank ordered and the top scoring "n" number of candidates presented to the operator; the number "n" typically being set at the system operator's discretion.

For ten-print to ten-print searches, the operator also typically has the option to select the number of fingers to be compared (1 to 10) and to designate the specific fingers to be used in the comparative searches. Use of more fingers provides a more discriminating selection (greater selectivity) but entails considerably more time in performing minutiae matching. For latent to ten-print searches, the operator's options are greater, as it frequently is not known exactly which numbered finger the latent print is from. Hence the latent print must be searched across multiple fingers of each file ten-print record.

A coarse level of fingerprint identification is available by examining macro fingerprint features, namely cores and deltas. Core and delta placements give rise to higher level descriptors that characterize similarity. Pattern type descriptors are defined by the Henry system and the FBI's National Crime Information Center system. The loop, whorl, and arch are examples. A series of second level descriptors are used to further associate similar fingerprints into like groupings. For example, for whorls, a second level descriptor indicates whether the ridge contour just below the left delta is inside, outside, or meets the right delta.

These coarse level descriptors are stored away for each file print and are used as sort discriminates by applying various techniques such as ordered list sorting, storage binning, and retrieval access methods. These techniques aid and provide for efficiency of process in the early stages of down selection. Since the comparative discriminates are macro level features, there still remains a large number of File Candidates that posses equivalent descriptions of their characteristics, and hence must be passed on to a Minutiae Matcher for calculating comparisons to be performed.

If other pre-measured macro feature characteristics could be used in the sorting process along with the macro features, the list could be further limited before passing on to the Minutiae Matcher component. There are such features, but prior art automatic systems have not been able to effectively employ them, primarily for two reasons: prior art systems do not reliably find or accurately identify the x,y location of macro features, and they do not have processes that provide for routinely extracting ridge count measurements between macro features.

Prior art matchers try to superimpose two sets of minutiae points in order to count the number of minutiae which are in common to the two fingerprints. Some typical prior art matchers are the M19, M27, M32, M40, M41 and M82. They are described in the following publications: National Bureau of Standards (NBS) Technical Notes 538 and 878, and NBS Special Publication 500–89.

In the final analysis, the list of high scoring matches presented to the operator requires an expert examiner visually to compare the fingerprints of the Search Candidate to each of the listed close match File Candidates. This manual labor step and the number of fingerprint comparisons that the examiner must view places limits on the throughput, the turn around time of the system, and drives the life cycle cost of operation.

If an automatic system could be verified as highly reliable and as having the selectivity to always identify the exact matches, a final list could be limited to one, two or three, and the corresponding examiner workload reduced. The problem is that prior art systems are not highly reliable or selective, as commonly acknowledged and addressed in many patent applications in the area. They require uniform, high quality images to function reliably and consistently. As a result they do not handle latents very well, and they frequently have difficulty with the image variations that occur on ten-print card images.

Non ideal image quality as a result over inking, low contrast, scratches, and pencil marks cause prior art automatic encoders to produce false minutiae, fail to record real minutiae and macro features, and mis-locate real features. Additionally, acquired artifacts in the fingerprint itself, such as cuts, scrapes, abrasions, and scars, can cause the systems to similarly fail to reliably identify real features. A description of these shortcomings may be found described in prior U.S. Pat. Nos. 4,790,564, 4,047,154, 4,646,352, 4,015,240 and 5,040,224. In fact, there are some prior art patents that accept the automation shortcomings as insurmountable and describe systems designed with a human in the loop to perform the classification, feature checks, and other processes not reliably left to prior art automation. U.S. Pat. Nos. 4,047,154 and 4,607,384 are two such examples.

When false features are inserted, or existing features missed or improperly encoded, the workload for the Minutiae Matcher will be increased and the scoring discriminate peaks reduced as a result of noise and errors that add in along with the real score contributors. Consequently, reliability is down, the final list must contain more candidates to insure a real match is assured of making the list, and therefore the human examination workload increases. The shortcomings of the prior art systems are routinely compensated for by an examiner reviewing the automatic encoder results and manually removing false minutiae, entering information on missed features and minutiae, and correcting positional errors.

The larger the database of file prints becomes, the more impractical it becomes to rely on passing on automatic machine determinations to an operator for quality checks and corrections. The more examiners involved, the greater the differences of results and biases introduced will become.

Also, latent prints and their lower quality are frequently not trusted to an automated encoder at all, but rather are manually encoded. The requirement for a human workload element has significant negative impact in throughput, response time, and costs irrespective of which step in the process it is introduced. So much so that the subject of other patents has been to find methods of performing the minutiae pairings in the minutiae matching process to minimize the detuning of discrimination that comes from the presence of false minutiae and to introduce quality reference as an adjustment in scoring. See for example U.S. Pat. No. 4,790,564.

Prior art systems for fingerprint identification have included techniques for locating key features of a fingerprint such as minutiae, which are features defined by bifurcations or abrupt endings of ridge flows in an image of the fingerprint, and for locating and identifying other features, such as cores, deltas, loops, arches, tented arches and other visually discernible characteristics of the fingerprint. It is important that most key features be found and few false features be recorded. Prior art systems, however, have not provided a complete or reliable extraction of important fingerprint features.

The present database of fingerprints in the FBI archives includes approximately 30 million ten-print cards. In addition to an individual's actual fingerprints, these cards contain other information about that person, such as age, eye and hair color, height, race, sex, weight and the type of crime committed.

In a comprehensive system, one must not only compare a newly created or Search Candidate ten-print card to the repository database, but one must also be able to compare a single, perhaps latent, print with the database. This requirement makes it critical that each fingerprint's features be carefully and accurately extracted and properly classified in order to make search comparison and matching possible in the shortest amount of time.

In prior art systems, an image of each fingerprint is often converted from a gray scale image to a binarized (black and white) version before feature extraction is performed which can cause valuable information to be missed and false minutia to be produced. Further, such systems cannot distinguish poor quality images from those of good quality, resulting in less than optimum performance.

Accordingly, there is a need for an improved fingerprint identifying system which provides for the accurate identification of fingerprint features and for rapid comparison of a candidate's fingerprint with those fingerprints of individuals in the repository database.

SUMMARY OF THE INVENTION

This invention relates to an improved encoder for use with an automated fingerprint identification system. The encoder of this invention analyzes a gray scale image of a fingerprint to provide an accurate identification of minutiae, their locations, and directions; to provide a quality map, a Ridge Angle Map, and a Ridge Frequency Map of the image; to provide an identification of cores and deltas and their locations and a ridge count between associated cores and deltas; and to store this fingerprint information in a Products File.

Typically, there are several steps in creating and using an automatic fingerprint identification system. First, the images of sets of fingerprints for all individuals on record in an existing paper records or stored image records database are scanned to detect and locate characteristic features; then each fingerprint is classified according to type. This information is entered as a Products File for the particular individual into the repository database for future access and reference. For digital computer processing, the repository is typically a large scale magnetic disk storage device that allows random access. Each Products File for an individual maintains a reference pointer to the source document of gray scale fingerprint images. The gray scale images are referenced by the absolute authority, the human examiner, for confirmation of machine developed identifications resulting from searches of the Products File.

Day to day requests are received to query the repository database for the identity of an individual. The query includes an image copy of latent fingerprint(s) or set of ten fingerprints on a ten-print card. The supplied fingerprint images are scanned to provide digital image representation that the automatic fingerprint identification system can evaluate. An additional source of queries may originate with the currently available livescan devices that optically or ultrasonically scan the finger directly yielding a digital fingerprint image. Livescan devices can reside in remote locations, such as police squad cars, and transmit their queries and images via radio link. The digital fingerprint images (from Scanner, or livescan) are then transferred (or translated, as necessary) to the system's Advanced Encoder and Automatic Fingerprint Classifier to extract and classify the feature data that comprises a Products File. Finally, the Search Candidate's Products File is compared to the Products File of each individual in the repository database to determine whether the Search Candidate exists in the database, and if he/she does, to learn his/her identity.

The comparative search performs successive levels of elimination of candidates from the repository database. The down selection process starts with high level information specific to the individual such as sex, race, color of eyes, etc. (as known and recorded for ten print card records) and proceeds to further limiting of the File Candidates through comparison of recorded macro fingerprint descriptions called classifications. A second stage of comparative searching is employed for those File Candidates who remain after the Search Filter process is complete. They remain as being potentially the Search Candidate individual, because they have been determined to be similar to the Search Candidate on the basis of all the macro level comparisons.

The second stage of comparisons is Minutiae Matching. In essence, the pattern of minutiae from the file print is overlaid on top of the pattern of minutiae for the fingerprint of each File Candidate remaining. The overlay is mathematically evaluated to find when the two patterns match and the Search Candidate is a particular individual in the database. More than one fingerprint is used in the comparative evaluations. Processing more fingers to assure identification of sameness of fingerprints and individual decreases throughput and increases turnaround time.

If high levels of discrimination can be built into the identification system, then confidence can be had with using only a few fingers, at times one. All the speed up and lower life cycle cost benefits are available with high levels of discrimination, commonly referred to as selectivity. High selectivity comes from choosing a set of features and classifications that are fine grain in discriminating value, employing accurate and repeatable processes, employing processes that operate reliably on poor quality images and over a greater dynamic range of image quality, and employing search separation processes that function with high levels of discrimination.

In prior art systems, selectivity is inadequate for large systems. They typically get by for small file databases where ten's of thousands file card pulls are involved and the time is affordable for using four to eight fingers. The prior art is woefully and critically inadequate for ten print and latent searches (particularly latents) through national sized databases with their 10's of millions of entries. A major contributor to poor selectivity is that existing methods employed detect too many false minutiae, and their complicated post-processing algorithms cannot reliably filter them out. This softens the discrimination ability and over burdens the Minutiae Matcher with unnecessary and non-productive workload.

In the present invention, a unique encoder (referenced as Advanced Encoder) scans a gray scale image of both search and file fingerprints to extract certain discriminating features, such as ridge angle, ridge frequency, the location of the cores, deltas, ridges and minutiae. The Advanced Encoder applies algothrims in the class of Direct Estimation of Orientated Patterns and Digital Signal Processing to: extract fingerprint features, measure quality, and identify areas void of features.

The Digital Signal Processing technique exploits global and local spectral characteristics of fingerprints. At the same time that the Advanced Encoder is extracting feature data, it measures and records the quality of the information being extracted. The quality measurements made and accumulated for each fingerprint are utilized to improve overall performance of the system. The Advanced Encoder has been designed so that it accurately extracts features while achieving very low false alarm rates.

With the exception of the Quality Map identification, many of the features extracted by the Advanced Encoder are familiar ones in fingerprint science. These features are: minutiae (location and direction); Ridge Angle and Ridge Frequency Maps; cores and deltas. Introducing measurement of quality, detecting and recording non minutiae areas and applying the quality knowledge to mathematical operations and decision processes increases selectivity in the Minutia Matcher component of the system. Knowledge of non-minutiae areas is recognized and used by examiners but is not part of prior art automated systems operations.

In the present invention, minutiae are detected using a pair of matched filters. The filters are engineered so that when they encounter the spatial neighborhood of a minutia, the output of one of the filters grows large while the output of the other filter drops to zero. In areas away from minutiae, the filter outputs fluctuate about nominal values, which are indicative of the quality of the fingerprint image. The minutiae detection filters are orientated and scaled using local Ridge Angle and Ridge Frequency, which are computed from Direct Estimation of Orientated Patterns and Digital Signal Processing theory. Cores and Deltas are located by examining the gradient surface of the Ridge Angle Map.

Each fingerprint is then automatically classified by a unique classification component of the system that utilizes neural networks and fuzzy logic, and the resulting data is stored in a comprehensive record. The unique classifier has been named the Automatic Fingerprint Classifier (AFC). The AFC can ensure operating accuracy and is compatible with manual pattern level classification. The records of all fingerprints on file are available for immediate comparison with new (Search Candidate) fingerprints which undergo the scanning, minutiae detection, core and delta identification, and classification processes.

Knowing the quality of features is a tremendous aid to decision processes. Hence, a criterion enforced throughout the system embodiment is the measurement of quality for every feature extracted and classification made. Examples of quality measurements are: What is the confidence that a detected minutia is a real minutia? What percentage of the fingerprint was interpretable? How large was the largest non interpretable area? Was it large enough to change classification, if the information within it were known? These measurements have been of great value in tuning the algorithms. This attention to quality metrics produces three additional benefits: (1) highly reliable automatic classification; (2) an automated file organization that provides for selection of best quality print pairs to be selected and used in matching; and (3) ability to update quickly and conveniently the file repository (that is, an ability on an continuous basis to renew, refresh, and improve the quantity and quality of feature data characterizing fingerprints of individuals of record on file in the Products File database).

For search comparisons a Search Filter was designed that operates using alphanumeric ten-print card textual data (and any latent print textual data), macro features, classification typing, and fine grain classification features to quickly identify a reduced number list of File Candidates whose prints have the possibility of being a match to the search prints under consideration. The limited number of candidates from the file then have their fingerprints compared with the search prints via a unique Minutiae Matcher.

The Search Filter reduces the workload that is passed forward to the Minutiae Matcher, which is the most computationally intensive component. The Search Filter draws on a unique design feature of the structure of the repository's Products File database. A unique method employed to solve the problems of fingerprint Products File organization, we've named Dynamic Binning, which allows for the search filtering to be adaptive to the quality and quantity of feature data available between the search Products File and each individual repository Products File. It allows for automatic selection of the best fingerprint combination pairings between search and file prints to be identified, selected, and used in filtering and minutiae matching without going into a reexamining the fingerprint images. This design also provides for minimal overhead operations in file maintenance and allows for easy renewal of file print records when ones of better quality become available for an individual in the file, again without laborious, time consuming reexamination of the fingerprint images.

A two-stage Minutia Matcher exploits the products from the Advanced Encoder and can compare fingerprints over a wide range of print problems, such as distortion and poor quality, while still providing performance results with excellent selectivity and reliability. The two stage matcher is also designed such that the measures of each stage are orthogonal and hence a greater level of discrimination is available when decisions are formulated based on the results from both.

Because of the care given at each step of the identification process, only a limited number of prints are compared, and as a consequence, the speed of the identification process is significantly improved over prior art systems and the requirement for manual human assistance or intervention to insure quality and reliability of operation is significantly reduced.

The quality of an image can vary significantly over the fingerprint, but if properly measured on a pixel by pixel basis, the detection of key features of the print can be enhanced, and any areas of the image of low quality can be identified.

In the present invention, the image is examined to develop a pixel-by-pixel quality map to describe the quality of the image at all locations: Ridge Angle and Ridge Frequency Maps are generated on a pixel-by-pixel basis: dual matched filters and coincidence logic are employed to detect minutiae; cores and deltas are identified by computation of gradient maps; and the number of ridges between associated features is accurately counted.

Accordingly, it is an object of this invention to provide an improved Encoder which analyzes a gray scale image of a fingerprint to provide an accurate identification of minutiae, their locations, and directions; to provide a quality map of the image; to provide a Ridge Angle Map of the image; to provide a Ridge Frequency Map of the image; to provide identification of cores and deltas and their locations; to provide a ridge count between associated cores and deltas; and to store this fingerprint information in a Products File.

It is another object of this invention to provide a large measure of improvement over prior art automated fingerprint identification systems for improved selectivity and reliability. This in turn will provide for reduced human workload requirements, greater throughput, quicker response time, and lower life cycle cost investments.

Prior art systems utilize pixel-based manipulations and decision processes that are inherently heuristic, and hence open ended. Problems are fixed and improvements achieved as the problems occur because it is impossible to enumerate all the conditions beforehand. An objective is to provide a more robust and comprehensive system design where all the components from the Encoder, to Classifier, to Search Filtering, and finally to Minutiae Matcher function adaptively to achieve the best performance possible irrespective of print quality, finger number, print orientation, or limitations of available data from either the search print or the file print.

It is a further object of this invention to employ commonly established, recognized, and accepted classification characteristics so that the operation, intermediate products produced, and results obtained are understandable and familiar to the user community.

It is still a further object of this invention to provide an Encoder that effectively operates with poor quality images containing artifacts and having poor signal to noise conditions.

It is another object of this invention to measure and associate quality, with the image and those mathematical operations that detect features and those that make declarative decisions, such as delta or core determination. It is a related objective that the quality information be passed forward in the system so adaptive methods can be used along the process chain to extract the best possible performance from each element of the system. Having quality information stored for each fingerprint of the repository File Candidate, allows for an adaptive decision to be made during the conduct of comparing the Search Candidate to the File Candidates. The best quality fingers that the search and File Candidate have in common can be selected for performing minutiae matching.

It is a further object of this invention to establish dual hypothesis technique of matching for improved selectivity and reliability. Dual hypothesis matching, in addition to using minutiae matching for comparisons, utilizes non minutiae areas for matching comparisons. If an area of the search print is identified as having no minutiae within it, then if there is a possibility of a match, the corresponding area on the file print should also be devoid of minutiae; if it is not, the score is degraded.

It is another object of this invention to maintain and to use in feature extraction as much information as possible that is resident in the original gray scale image of each fingerprint. To accomplish this, image binarization as utilized by most prior art systems will not be employed. Instead algorithms will be applied which enhance the gray scale image but at the same time maintain image fidelity. Additionally the feature extraction algorithm is designed to operate with gray scale information input, not merely black and white image input data.

It is a further object of this invention to develop a capability to measure and to record ridge counts between paired features such as core-to-delta ridge counts, core-to-core ridge counts, and minutiae-to-minutiae ridge counts. Having ridge count data on core and delta pairings provides a fine grain classification feature that can be used in down selection filtering to reduce the File Candidate list and the workload passed on to the matcher component of the system.

The capability developed is applied for ridge counting between minutiae at the Matcher stage of operation. Ridge counting between minutiae is intentionally not performed in the Advanced Encoder, but deferred until matching operations. This provides a method of comparison not otherwise available with reliable function. At matching time those areas between Search Print and File Print which have in common good quality minutiae are used to perform minutia to minutia ridge counting on each print. The track that is developed between minutiae (proceeding from one to the next, and then to the next) forms what is called a minutiae constellation. A constellation is developed for each print (Search and File) and compared for being the same template pattern. Ridge counting and constellation mapping is performed dynamically. As a Search Print is sequentially compared against each candidate file print, the set of minutiae (constellation) used from the Search Print changes. The set of good quality areas available in common between search and file fingerprints determine the minutiae that will form constellations in each print. This promotes the use of as many high confidence comparison points as possible. The ridge counting between minutiae is done using Ridge Angle and Ridge Frequency at matching time as they were stored in the Products File.

It is a object of this invention to significantly reduce and comparatively eliminate the recording of false features.

It is an object of this invention to improve the detectability of image features, and to insure that the capability is maintained over a wide range of image quality.

It is a still further object of this invention to provide information to assist in reliable automatic classification of fingerprints, an improvement over prior art systems.

Other objects and advantages of the invention will be apparent from the following description, the accompanying drawings and the appended claims.

BRIEF DESCRIPTION OF THE DRAWINGS

FIG. 1 is a block diagram illustrating the major components involved in creating a digital representation of a fingerprint, while FIG. 2 is a block diagram illustrating the major components involved in comparison matching a Search Candidate fingerprint(s) to the fingerprints of individuals contained in files of a repository database;

FIG. 22 is a simplified block diagram showing a second group of elements and steps used for extracting minutiae;

FIG. 23 is a simplified block diagram of the procedures for generating a final list of minutiae with characteristic data and a final quality, or image state, map;

FIG. 32 is the fingerprint of FIG. 3 with ridge angle vectors overlaid thereon;

FIG. 38 is a chart showing a time sequence of the contents of a data structured matrix used to assemble data (characteristic and associated pair data) relative to detected Cores and Deltas, with a final process of down-select to a limited set of the highest confidence ones for saving to a Products File;

DESCRIPTION OF THE PREFERRED EMBODIMENT

Figure 1:
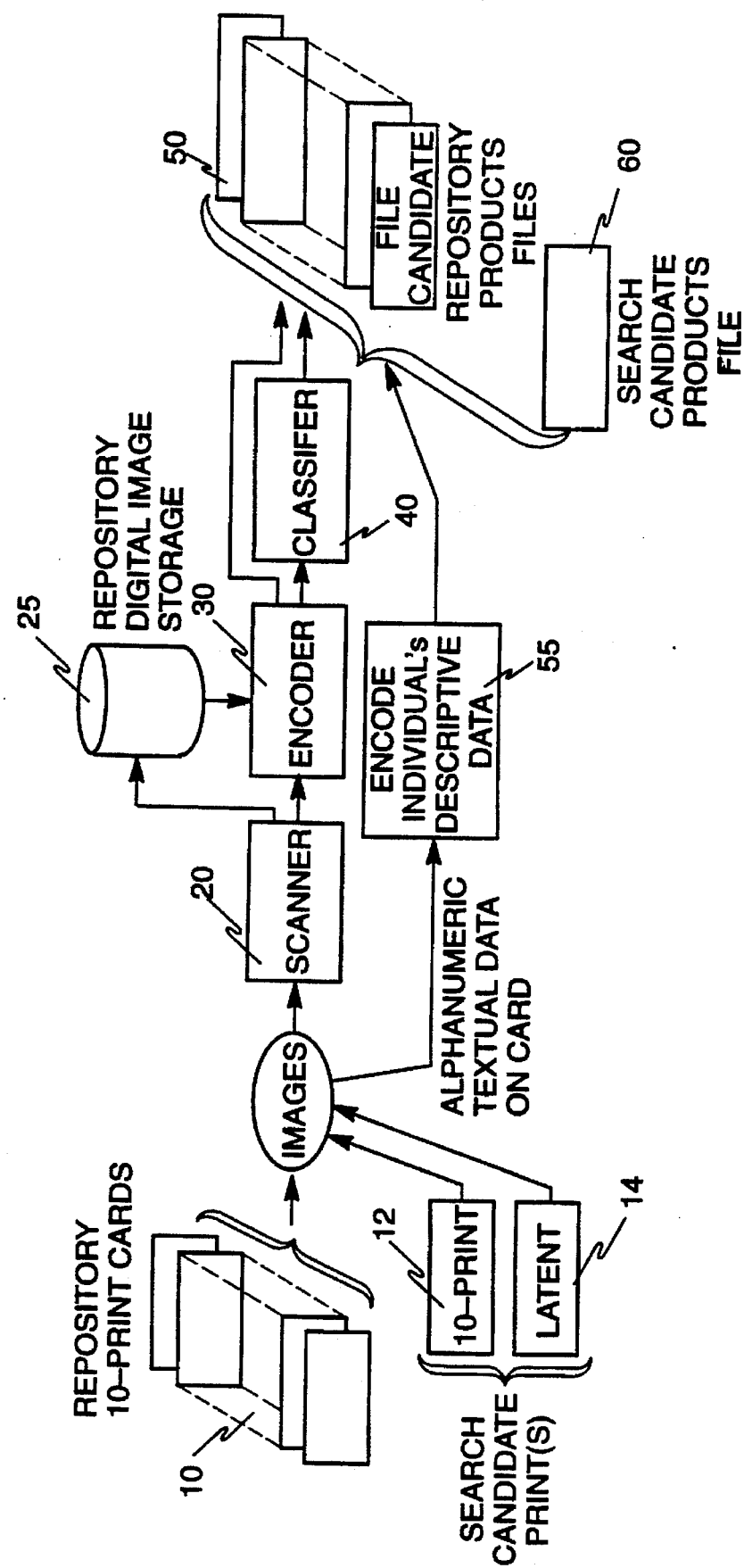
FIGS. 1 and 2 are block diagrams showing a typical fingerprint identification system.
Figure 2:
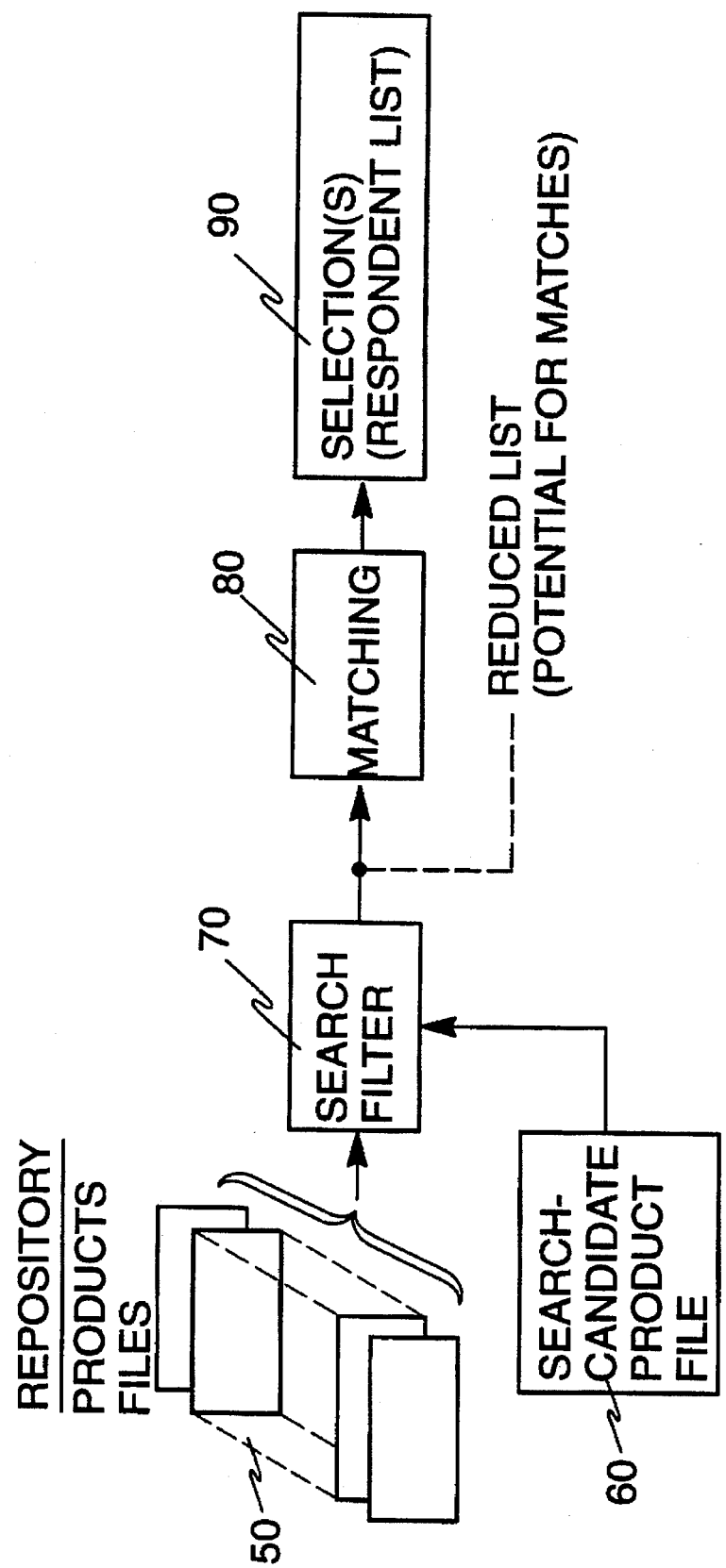

Reference is now made to the drawings, and particularly to FIGS. 1 and 2 which are block diagrams showing the fingerprint identification system of the present invention. In FIG. 1, repository fingerprint cards 10 represent the existing database of ten-print cards kept by the FBI, a law enforcement agency, or a private security organization. These cards contain the fingerprints of known individuals, along with other pertinent information. Card 12 represents a single ten-print card of a Search Candidate whose fingerprints are to be compared with the existing database 10. Likewise latent print 14 represents a single fingerprint or multiple fingerprints lifted from a scene of a crime or other area. Latents are from unidentified individuals. They can be of unknown finger number and are in general only partial prints.

Figure 3:
FIG. 3 is a gray scale image of a typical fingerprint derived from the optical Scanner shown in FIG. 1.

An image Scanner 20 scans the image of each of the 10 fingerprints on individual cards 10 and 12 and latent print(s) 14 to provide a digital version the gray scale image of each fingerprint. A typical fingerprint is shown in FIG. 3. One commercially available optical Scanner 20 is a Model T3-DGS-HR manufactured by Primagraphics. This Scanner has a resolution of 500 dots per inch and for the typical fingerprint card registration window of the range of 1.4" by 1.6" generates an image of the fingerprint area that is typically 750×800 pixels, with each pixel being represented as one of 256 levels of gray with zero representing black and 255 representing white.

The digitized fingerprint gray scale images from Scanner 20 may be stored in storage device 25 or sent directly to Encoder 30. The Encoder 30 extracts certain useful information from the gray scale image, such as the location of cores, deltas and minutia, as well as the quality of the gray scale images over the entire image. The Encoder 30 provides certain information, as will be explained, to a Classifier 40, which in turn determines the pattern class of each fingerprint.

In the preferred embodiment of this invention, a repository Products File 50 stores several items of feature information as a readable record in digital format regarding each fingerprint. Although illustrated in FIGS. 1 and 2 and described herein as a card file, the Products File 50 is typically a digitized computer database. For each fingerprint, the Products File stores several items of information including fingerprint data, such as pattern class generated by the Classifier 40, and the core, delta, minutia and quality information generated by the Encoder 30. A manual input device 55 or the Scanner 20 is used to also capture alphanumeric textual data (barcoded information also) that contains date, file control number, and individual descriptors, such as age, sex, race height, weight, hair color, and possibly data relating to the crime, in the case of latent prints.

A Search Candidate Products File 60 may be created from either a ten-print card 12 or a latent print 14. A full description of the Products Files 50 and 60 generated by the present invention is found in Table 1; its contents will be described later.

The selection and matching of one or more of a candidate's fingerprints, as contained in a candidate's Products File, will be briefly described in connection with FIG. 2. Information from the repository's Products Files 50 is made available to a Search Filter 70. This filter limits the number of File Candidates's Products Files to be compared based on the pattern class. The selected Products Files from the Search Filter 70 are used to compare fingerprints to those of the Search Candidate in the Minutiae Matcher component 80, and finally, the best match is found in selection stage 90.

In the present invention, attention will be given to the details of operation of the Encoder 30 and its input to the Products Files 50 and 60. The Encoder 30 includes the means to enhance the fingerprint image, to measure ridge angles, to measure ridge frequencies, to detect and locate minutiae, to measure and map fingerprint quality across the image, to detect and locate cores and deltas, and to count ridges between associated core and deltas. The various functions of the Encoder 30 are listed generally in Table 2.

ENHANCING THE FINGERPRINT IMAGE

The first step in the operation of Encoder 30 (step 1 in Table 2) is to enhance the fingerprint image. In general, gray scale images are not of uniform clarity or contrast across the image. There is also variability from image to image on a ten-print card, and from card to card, or latent to latent. This a result of the variability in taking of ten-print fingerprint rolled ink impressions or the variability in latent prints. A gray scale image could also have scratches, pencil, or pen marks as a result of lack of care in handling and processing. As will be explained, each fingerprint image will first be processed to produce the Enhanced Gray Scale Image shown in FIG. 4. Gray scale image enhancement improves overall performance results from the system processing elements that follow.

Figure 4:
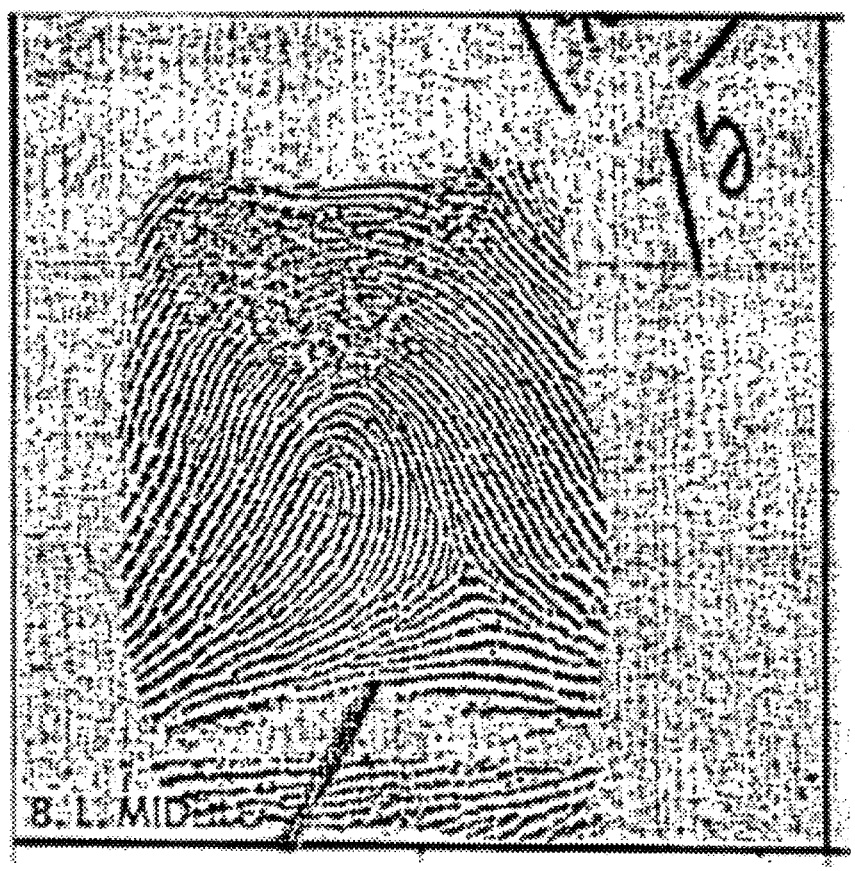
FIG. 4 is an enhanced gray scale version of the fingerprint shown in FIG. 3.
Figure 5:
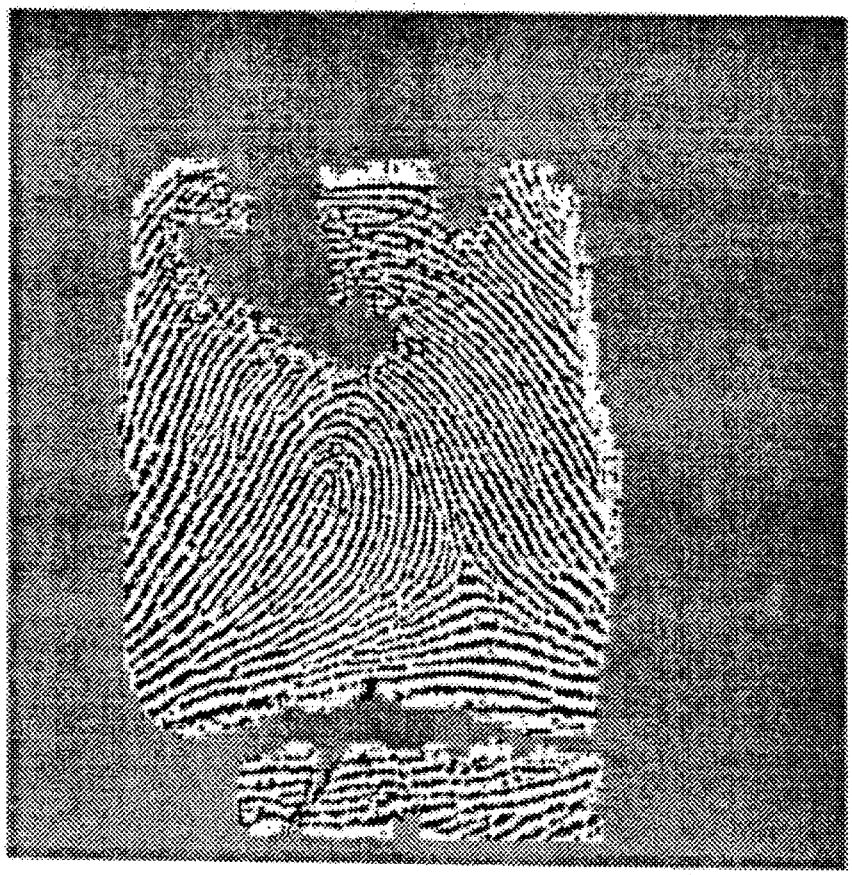
FIG. 5 is an Enhanced Gray Scale Image of FIG. 3 with areas of poor quality identified by $Q_{smooth}$ data masked out.

A typical example of a gray scale image and the results achieved through enhancement processes is shown in FIG. 3 and FIG. 4, respectively. Note the uniform contrast across the inked area. Poor quality areas in the enhanced image are easily removed using a by-product of the method for finding ridge angle. FIG. 5 shows an enhanced contrast image with those areas that would yield uncertain results removed from further consideration.

Figure 6:
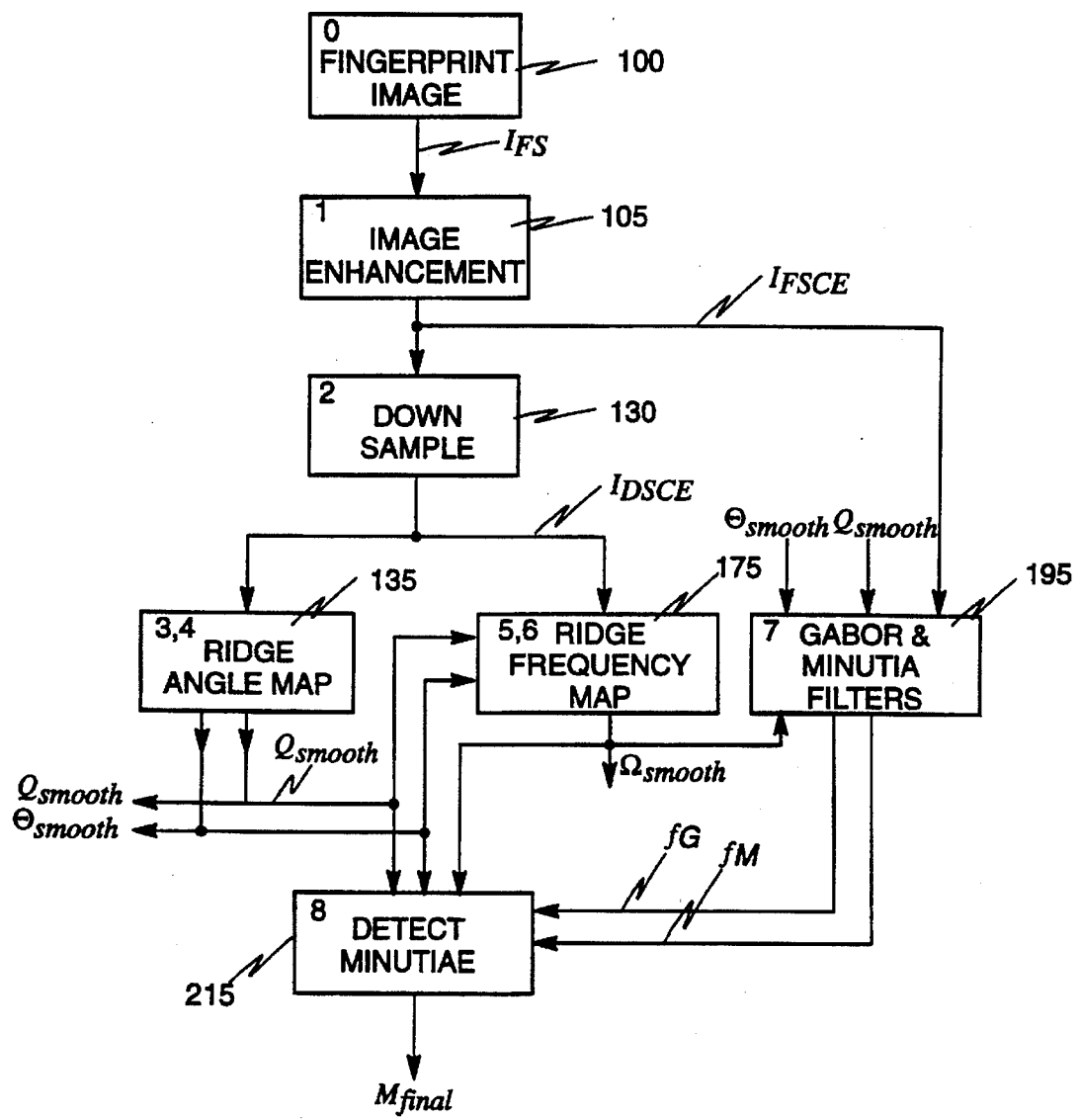
FIG. 6 is a simplified block diagram showing generally the components of the Encoder portion of the present invention which generates Ridge Angle, Ridge Frequency, Quality and Minutiae Maps.
Figure 7:
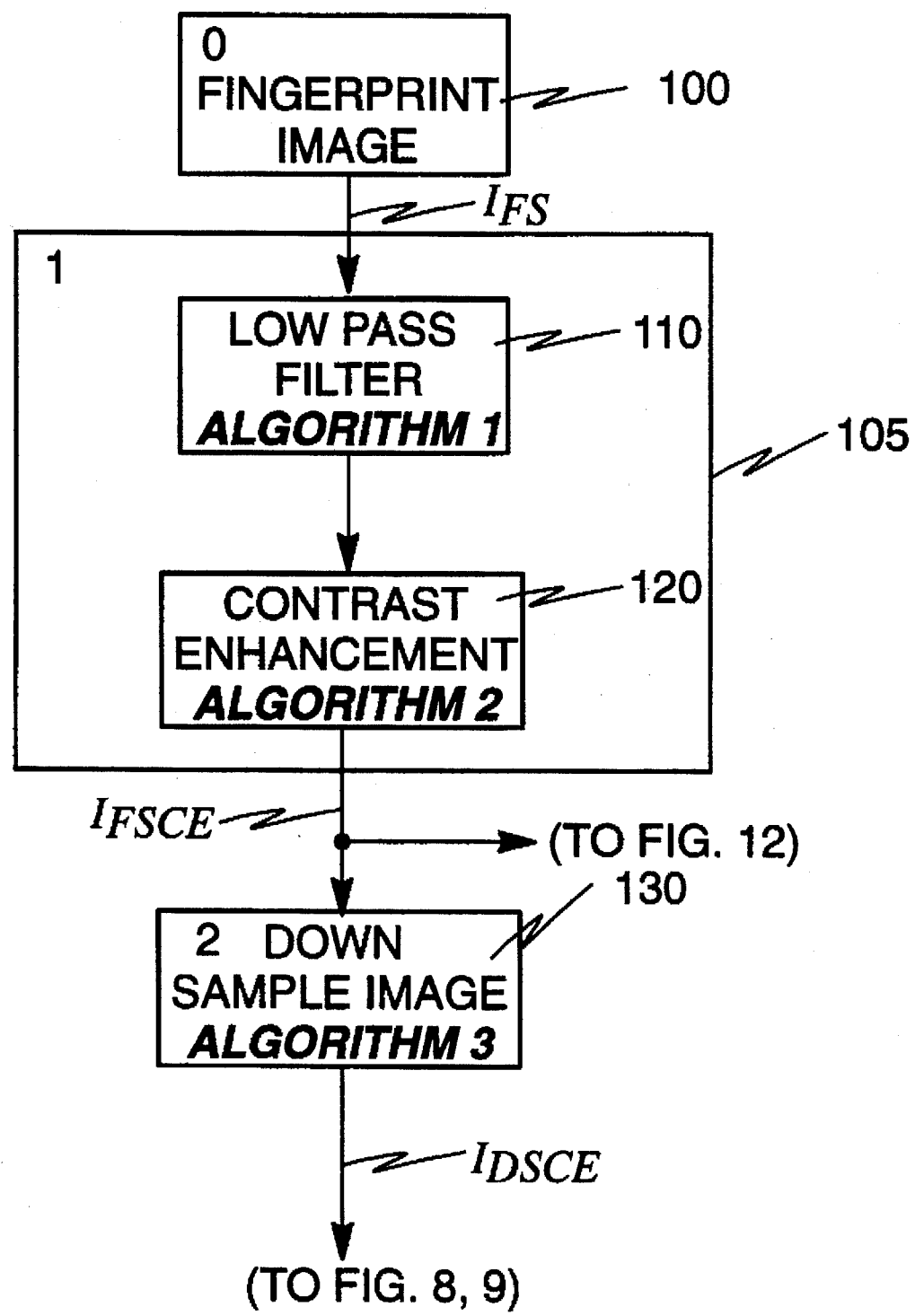
FIG. 7 is a simplified block diagram showing the elements and steps used for enhancing a fingerprint image.

The preferred embodiment includes means for producing an Enhanced Gray Scale Image. The output of the Scanner 20, or the digital image storage device 25, represented by block 100 in FIG. 6 and FIG. 7, is a full scale image $I_{FS}$, nominally an 800 by 800 pixel image which is applied to the image enhancement device 105. Image contrast enhancement is achieved in two steps. The first step is to attenuate high frequency noise from the full size image by passing the image $I_{FS}$ through a low pass filter 110. The filtered image is then enhanced using a nonlinear, local contrast enhancement filter 120. The details of the low pass filter and the nonlinear contrast enhancement algorithm may be found in Algorithm 1 and Algorithm 2 respectively.

The only input required is $I_{FS}$. The output of block 120 is $I_{FSCE}$, or a full scale image, contrast enhanced, which appears in FIG. 4. FIG. 5 is the same image, but the Quality Map $Q_{smooth}$ was used to remove areas of poor quality. This image is an Enhanced Gray Scale Image having 256 levels of gray and an even power distribution. An enhanced image formed in this manner will be used by several components of this invention.

An alternative process could employ standard filtering for obtaining an Enhanced Gray Scale Image 100. Using this technique, a band pass filter is applied to the image. This operation could be done using convolution, but the kernel size was too large to make that practical. Instead, we multiplied the Fourier transform of the image by the Fourier transform of the impulse response of our band pass filter. By the well know Convolution Theorem, this is equivalent to convolving in the spatial domain. The filtered image was then obtained by taking the inverse Fourier transform of this product. This technique, however, does not give the uniform contrast enhancement of the present method. Global histogram transform was also used, but also proved inadequate.

DOWN-SAMPLE FINGERPRINT IMAGE

To conserve computational time in some parts of the system, the full scale contrast enhanced image may be optionally down-sampled in block 130 (this is step 2 in Table 2). To down-sample the image from $n_{row} \times n_{col}$ pixels to $$\frac{n_{row}}{2} \times \frac{n_{col}}{2}$$

pixels, the Encoder simply takes every other point of the full size image. This process is detailed in Algorithm 3. The only input required is $I_{FSCE}$ and the only output is $$I_{DSCE} \in R^{\frac{nrow}{2} \times \frac{ncol}{2}} \cdot I_{DSCE} \in R^{\frac{nrow}{2} \times \frac{ncol}{2}}$$

means that I is a member of all nrow/2-by-ncol/2 real-valued matrices.

CREATE RIDGE ANGLE MAP AND IMAGE QUALITY MAP

Figure 8:
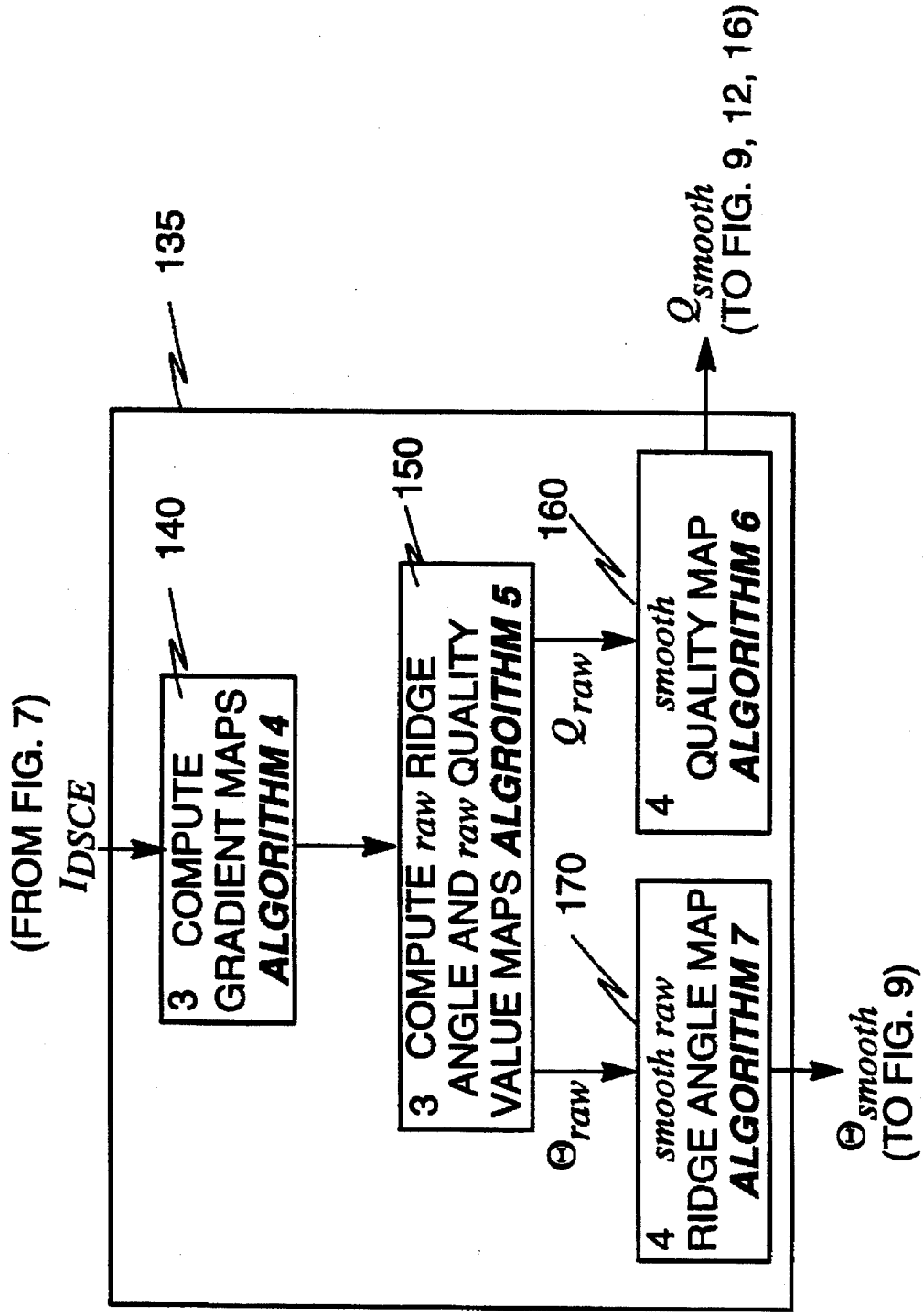
FIG. 8 is a simplified block diagram showing the elements and steps used for measuring ridge angle and image quality.

The next step (step 3 in Table 2) is to create a Ridge Angle Map and an Image Quality Map at a predetermined number of elements or pixels of the down-sampled, enhanced image in block 135 (FIG. 8). For each selected pixel, the preferred method determines a unit vector that gives the best fit, in a least mean squares sense, to the local ridge flow. The technique for minimizing the associated error uses a unique adaptation of mathematics originally published in November, 1993 in *CVGIP Image Understanding* (Academic Press 1049–9660 93), Vol. 58, No. 3, pages 383–398, by Chiao-Fu Shu and Ramish C. Jain, entitled "Direct Estimation of Orientated Patterns." For simplicity, an adaptation of this technique for finding ridge angles as applied to static fields employed in the present invention will be referred to simply as Direct Estimation.

In FIG. 8, blocks 140 through 170 represent the process for yielding a ridge angle matrix, which we also refer to as a Raw Ridge Angle Map. Determining image quality for each pixel is a two step process, which exploits the mathematics of Direct Estimation. First, the local area must have gradient support of at most 75 pixels with gradients less than 20. Monochrome background areas almost always fail this test. When a pixel fails this test, a zero quality is assigned and processing stops for that pixel; otherwise, a numeric value is computed that measures the stability of the fit, the higher the numerical value, the better. In poor quality areas, small changes in the image can result in large changes to the fit. The number computed, which has a continuous range from zero a finite upper bound, is a measure of this tendency and is used as the quality metric.

One method for measuring ridge angle and ridge frequency uses two-dimensional Fourier Transforms. Generally, a small local area, about 32 by 32 pixels, centered about each selected pixel, is transformed. In the vicinity of laminar ridge flow, a two-dimensional power spectrum exhibits a maximum value at a point in one of the quadrants of the two-dimensional frequency plane. Representing this point in polar coordinates gives the local ridge frequency and ridge angle.

A preferred method for measurement of ridge angle and producing a Quality Map is by Direct Estimation because it is simpler to implement, just as accurate, and yields an estimate of image quality that was not possible using Fourier Transforms. This is illustrated in FIG. 8 and blocks 140 through 170. The first step 140 is to compute a gradient map of $I_{DSCE}$ using a five-point central difference equation embodied in Algorithm 4. Because the gradient is a vector, for each (r,c) in $I_{DSCE}$, the map consists of a difference value for the row and a difference value for the column.

A processing loop is initiated in which a calculation kernel traverses over the image pixels in increments of 3. In other words, the process starts at the left hand column value $c_l$ and continues through to a right hand value, $c_r$ in increments of 3. Similarly, it starts at row $r_b$ and proceeds to an end at row $r_r$ also progressing in increments of 3. The starting and ending values are set arbitrarily by considering that there is some reasonably wide border of the image that can be excluded. As implemented in the present invention, processing starts 11 pixels in from the edge of the image.

Figure 14:
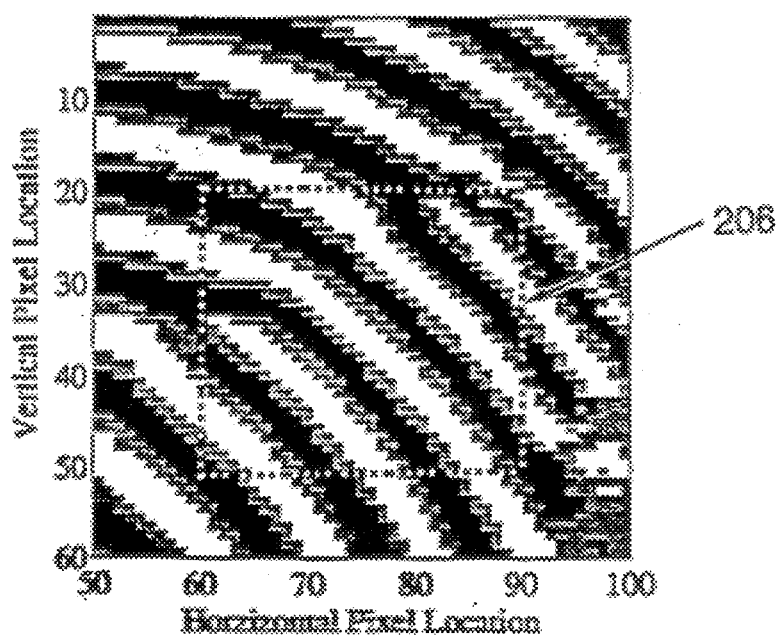
FIG. 14 is an enlargement from an Enhanced Gray Scale Image of a portion of a fingerprint that includes minutiae.

The calculation kernel is the area viewed during processing and is a predetermined area designed to cover approximately one and one-half ridges in the preferred embodiment of this invention, or in the case of a down-sampled image, an area of n by m where n and m are each 15 pixels for an initial image having a 500 pixel per inch resolution. As illustrated in FIG. 14, the kernel 145 is shown as extending vertically from pixel 20 to pixel 50 and horizontally from pixel 60 to pixel 90, keeping in mind that FIG. 14 is a full scale image, not a down-sampled image.

For each pixel(r,c) visited while looping, a computation of ridge angle and quality value is performed. Because we are incrementing by 3's in both row and column, no computation is performed for the 8 pixels surrounding pixel(r,c). For convenience, the ridge angle and image quality values for these surrounding pixels are assigned the same values as the ones compute for pixel(r,c).

This process in detailed in Algorithm 5. The input to Algorithm 5 is $$I_{DSCE} \in R^{\frac{nrow}{2} \times \frac{ncol}{2}}$$

from block 130 (FIG. 7). There are two outputs from FIG. 8, output matrices $\Theta_{raw}$ and $Q_{raw}$, both $$R^{\frac{nrow}{2} \times \frac{ncol}{2}}$$

matrices. The elements of the maps $\Theta_{raw}$, $$Q_{row} \in R^{\frac{nrow}{2} \times \frac{ncol}{2}}$$

are initialized to zero.

Internally, a gradient map is computed; it is a vector map that has two components: a row component of the gradient, $\nabla_r$, and a column-component of the gradient, $\nabla_c$, both of which are $$R^{\frac{nrow}{2} \times \frac{ncol}{2}}$$

matrices. The elements of these matrices are initialized at zero. Internally, the matrices $\Omega_2 \in R^{225 \times 2}$ and $\Psi \in R^{2 \times 2}$ are required. Complete details for computing $\Theta_{raw}$ and $Q_{raw}$ are embodied in Algorithms 4 and 5.

SMOOTH THE RAW RIDGE ANGLE MAP AND THE RAW IMAGE QUALITY MAP

The two maps produced in Block 150 by Algorithm 5 are noisy, and therefore one of two techniques may be used to smooth the maps. This is step 4 in Table 2. The first technique, smoothing by shrink-and-grow, represented in block 160, is applied only to the raw quality map, $Q_{raw}$. The second technique, smoothing by Fourier filtering, is applied in block 170 to the Raw Ridge Angle Map, $\Theta_{raw}$.

Figure 40:
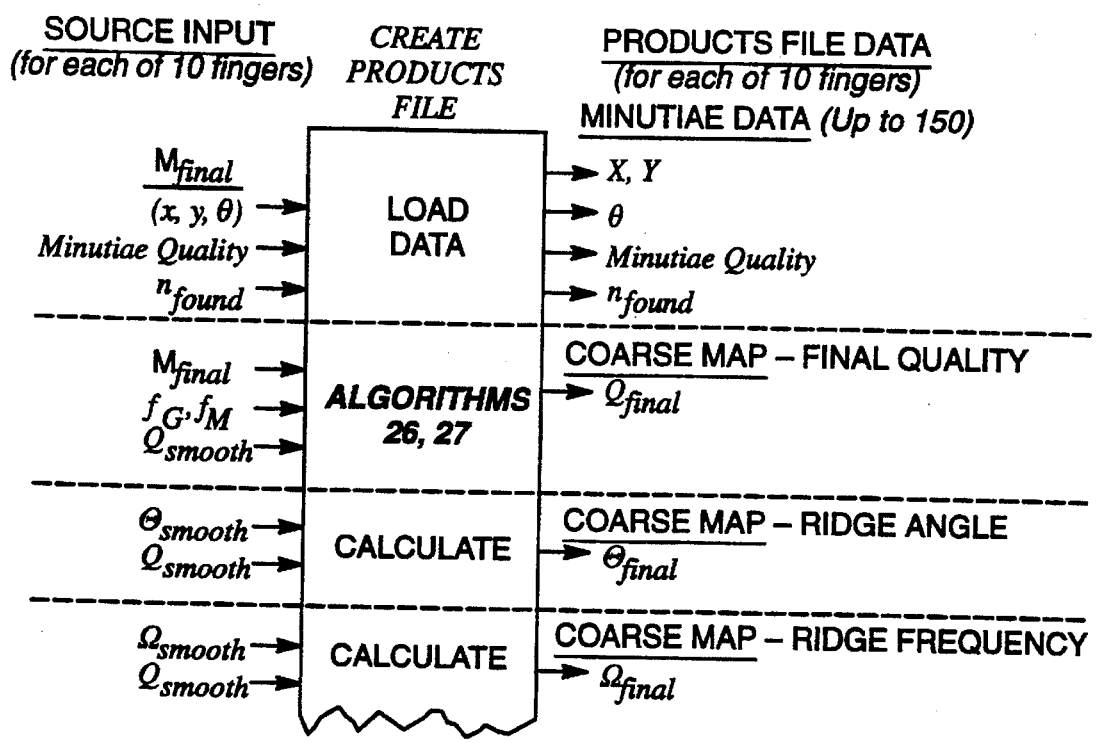
FIGS. 40 and 41 are simplified block diagrams showing the method and apparatus for creating a Products File.
Figure 41:
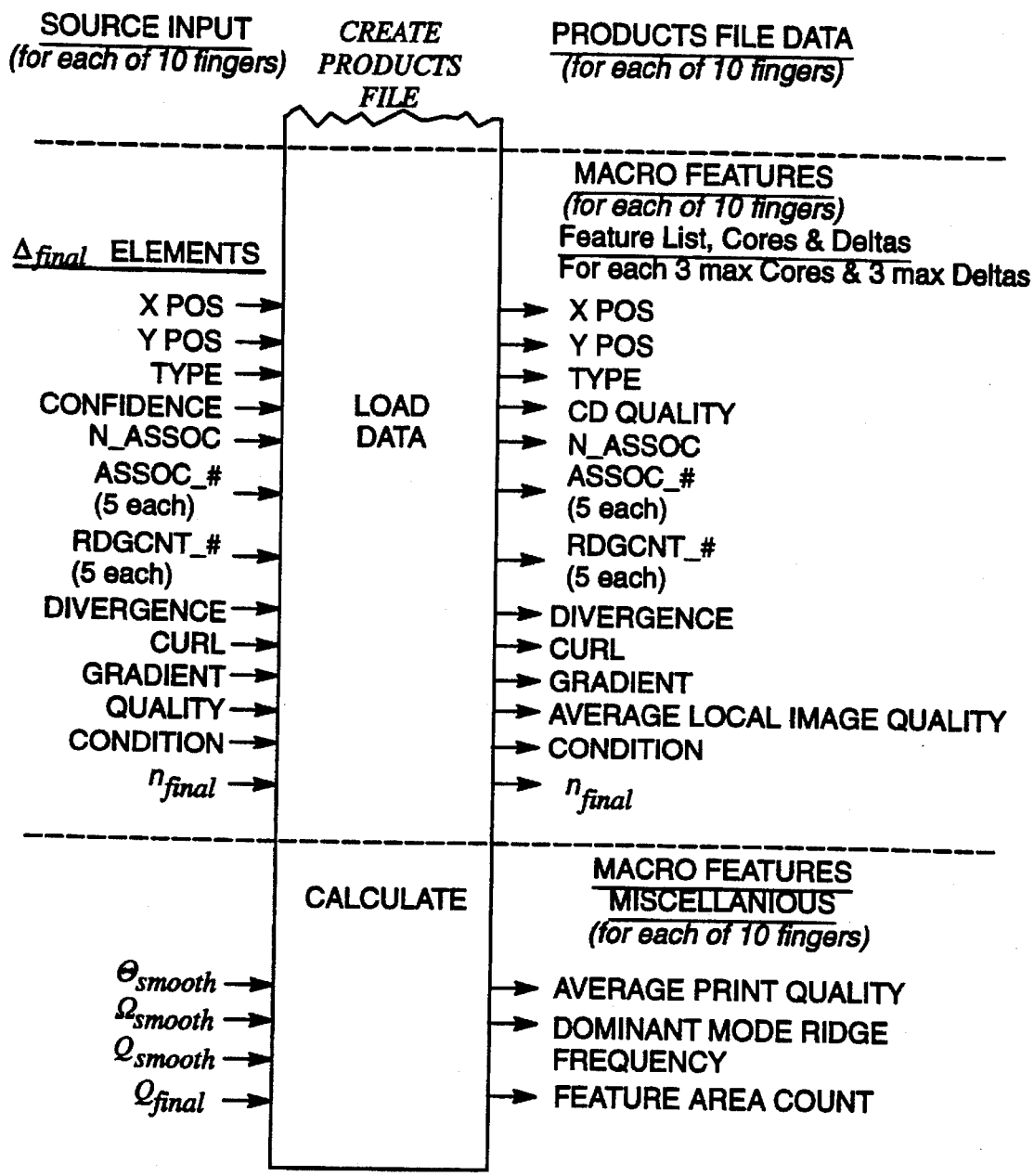

The smoothing of the raw image quality map, $Q_{raw}$, is achieved by the well known technique of erosion and dilation. First, we erode or shrink the quality area by expanding the "poor" quality area. This removes unwanted "islands" that appear outside the inked part of the image. This process, however, generally creates unwanted "lakes" within the inked part of the image. So, we dilate or expand the resultant map to fill in these "lakes". This smoothing process, performed on he raw quality map, $Q_{raw}$, is detailed in Algorithm 6. The input to Algorithm 6 is $Q_{raw}$ and the output is the smoothed map, $Q_{smooth}$. The $Q_{smooth}$ map (Table 3, item 16) is used by the Classifier 40 as well as by the Encoder 30, as shown in FIGS. 40 and 41, and is eventually stored in the Products Files 50, 60 both as a coarse map $Q_{final}$ (Table 3, item 32) and as a part of the Ridge Angle Map, FIG. 5.

The smoothing of the Raw Ridge Angle Map, $\Theta_{raw}$, is provided by Fourier filtering in the frequency domain. In general, there is a problem with smoothing angles. Angles range from 0° to 180°, with 0° being the same as 180°. In essence, smoothing is averaging, but if we average 0° and 180° we get a wrong a answer. To avoid this discontinuity, we instead smooth the maps of the sine and cosine of twice the ridge angle and then recombine with the are tangent to recover the filtered Ridge Angle Map. To smooth each component, we Fourier transform its map and multiply it by the Fourier Transform the impulse response of the smoothing filter. The smoothed map of the component is the inverse transform of this product. The details for smoothing angle are embodied in Algorithm 7, whose inputs are $\Theta_{raw}$ and $Q_{smooth}$. The output is $\Theta_{smooth}$.

CREATE RAW RIDGE FREQUENCY MAP

Figure 9:
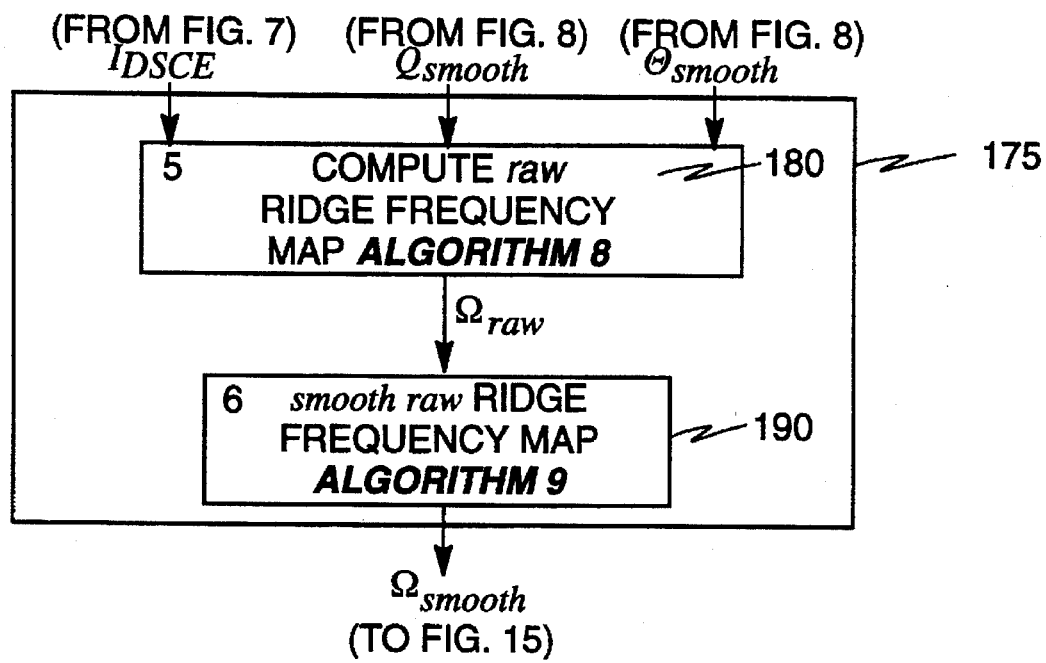
FIG. 9 is a simplified block diagram showing the elements and steps used for measuring ridge frequency.

The output of block 130 is also used to create a Ridge Frequency Map, preferably by means of a Fourier Transform; this is step 5 in Table 2 and is represented by block 175 in FIG. 6 by blocks 180 and 190 in FIG. 9.

Ridge angle and ridge frequency are needed by matched Gabor and Minutiae Filters 195, which will be more fully described hereinafter, and for core and delta location, also to be described later. Hence, accurate measurement of local ridge angle and frequency is important to reliable and accurate performance of the present invention. The reliability and accuracy of the outputs generated by the present Encoder 30 determine the achievable performance effectiveness of all system elements that follow.

Figure 10:
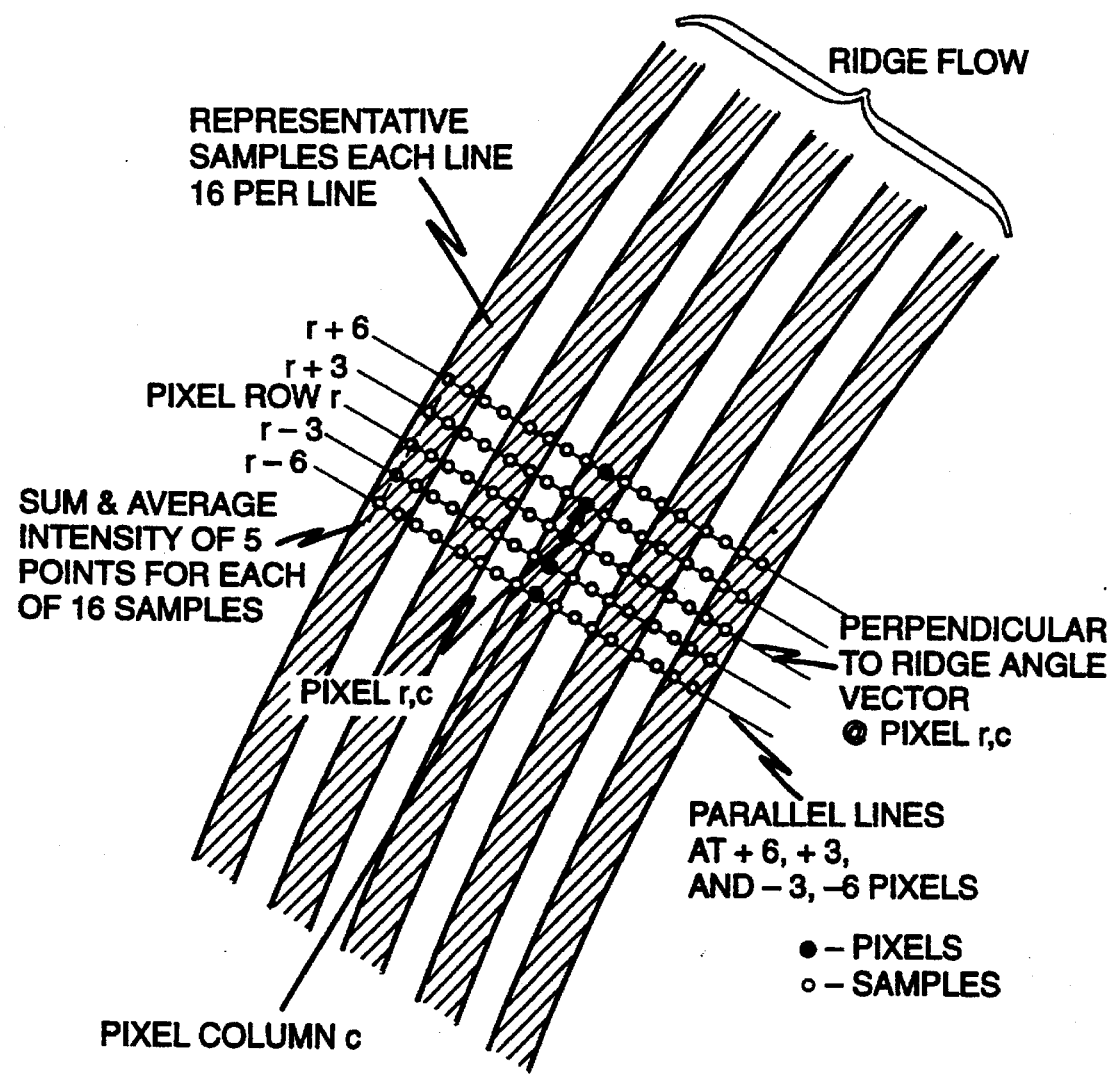
FIG. 10 is a representation of a portion of a fingerprint illustrating the procedure used to generate a raw frequency map.

The computation of a raw frequency map is described in connection with FIGS. 9 and 10. At any given pixel, if we were to look at a cross section of the ridges along a line drawn perpendicular to the ridge flow, we would see a periodic function that transitions from white to black. The local ridge frequency is the frequency of this function. To measure this frequency we first create a sine wave from the ridge flow. We draw a line perpendicular to the ridge angle and centered at the pixel of interest, pixel(r,c). We then take 16 samples along this line, eight on either side of pixel(r,c). In really well inked areas, a plot of these points would show a well formed sine wave. In general, however, the local gray scale is noisy, so we want an average. To do this we draw four more lines +3, +6, -3, and -6 pixels away from pixel(r,c). The four lines are drawn parallel to the first, which is perpendicular to the ridge angle at pixel(r, c). We take 16 samples from each line and average them over the five lines to get 16 averaged points. This is illustrated in FIG. 10. The power spectrum from the Fourier Transform is computed from these points. The centroid about the maximum power point yields the ridge frequency at (r,c). We loop over the image in increments of seven and, for each (r,c) visited, we will up sample by filling it and the 15 cells that surround it with the same value.

Each pixel has a quality value (image quality) associated with it. If the quality is below a set threshold, we assume the print quality is too poor to interpret or that we are off the image (currently, this threshold value is set at 0.25), and we set the frequency for this pixel to 0.095 cycles/pixel, which is the median frequency of all prints in the NIST9 database.

The NIST9 database is one of several National Institute of Standards supplied image databases of ten-print cards. NIST contains ten-print images from 1350 individuals that are representative of fingerprint class across the U.S. criminal population. If the system were to be exclusively applied to another country whose population were to have significantly smaller or larger hand feature sizes resulting in a different dominant ridge frequency, there may be some benefit to setting the median frequency to that representative of the population. The algorithm for creating $$\Omega_{row} \epsilon R^{\frac{n_{row}}{2} \times \frac{n_{col}}{2}}$$

is contained in Algorithm 8. There are three inputs: $I_{DSCE}$, $\Theta_{smooth}$, and $Q_{smooth}$.

SMOOTH THE RAW RIDGE FREQUENCY MAP

Smoothing the Raw Ridge Frequency Map is generated by block 190 of FIG. 9 and is step 6 in Table 2. Again Fourier filtering is applied when smoothing the Raw Ridge Frequency Map. In fact, the algorithm we use is nearly a carbon copy of the method used to smooth either the sine or cosine maps of twice the ridge angle. The complete process is presented in Algorithm 9. The only input is $\Omega_{raw}$. The only output generated is $$\Omega_{smooth} \epsilon R^{\frac{n_{row}}{2} \times \frac{n_{col}}{2}}.$$

The smoothed Ridge Angle and Ridge Frequency Maps are later converted to coarser maps, denoted herein as final maps, that are stored in the Products File 50, 60 as maps $\Theta_{final}$ (Table 3, item 37), $\Omega_{final}$ (Table 3, item 38), as shown in FIG. 40, for future use by the Search Filter 70 and Matcher 80. The smoothed maps contain quality information in that all areas where the quality is poor, or below a predetermined threshold, have been masked out. This masking occurred at the time of formation of the respective parent "raw" maps. Likewise, the quality attribute contained in the "smooth" maps are passed along to the "final" maps and are retained in the Products File. A final image quality or image state map $Q_{final}$ (Table 3, item 32) is also stored in the Products File.

APPLY GABOR AND MINUTIA FILTERS

Figure 11:
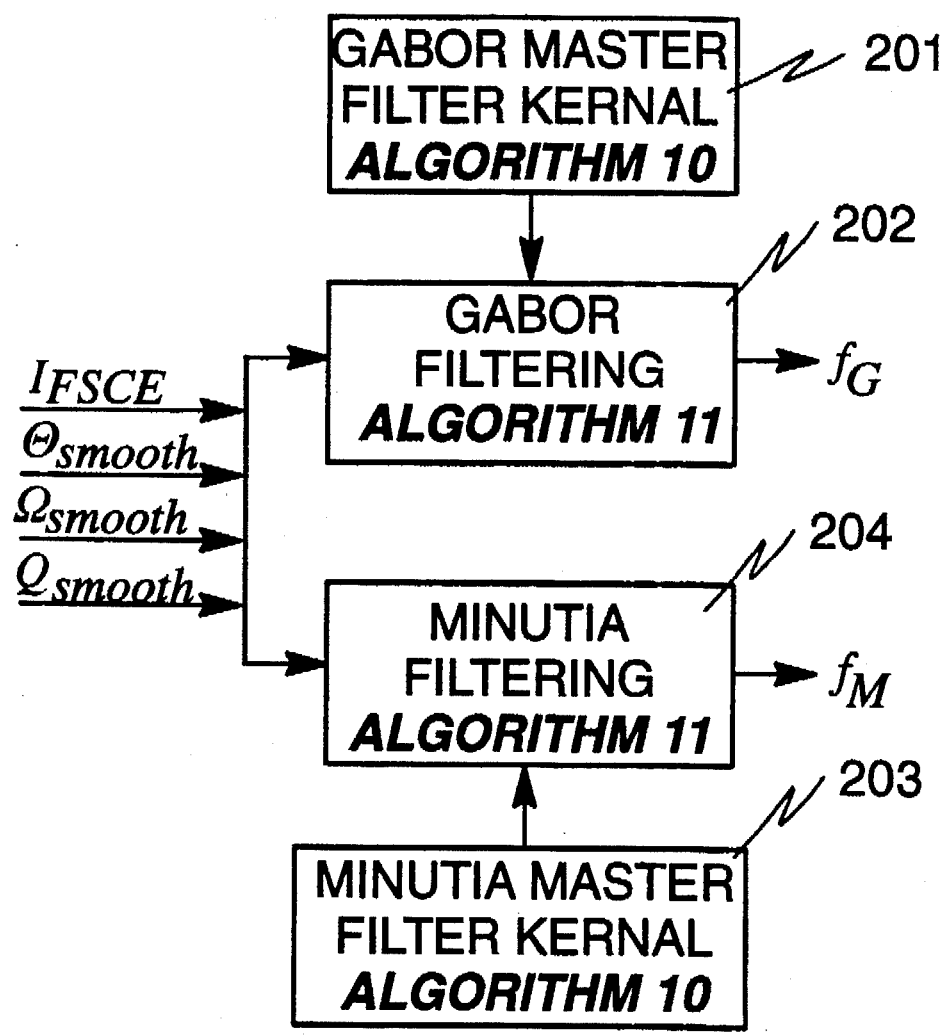
FIG. 11 is a simplified block diagram of one component of a Minutiae Filter.

The Enhanced Gray Scale Image $I_{FSCE}$ is filtered (step 7 in Table 2) using matched filters 202 and 204 (FIG. 11). The input for minutiae detection is the Enhanced Gray Scale Fingerprint Image $I_{FSCE}$ from block 120 of FIG. 7. The gray scale is filtered pixel-by-pixel by two matched filters 202 and 204 that are oriented according to local ridge flow and have their passbands centered at the local ridge frequency.

In the Encoder 30 of the present invention, the filters have small regions of support, generally under 32 by 32 pixels and are convolved with regions of equal size to obtain the filtered image at the pixel. One of the filters is the discrete, two-dimensional Gabor Filter 202. The Minutia Filter is a Gabor Filter with one of its halves 180 degrees out of the phase with its other half. Both filters are complex valued, that is, they map (x,y) coordinates to a complex number. Because the enhanced image for all prints has uniform contrast, the magnitude of the filtered output is indirectly normalized.

Figure 12:
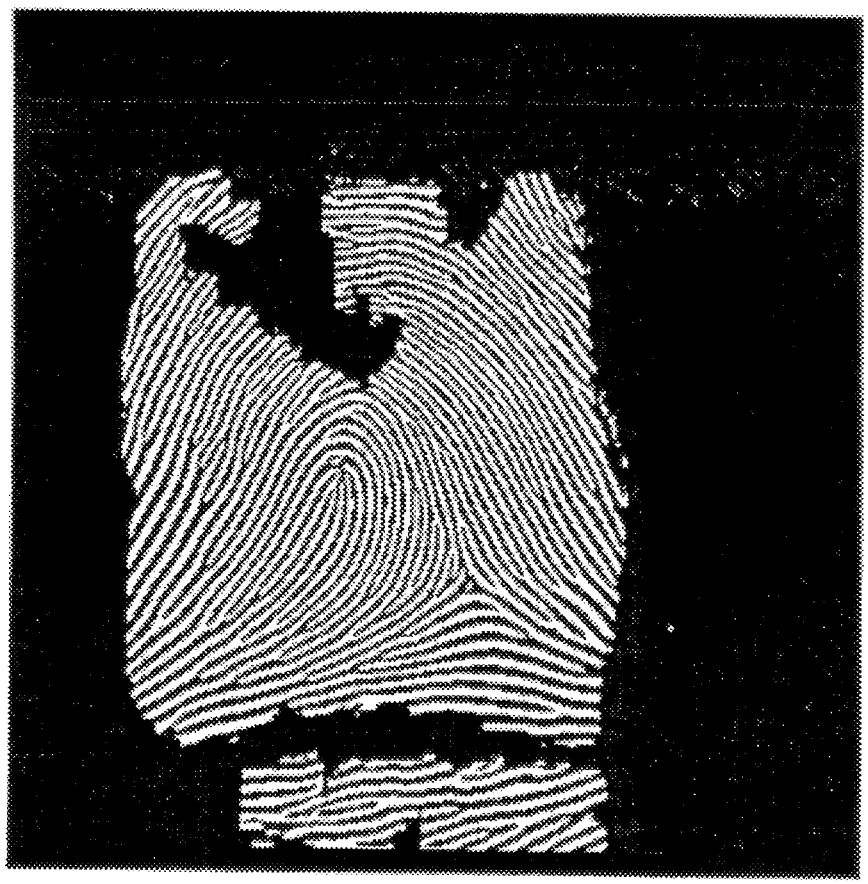
FIG. 12 is a raw Gabor filtered image corresponding to the image in FIG. 3 showing the Gabor Filter's capability to detect ridge flow.

FIG. 12 illustrates a raw Gabor Filter output. This image represents the power of the filter; it should not be confused as an image used in the process of determining ridge flow. It shows that through the process leading to this point, an excellent map of the fingerprint can be obtained. It distinctly shows ridge flow and minutiae as information that is contained in the contrast enhanced image that the Gabor and Minutia Filters use. Minutiae are very distinct in the contrast enhancement image and allow the Gabor and Minutia Filters to make distinct interpretations of ridge flow and points of minutiae as seen in FIG. 12. Thusly, the declaration of false minutiae is avoided.

Figure 13:
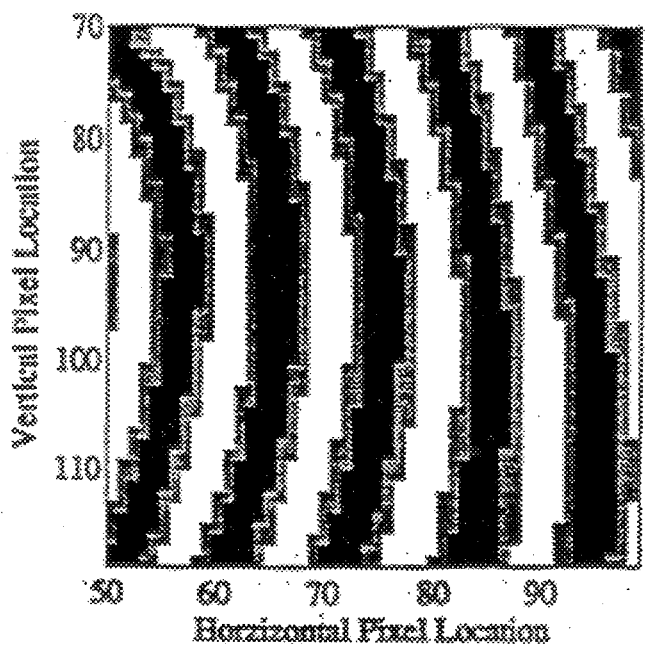
FIG. 13 is an enlargement from an Enhanced Gray Scale Image of a portion of a fingerprint without minutiae.
Figure 15:
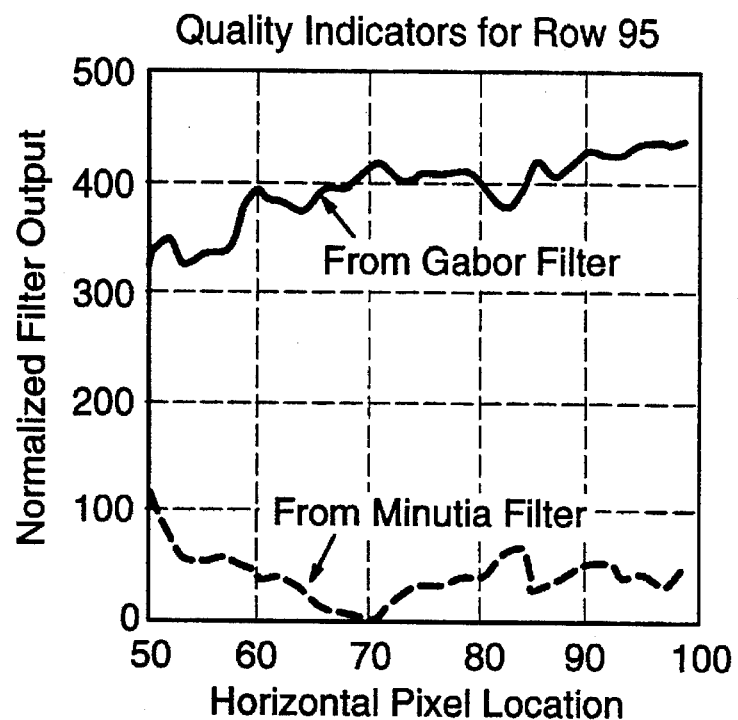
FIG. 15 is a quality indicator chart for the print shown in FIG. 13.
Figure 16:
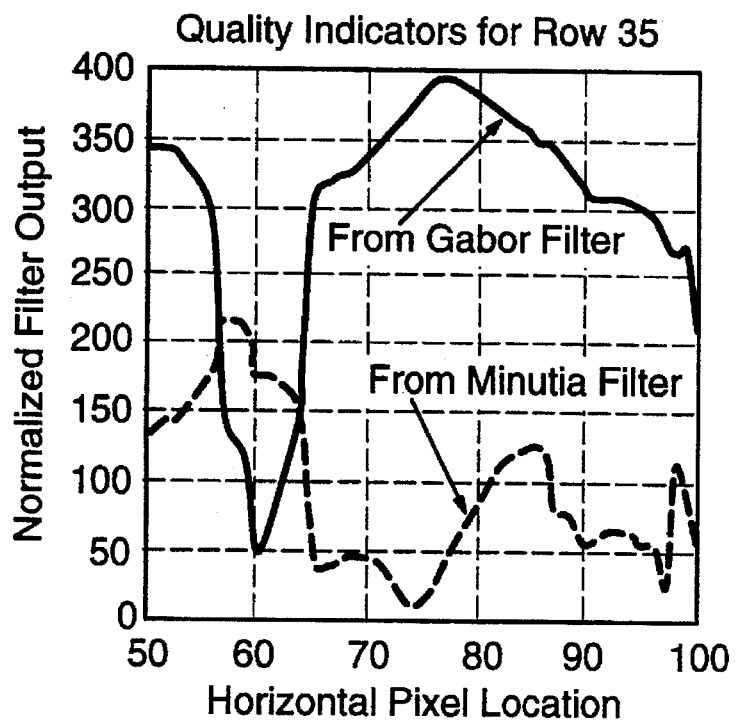
FIG. 16 is a quality indicator chart for the print shown in FIG. 14.

The important output of the Encoder 30, though, is the combination of the Gabor and Minutiae filtered images, because these filters, working as a pair, are designed to capture the phase discontinuity that occurs at a minutia. For example, FIG. 13 shows pure fingerprint ridge flow, while FIG. 14 shows ridge flow with interspersed minutiae. The response of the Gabor and Minutiae Filters to the pure ridge flow of FIG. 13 is shown in FIG. 15. The response of each filter to FIG. 14 minutiae is shown in FIG. 16. Pure ridge flow yields high valued output from the Gabor Filter and low valued output from the Minutiae Filter. Minutiae points cause the outputs of each of the filters to flip to the opposite value extreme; that is, over minutiae, the Minutiae Filter is high valued and the Gabor Filter is low valued. A description of the filter design properties that yield this sensitivity of response from each filter follows.

Figure 17:
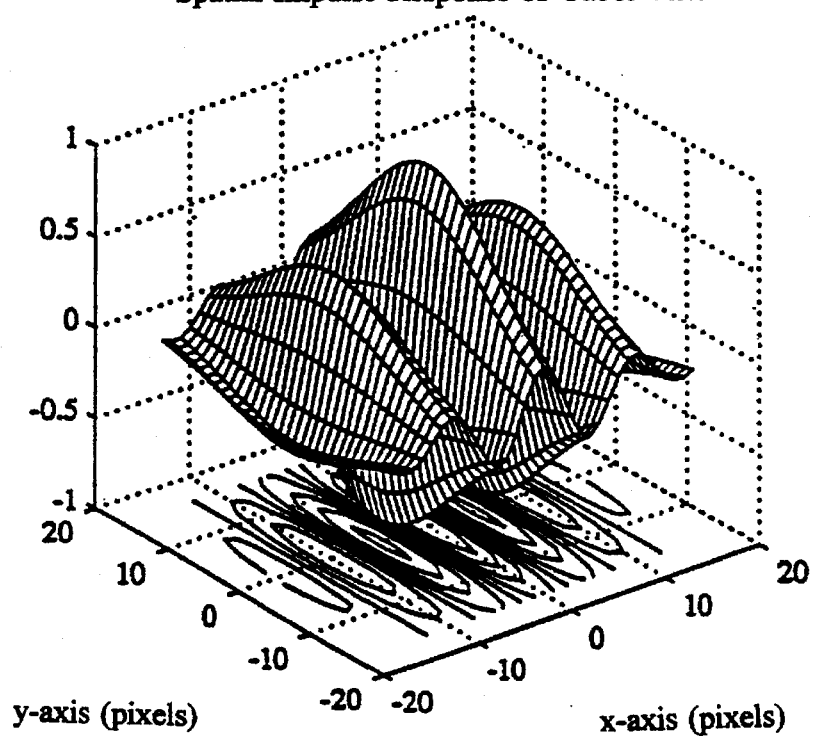
FIG. 17 is a three-dimensional view representing the spatial impulse response of a Gabor Filtered fingerprint illustrated in FIG. 12.

As illustrated for pure ridge flow shown in FIG. 13, the Gabor Filter 202 has its maximum output, the solid line in FIG. 15, in areas of parallel ridge flow. As illustrated, for the minutia in FIG. 14, it has a near zero output at a minutia, solid line of FIG. 16. A spatial domain picture of the surface generated by the real and imaginary part of a Gabor Filter is shown in FIG. 17. It is clear from the picture, that in areas of parallel ridge flow, the Gabor Filter achieves a maximum output when the filter is aligned with ridges and it cycles at the ridge frequency. Ridge flow alignment over the center of a minutia, however, causes the filtered signal to go to zero. This is because, ideally speaking, half the ridges under the filter are 180° out of phase with the other half; therefore, one half cancels the other.

Figure 18:
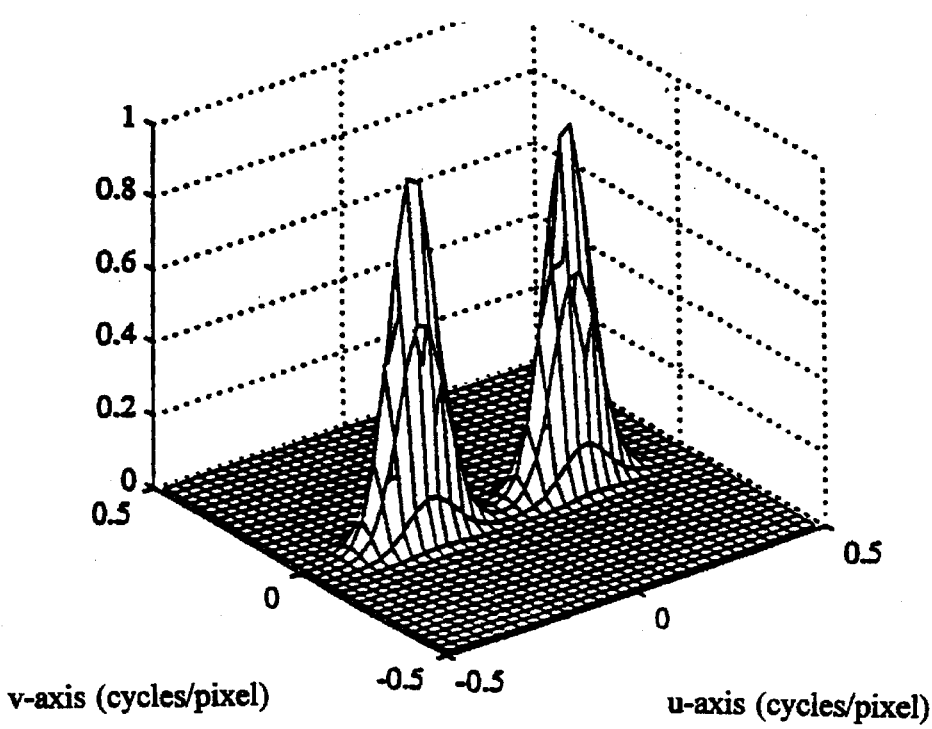
FIG. 18 is a three-dimensional view representing the spectral impulse response of a Gabor Filter to the fingerprint illustrated in FIG. 12.
Figure 19:
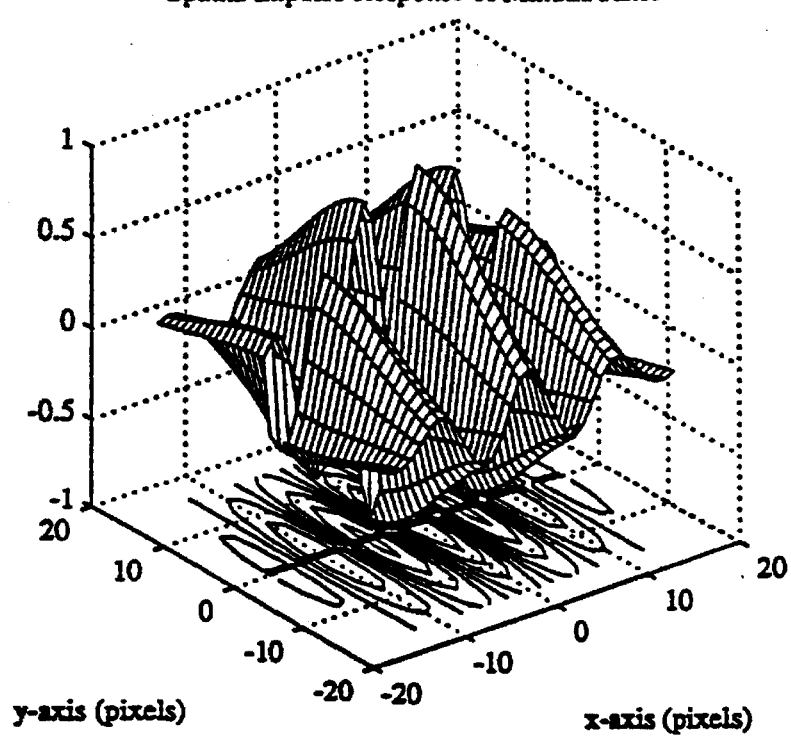
FIG. 19 is a three-dimensional view representing the spatial impulse response of the Minutiae Filter to the fingerprint of FIG. 12.
Figure 20:
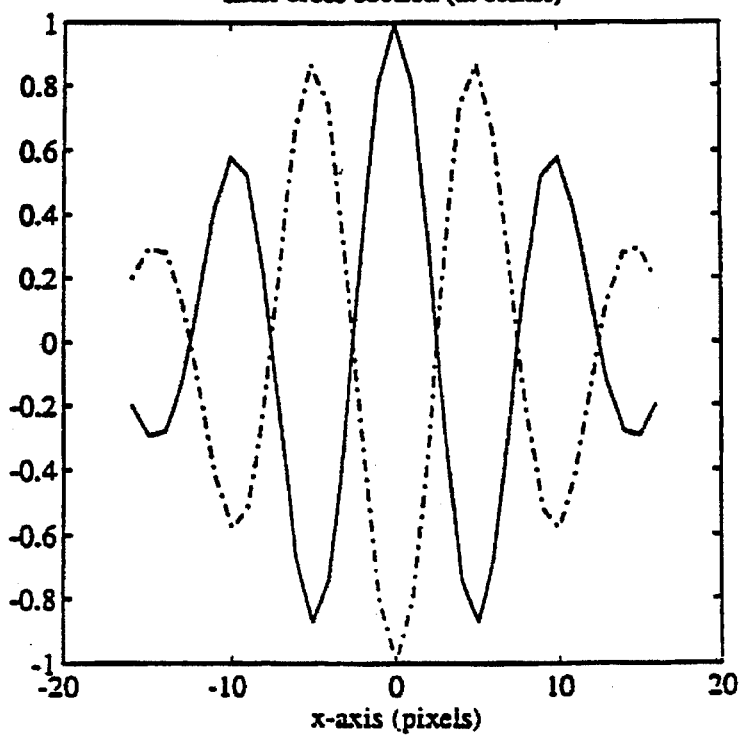
FIG. 20 is a graph showing the response of the Gabor and Minutiae Filters across the fingerprint of FIG. 12.

The Minutiae Filter 204 is designed to compliment the Gabor Filter 202. As illustrated in FIG. 13 through FIG. 16, it has near zero output in parallel ridge flow and a maximum output at minutiae. The Minutiae Filter is complex valued also, and a surface plot of its real and imaginary parts is shown in FIG. 18. It can be understood from the surface plot and the spatial response cross sections shown in FIG. 19 (real and imaginary responses) that the output vector sums to zero or low valued outputs. Further, it can be seen from considering the ridge flow with minutiae in FIG. 14, and again considering the filter response characteristics of FIGS. 18 and 19, that its real and imaginary part outputs will vector sum to high valued output when it is aligned over the center of minutia. Combining the two filtered images at 215 of FIG. 6 forms a powerful process for finding and declaring minutiae, and for measuring and recording the associated quality of the determination.

The Gabor Filter 201 and Minutiae Filter 203 kernels are each computed once in blocks 201 and 203. These filters are computationally intensive; the more pixels included in the filtering, the greater processing time grows. To bound the computational time, a wavelet kernel was selected to be 25×25 with the appropriate nominal frequency of 0.095 cycles per pixel. This means that the image to be filtered always has approximately 2.5 ridges in the wavelet kernel.

Ridge spacing and width varies from fingerprint to fingerprint, so in order to always insure including 2.5 ridges while bounding the kernel size, we under-sample or over-sample the Enhanced Gray Scale image as necessary. These filters have a symmetric 2-dimensional exponential envelope. They are vertically oriented. In other words, the filters are tuned for an image that has a ridge angle of 0 degrees and a frequency of 0.095 cycles per pixel.

To apply the filter to any given coordinate, (r,c), in the image, the ridge angle and ridge frequency at (r,c) are used to appropriately rotate and scale the image into the 25×25 wavelet kernel, and then perform mathematical convolution.

The first step is to compute the master filter values, blocks 201 and 203, for each filter; algorithm 10 performs this function. This step is then followed by filtering $I_{FSCE}$ with both the Gabor Filter in block 202 and the Minutia Filter in block 204; these filtering steps are performed by applying Algorithm 11.

The input is the full scaled enhanced image, $I_{FSCE}$. The outputs are the Gabor Filter output, $$f_G \epsilon C^{\frac{n_{row}}{2} \times \frac{n_{col}}{2}},$$

the Minutiae Filter output, $$f_M \epsilon C^{\frac{n_{row}}{2} \times \frac{n_{col}}{2}}.$$

It is noted that due to the symmetry of the Minutia Filter, integrating it over the kernel yields zero. Further, due to the symmetry of the imaginary part of the Gabor Filter, integrating it over the kernel yields a real number, i.e., the imaginary part is zero.

DETECT MINUTIAE

The next step (step 8 in Table 2) is to detect minutiae in block 215 of FIG. 6 and will be described in more detail in connection with FIGS. 21, 22 and 23. In this step, minutiae are located and the quality of the fingerprint image on a pixel-by-pixel basis is determined. This is accomplished by applying a threshold-testing algorithm to the ratio of the Minutiae to the Gabor filtered images. A ratio that is greater than "1" indicates potential minutia.

Figure 24:
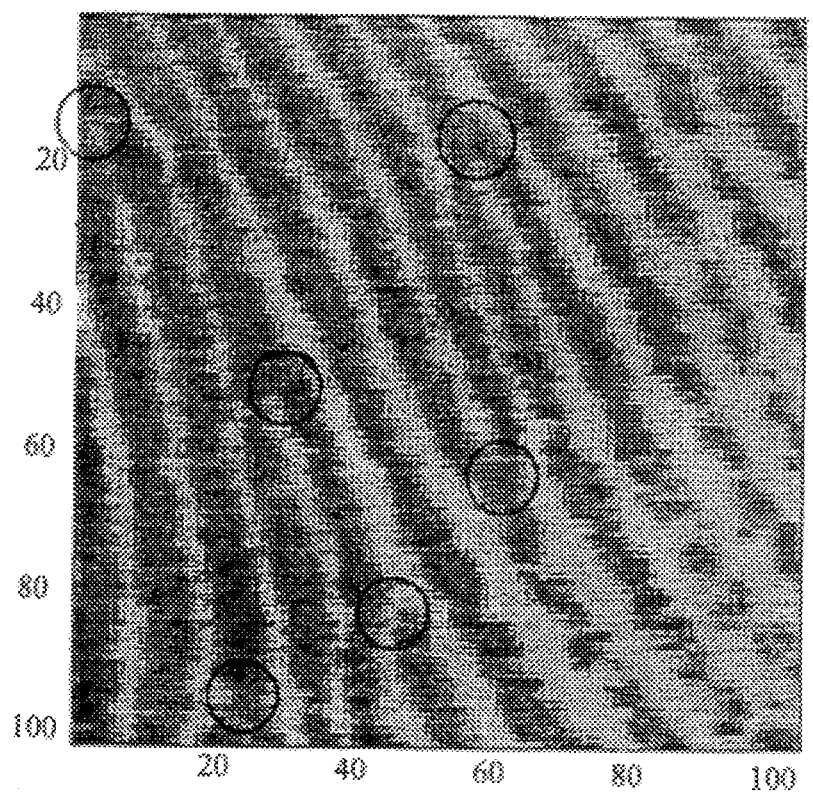
FIG. 24 shows an enlarged view of a gray scale image of a fingerprint containing six minutiae, which are circled.

To find minutiae, the invention takes advantage of the fact that the Gabor Filter output has a deep null in the vicinity of the minutia while the Minutiae Filter output has a peak. Thus, taking the ratio of the magnitude of the Minutiae Filter output to the magnitude of the Gabor Filter output should yield spikes in areas of minutia. Indeed, this is the case, and it graphically illustrated in FIG. 24 and FIG. 25 where a small rectangular region from the sample print is illustrated. There are six minutiae in this region, each of which are circled on the gray scale image of FIG. 24

Figure 25:
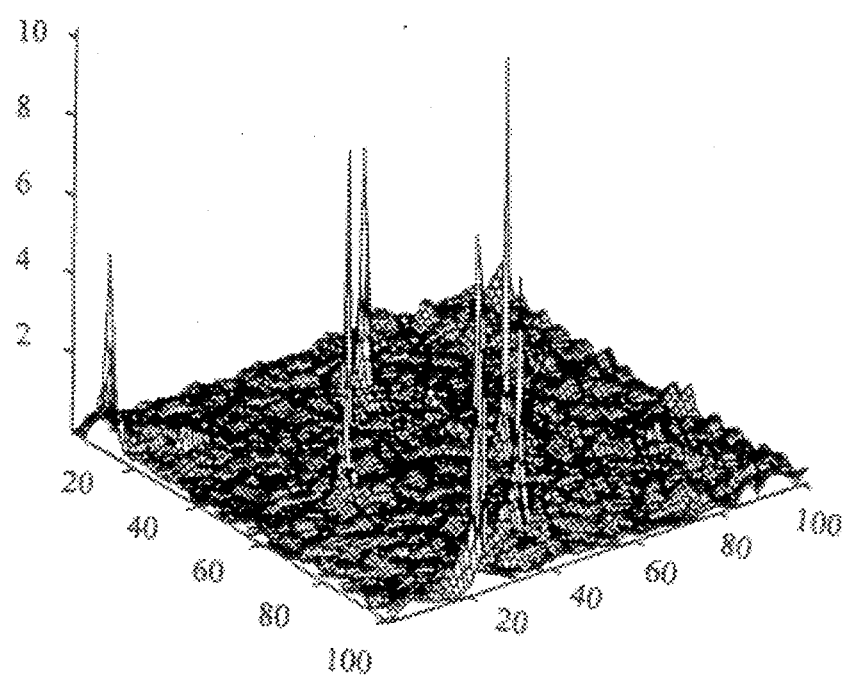
FIG. 25 is a surface plot showing the results of the output from the Minutiae Filter divided by the output of the Gabor Filter, with six spikes being present, each representing one of the minutiae shown in the fingerprint of FIG. 24.

The three-dimensional plot shown at the bottom of FIG. 25 is in one to one correspondence with the gray scale, and represents the magnitude of the Minutiae Filter output divided by the magnitude of the Gabor Filter output. It illustrates quite clearly that the ratio of the filter outputs very effectively identifies the presence of minutiae.

What about in areas where there are no clearly visible spikes? The answer to this question leads directly to the Image Quality Map. In "good" quality areas of parallel ridge flow, that is, areas that are minutia free, the Gabor Filter output will be high and the Minutiae Filter output will be low. A simple threshold testing algorithm can determine this and a rating of "good" can be assigned to pixels that pass the test. The threshold test requires that Gabor output be greater than 12,000. In "poor" quality areas the output of both filters will be low. It doesn't matter whether there is a minutia present or not; if the area is bad, the filter outputs tend to small numbers. Again, a simple threshold test is used to determine if a pixel should be assigned a "poor" quality rating. If image quality is less than 10, a "poor" rating is assigned.

There are several benefits derived from being able to readily measure quality across image pixels and storing the resultant quality map. First, using the Image Quality Map $Q_{smooth}$ and the set of identified minutiae locations, it now becomes possible to identify, with confidence, areas of the print that are minutiae free. Second, applying the quality metric to the decision process of declaring minutiae significantly minimizes the generation of false minutiae; it is now rare to declare something (image artifact or other) a minutia when it is not. It is widely recognized that prior art encoder designs generate false minutiae. Eliminating, or minimizing the generation of false minutiae (to a number near zero), significantly reduces the workload required of the Minutiae Matcher (resulting in faster throughput), eliminates the need for manual corrections at encoding time, and provides for more accurate and discriminating scoring in matching. Third, the mapped non-minutiae area can be stored and utilized by the Minutiae Matcher component of the system to do dual hypothesis matching comparisons. Fourth, the mapped and stored Quality metric data, both Image and Minutia Quality, can be passed forward to the Minutiae Matcher component of the system and applied to provide an additional discriminate for matching comparisons.

Figure 21:
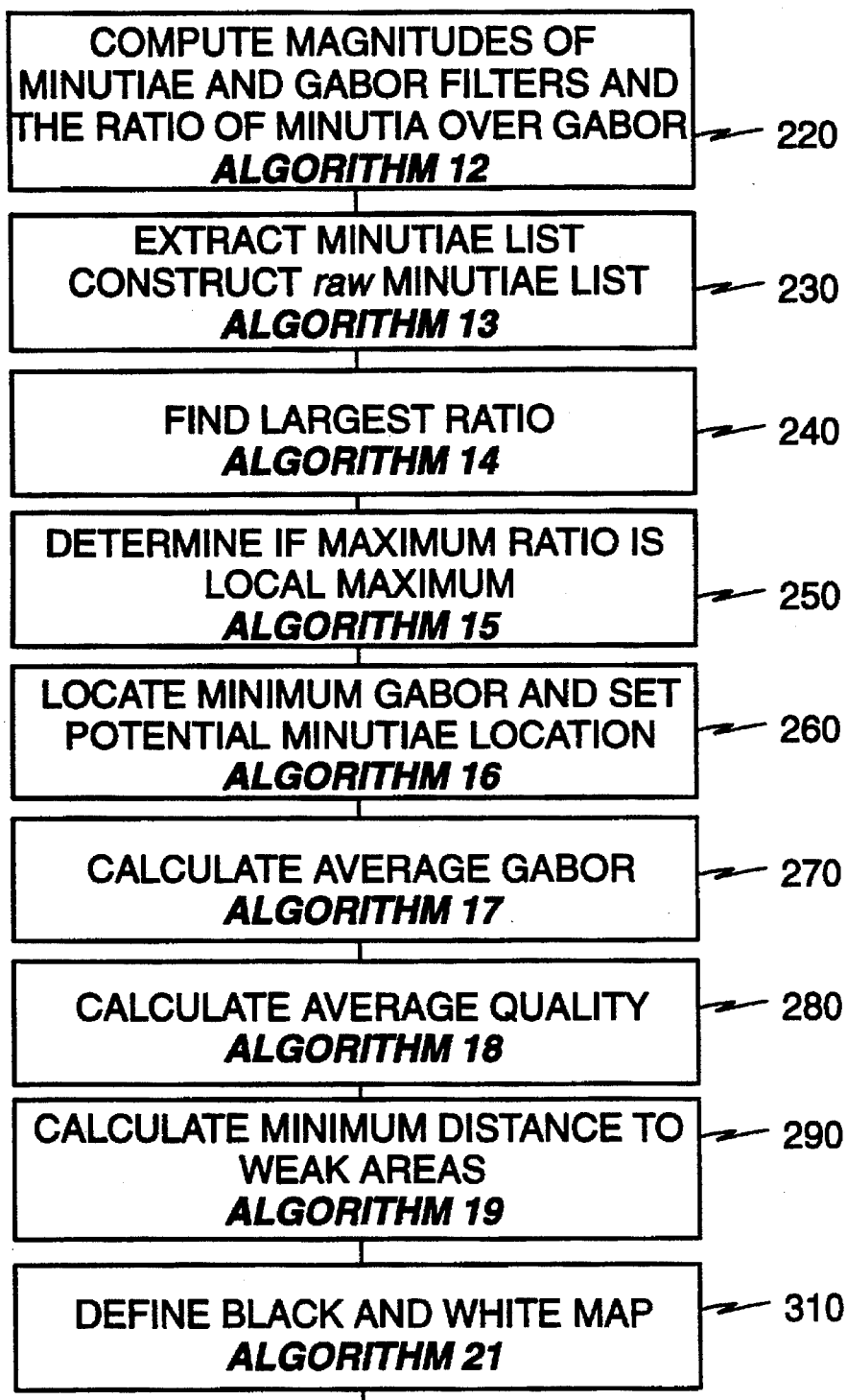
FIG. 21 is a simplified block diagram showing a first group of elements and steps used for extracting minutiae.

Referring specifically to FIGS. 21 and 22, minutiae extraction is achieved by identifying areas where the Gabor Filter output approaches zero and a strong support from the Minutiae Filter is found. To aid in the extraction of minutiae, the ratio of the magnitude of the Minutiae Filter to the magnitude of the Gabor Filter is defined as the key extraction feature in determining the raw minutiae list. The raw minutia list is then finalized by applying thresholds on several variables, which were determined by experimentation, to provide a high correlation of good minutiae.

Figure 26:
FIG. 26 is the FIG. 3 gray scale fingerprint image with minutiae detected overlaid on top.

Minutia extraction is performed by applying Algorithms 12 through 27 as outlined in FIGS. 21 and 22 and blocks 220 through 370. As shown in FIG. 23, the inputs for the minutiae extraction process are $Q_{smooth}$ and $\Theta_{smooth}$ from blocks 160 and 170 of FIG. 8, $\Omega_{smooth}$ from block 190 of FIG. 9, and $f_G$ and $f_M$ from blocks 202 and 204 of FIG. 11. The outputs are the Final Minutiae List, $M_{final}$ and the ratio of minutiae over Gabor, $\Re$. $M_{final}$ contains x, y, theta and a minutiae quality value for each minutia detected. A plot of the final minutiae list for the Gray Scale Image of FIG. 3 appears in FIG. 26. The tails on the circles denote theta, the angular orientation of a minutia.

A Final Quality Map is constructed by down sampling the 256-by-256 smooth quality map, $Q_{smooth}$, to a 32-by-32 map. Thresholds on the ratio of minutia over Gabor, and Gabor Filter outputs are applied to assign the value of quality in the 32-by-32 map. The threshold applied is that the ratio must be greater than 1. Quality values of one indicate the presence of a minutia in that block. Quality values of negative one indicate areas of no minutiae with good quality ridge flow. Quality values of zero are areas too poor to interpret. The Quality Map, $Q_{final}$, is generated by application of Algorithms 25 through 27, blocks 350, 360 and 370.

The inputs for the Final Quality Map are $M_{final}$, $Q_{smooth}$, $\Re$, and $f_G$. The output is the Final Quality Map, $Q_{final}$.

Figure 27:
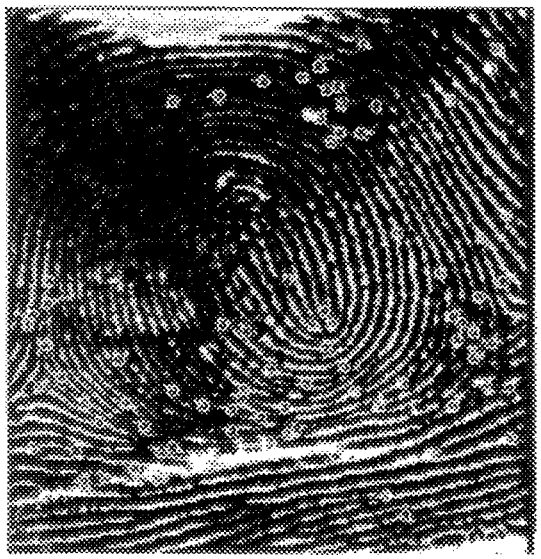
FIG. 27 is a gray scale fingerprint image with minutiae detected by prior art processes identified by white circles.

Referring to FIG. 27, which is a gray scale fingerprint image with minutiae detected by prior art processes identified by white circles, minutiae are identified by a circle with a tail overlaying the fingerprint image. The circles are centered over the minutiae and the tails point in the direction of the angular direction of the minutiae. The fingerprint image has areas of heavy inking in the upper center and upper left quadrant. In these areas, the image is noisy and existence and location of real minutiae are indeterminate. The prior art process detects several minutiae in these areas, most of which are false.

Figure 28:
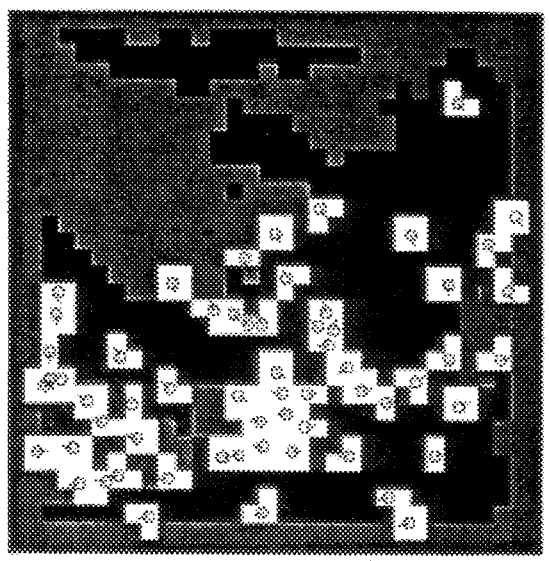
FIG. 28 is a map of the fingerprint shown in FIGS. 27 and 29 showing an image of poor quality shown in gray, areas of good quality having no minutiae are shown in black, and areas of good quality containing minutiae are shown in white, and minutiae are overlaid and shown as black arrowed circles.

FIG. 28 is a map of the fingerprint shown in FIG. 28 showing an image of poor quality shown in gray, areas of good quality having no minutiae are shown in black, and areas of good quality containing minutiae are shown in white. This is the $Q_{final}$ map. Overlaid on the top of $Q_{final}$ is the $M_{final}$ data. Note how the gray areas correspond to the heavily inked areas in FIG. 27. This map was created by the method and apparatus described herein. Only valid minutiae are identified by the circle and tail markers.

Figure 29:
FIG. 29 is the gray scale fingerprint image of FIG. 27 with the minutiae detected by the present invention and identified in FIG. 28 shown by white arrowed circles.

FIG. 29 is the gray scale fingerprint image of FIG. 27 with $M_{final}$ minutiae detected by the present invention identified by white circles. When compared with FIG. 27, it is clear how a declaration of false minutiae or real minutiae with low confidence has been avoided.

The location of the minutiae (150 per finger in the preferred embodiment of this invention), their orientation, and their quality, are stored in the Products Files 50, 60 (Table 1, E1, E2, E3, E4) and will be used by the Minutiae Matcher component 80 at a later time.

FEATURE DATA EXTRACTION OVERVIEW

Method Overview

Cores and Delta are features of the fingerprint which serve in comparative searches. Detection of Cores and Deltas and extraction of data that characterizes them is performed by the Encoder. The data is passed onto the Products File for later use and on to the Classifier for immediate use. The Classifier uses the data to determine the Pattern Class(es) that the fingerprint is representative of. The pattern class information (as noted in Background Section) identifies: 1.) Class, whether there are right or left loops, whorls, arches, or tented arches; and then 2.) Subclass categories, ridge counts for loops and whorls. Along with Classification the fingerprint identification community measures and stores ridge count information for fingerprints of the loop classification type. This is done to have an additional discriminant in performing searching and matching. The loop centers around a Core. When there is a nearby Delta or another Core, the ridges that run between the two can be counted.

A novel and unique approach was developed to determine Core to Delta and Core to Core pairs for which methods for automated ridge counting could be performed, and for which the results would correspond to practices of the fingerprint identification community (i.e. for loop classifications). We have coined the expression "associated pairs", which we search to identify and when identified perform ridge counting between. For an associated pair, there is ridge flow between them that can be counted and classified consistent with the fingerprint identification community.

A pair meets the criteria of being "associated", if we can trace a path of constant value ridge angle (reading from the Ridge Angle Map, $\Theta_{smooth}$) as we traverse across the ridges from one feature to the other. The trace path must connect the two features. The path is typically a curved path. After it is verified that such a path exists, ridge counting is performed on the basis of drawing a straight line between the two associated features.

Figure 32:
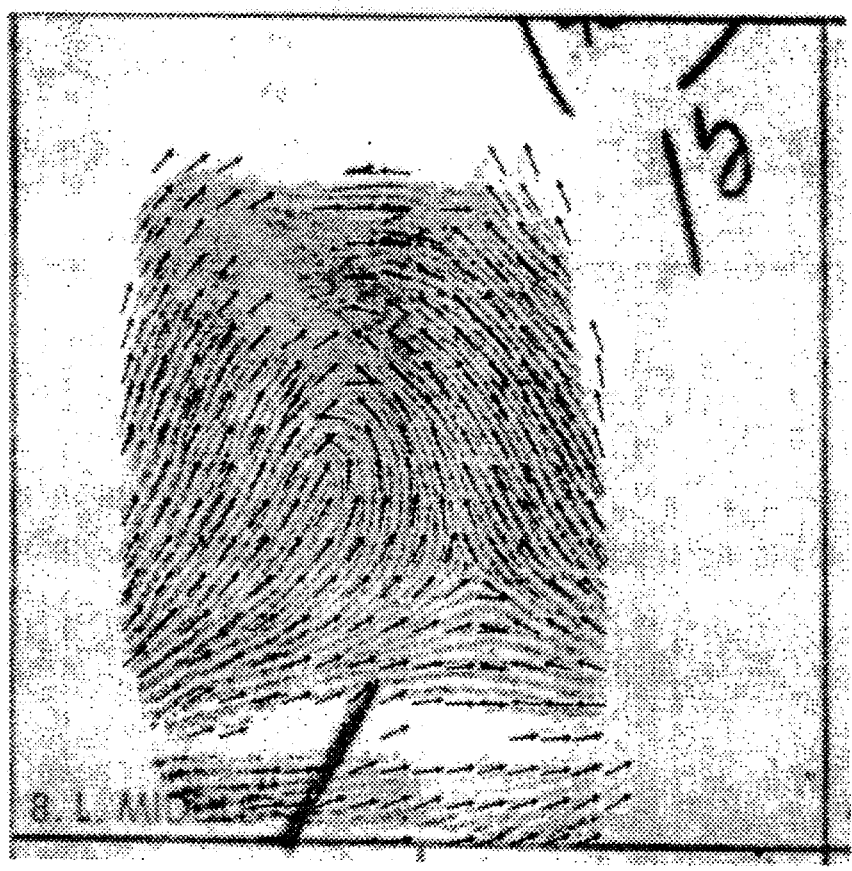
FIG. 32 is the gray scale image of FIG. 3 with ridge vectors superimposed thereon.

Referring to our example fingerprint in FIG. 3, a loop of ridge flow about a Core can be seen slightly left of center in the image. In FIG. 32, vectors of ridge angle (Coarse Ridge Angle Map, $\Theta_{final}$) about the core clearly show the looping flow. In both figures, to the right and below the Core, a Delta is seen in the image. It can be seen in the figure that for a straight line drawn between this Core and Delta, ridge counting can be performed proceeding along the line from one to the other. An objective was to create a detector for identifying both Core/Delta and Core/Core pair associations where ridge counting was consistent with established fingerprint science practice. The name chosen to assign for such feature relationships was Associated Feature Pair (Associated Pair).

A preferred method was developed for detection of Associated Pairs. In FIG. 32, note that the ridge angle vectors between the two features transition from a Northeasterly direction, to North, and then to Northwest. At some point along each ridge, a point on the ridge can be found where the fine resolution vector of $\Theta_{smooth}$ points due North. This characteristic is a result of the nature of the recurving ridge flow about the core. Hopping across ridge flow from one successive due North pointing vector to the next will trace a continuous path between the two features. The "due North" is a constant value ridge angle, as we defined as a previous criteria for an Associated Pair. Other constant ridge angle paths could also be traced.

The angular coordinate axis was selected to be orientated such that due North is zero degrees. Ridge angle vectors rotated slightly clockwise of due North have small positive angle values. Those rotated slightly counterclockwise of due North, have angular values that are in the range of 179 to 180 degrees. The point is that there is a discontinuity in angle in passing through due North. The existence of this discontinuity in ridge angle is used to implement an algorithmic process that can perform rapid "constant ridge angle" trace path building, proceeding from one feature, across ridge flow, to the surrounding area, looking for an ending at another feature.

Figure 33:
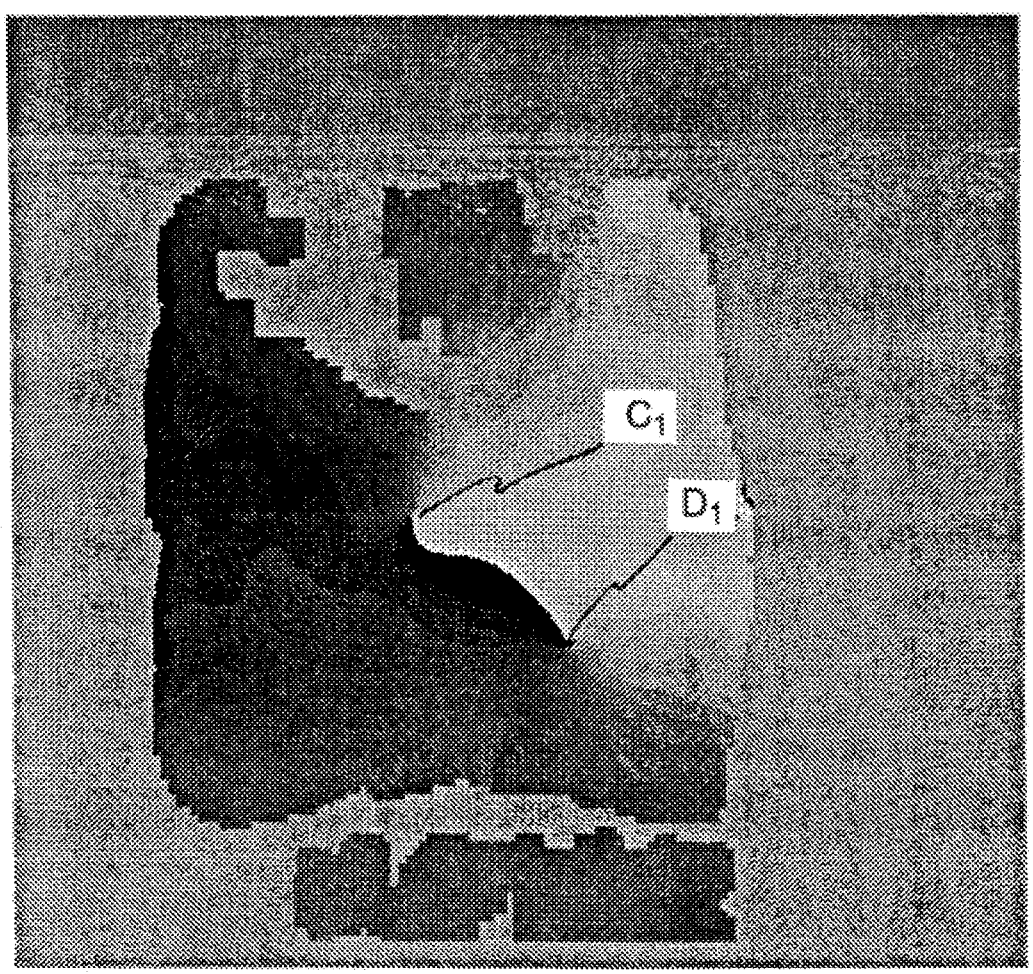
FIG. 33 is a derived gray scale image, from a fingerprint Ridge Angle Map for the fingerprint of FIG. 3, denoting the location of an associated Core and Delta by the end points of a curved constant ridge angle line that connects them, the characteristic identifier, which is visible by the distinct transition from black to white.

The result of "constant ridge angle" trace path building that utilizes the 0 to 180 degree angular discontinuity is illustrated in FIG. 33. This image is for the fingerprint of FIG. 3. The trace followed and found between the Delta D1 and the Core C1, is a line defined by the transition between pure white and jet black. In FIG. 33, the fine grain resolution Smoothed Ridge Angle Map, $\Theta_{smooth}$, is plotted with the angular values converted to shades of gray. Pure white is 180 degrees and jet black is 0 degrees.

The angular discontinuity method developed works very well and provides efficiency in processing. If the fingerprint of FIG. 3 were rotated off the slightly arbitrary (fingerprint recording process dictates that the image be placed on the fingerprint card in vertical orientation, within a defined vertical rectangle) vertical orientation it now possess, continuity of tracing would be found from feature to feature but the path appearing in FIG. 33 would be a different curved line. Use of the discontinuity feature depends on selection of zero degrees to have upward pointing orientation, and the fact that looping type ridge flow occurs upward on a fingerprint, not horizontal or downward. The discontinuity method is applicable to all orientations through angular transformations or through successive reorientations of the coordinate system zero pointing. The current implementation is adequate, and the need for the broadest general case implementation has not been proven necessary to implement to date.

Implementation Overview

Figure 34:
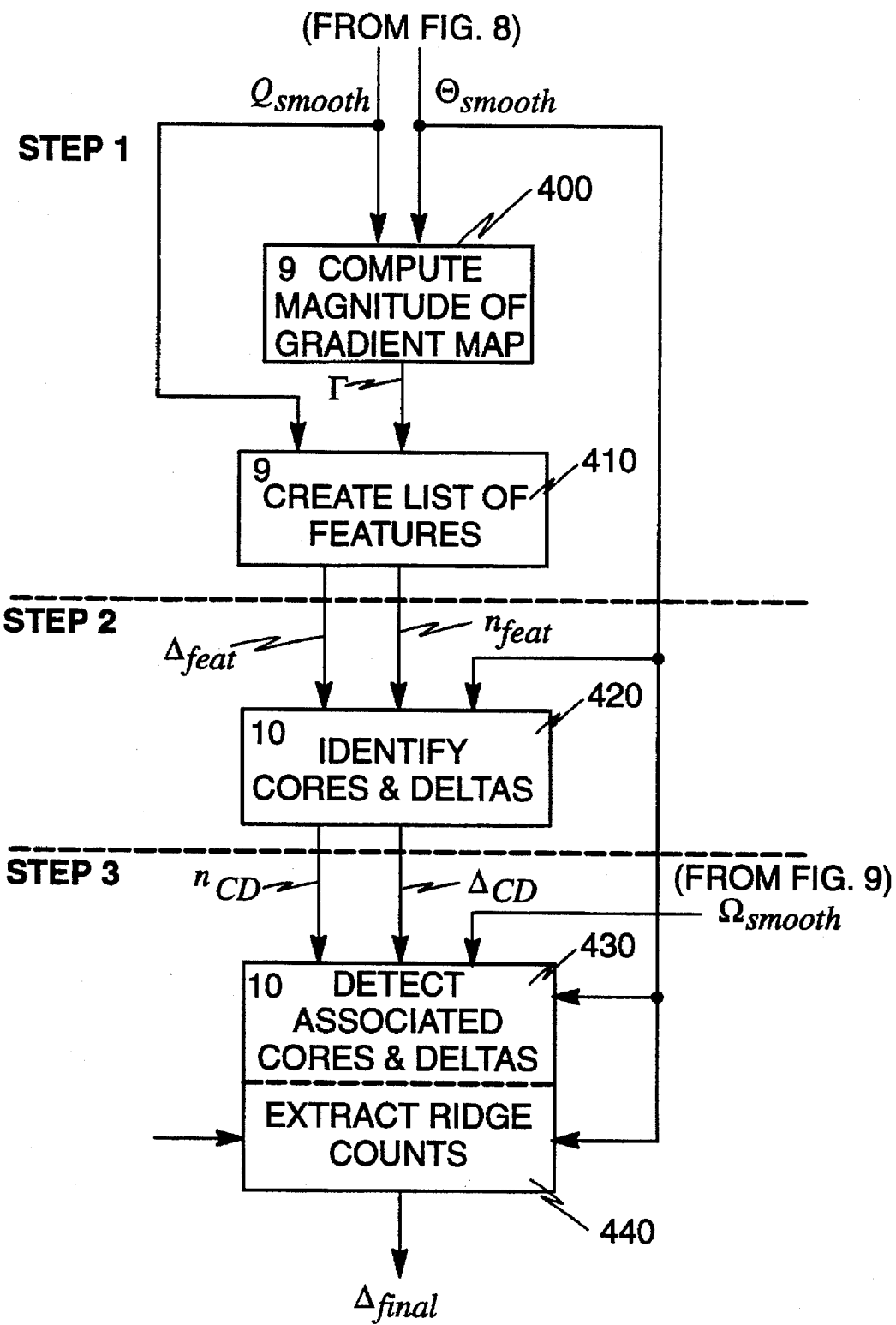
FIG. 34 is a simplified block diagram showing generally those components of the Encoder which are used to identify and locate Cores and Deltas within a fingerprint.

Shown in FIG. 34 is the overall set of processes applied to Core and Delta detection and measurement and collection of data relating to them. The numbers in the processing blocks correspond to the numbered functions of Table 2. In developing the algorithmic methods, the partitioning into three distinct steps became desirable. These steps are identified in the figure. A detailed block diagram of these steps with call-outs to the particular algorithms appears in FIGS. 35 and 36. The detailed walk through the functioning is addressed in the next section. This section describes the process at the higher level of FIG. 34.

FIG. 34 depicts the preferred embodiment for finding Cores and Deltas within a fingerprint, recording their coordinate locations and other data, as per an the overall system objective recording data that relates to quality and confidence of declaration and data. The inputs to this function include the Smoothed Quality Map $Q_{smooth}$ from block 160 of FIG. 8, the Smoothed Ridge Angle Map $\Theta_{smooth}$ from block 170 of FIG. 8, and the smoothed Ridge Frequency Map $\Omega_{smooth}$ from block 190 of FIG. 9. This combination contains sufficient information to reliably extract Cores and Deltas. The processing that identifies them, extracts their location and other data, and provides a confidence metric is embodied in Algorithms 28–35, found in the appendix. The extracted information is saved to the Products File 50, 60.

Figure 36:
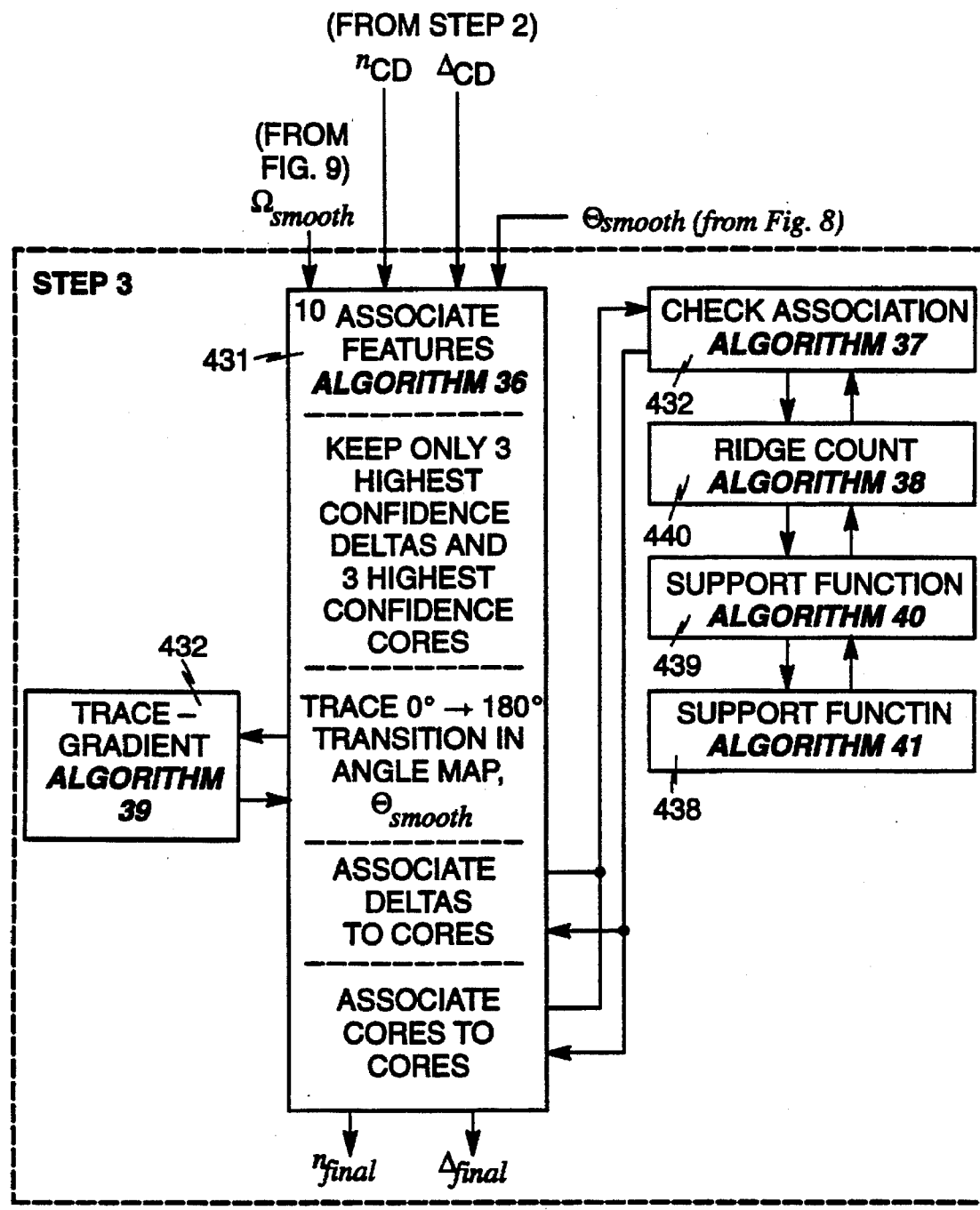

Once Core and Delta features have been detected and recorded, determination of Associated Pairs is made. This is followed by calculation of the straight line distance between the two associated features as measured both in units of pixel count and ridge count.(FIG. 36). The Core and Delta pairing knowledge serves as an input to classification of the fingerprint as performed by the Classifier 40 (FIG. 1). Additionally, the ridge count information is a metric that is stored in the Products File 50, 60 so that it can be passed forward to be employed by the Search Filters in narrowing the File Candidate list passed onto the Matcher 80. Pixel count distance is useful to the Classifier. Algorithms 36–41, contained in Appendix A, perform the processing that determines Core and Delta feature associations and calculates the distances between member pairs in units of measure of both ridge counts and pixel counts.

The ridge and pixel count can be reliably determined because of the strength of the algorithms for ridge angle and ridge frequency measurements and mappings. Accurate ridge counts are obtainable even when the ridge flow between features is not continuous as a result of scars, poor inking, or generally poor image quality. The consistent availability of ridge count information measured between Core to Delta and Core to Core pairings provides another metric that is incorporated as a discriminate for the Search Filter to employ, so that a further reduction of the search field of potential File Candidates can be achieved. This subsequently reduces the workload requirements imposed on the Matcher element of the system. The benefits that result are a combination of both a faster throughput through the Matcher 80 and reduced hardware costs. Algorithms 28 through 41 identify and record the Cores and Deltas that meet the criteria of Associated Feature Pairs, and calculate and record the ridge and pixel counts between them.

Step 1 identifies all potential features through measuring the gradient across the fingerprint image and storing the measured values in a gradient map $\Gamma$. A matrix titled Feature (symbolically as $\Delta$) is created to contain all core and delta feature data. The data structure and contents of the matrix is found in Table 4. Core features are distinguished from delta features via the TYPE element of the matrix. The data that is measured and extracted for each feature is sequentially loaded into $\Delta$ as procedural Steps 1 through 3 are performed.

To describe the status of the matrix as it is sequentially filled the following symbolic representations are used: $\Delta_{empty}$, $\Delta_{feat}$, $\Delta_{CD}$, and $\Delta_{final}$. Each row of $\Delta$ contains all the data pertaining to one particular feature. Each column is designated to be a different data element describing features. The variables $n_{feat}$, $n_{CD}$, and $n_{final}$ are used to indicate the number of total features described and stored in the matrix; they correspond to like named states of $\Delta$.

In FIG. 38 the sequential entry of data into $\Delta$ is illustrated for each of the three steps. The number of entries is reduced in progressing from Step 1 through 3 as features in the list are discarded because they are cannot be authenticated as Core or Delta, or they are of low confidence value. In Step 3, the list is reduced and reordered, currently to a maximum of six features. All features of "unknown" type are discarded. Then the list is further reduced. First the three Cores with highest CONFIDENCE among recorded Core features are kept and placed within the three first positions in $\Delta$. Likewise the three Deltas with highest Confidence are kept and placed in $\Delta$ row positions following the Cores.

Detailed Implementation:

Step 1: Identify Features

Figure 35:
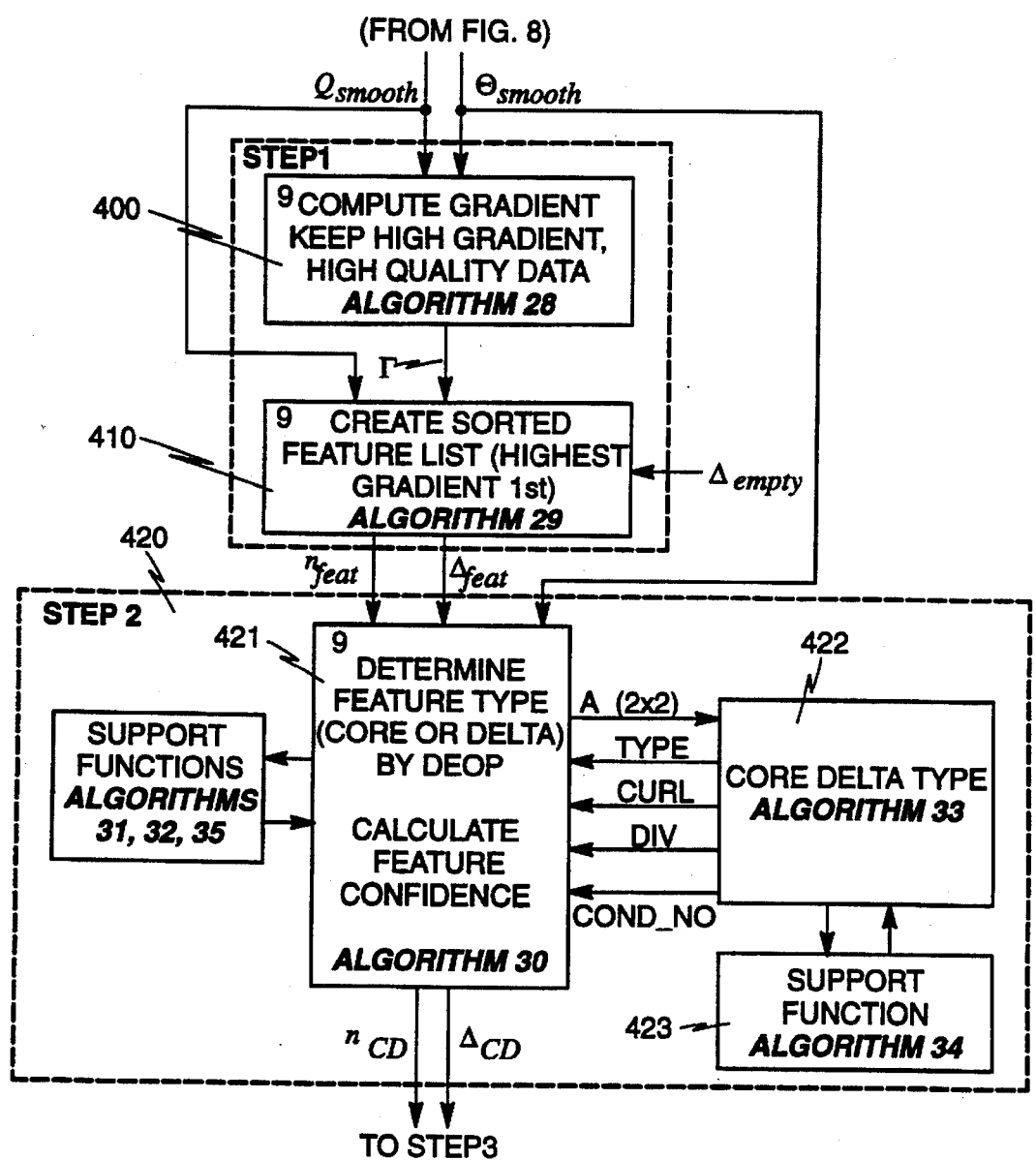
FIGS. 35 and 36 are simplified block diagrams showing the steps and elements used in determining the location of cores and deltas.

Following the procedural steps starting at the top of FIG. 35, the algorithms function as follows. Potential features in the fingerprint are identified in block 400 by first taking the gradient of the $\Theta_{smooth}$ from block 190 of FIG. 11 and then determining the MAX_GR_POINT largest gradients. The locations of these points represent possible Cores and Deltas. Algorithm 28 calculates the gradient across the image and produces a gradient matrix $\Gamma$ that maps the gradient of the fingerprint image.

Since noise in the Smoothed Ridge Angle Map can also produce high gradient areas, it is necessary to discard those feature points whose quality is less than QUAL_THRESH. The threshold used is 0.25. In this process, the image quality map, $Q_{smooth}$, is employed by Algorithm 28. Also, to limit the number of feature areas under consideration, only those points that have gradients larger than GR_THRESH are considered. The high gradient areas of $\Gamma$ that survive the quality and minimum gradient post filtering are ranked or placed in $\Delta$ in order of descending gradient.

In block 410, algorithm 29 uses, as inputs, the maps $Q_{smooth}$, and $\Gamma$. From these, it determines the presence of features and data related to each feature. The data determined for each feature is: location, XPOS, and YPOS; average image quality in the vicinity of the feature; QUALITY; and the maximum gradient, GRADIENT, for the feature. The matrix $\Delta_{empty}$ is loaded with the feature data and becomes $\Delta_{feat}$ with $n_{feat}$ entries.

In Algorithm 29, each feature is assigned an average image quality value (QUALITY) that is determined by calculating the average quality in a FEAT_SIZE by FEAT_SIZE region (typically set at 13 by 13 pixels) around the feature location.

Upon exiting Algorithm 29 (end of Step 1) each identified potential feature has values determined and entered in $\Delta$ for X and Y location, maximum value gradient in the location vicinity, and the average image quality in the location vicinity.

Step 2: Identify Feature Type

Overview:

In Step 2, the potential features listed in $\Delta_{feat}$ in block 420 are examined to determine if they fall in the class characteristics of Core, Delta, or Unknown. For Cores, it is also determined if they are a Loop Core, or a Whorl Core. The type determination is stored in the TYPE element of $\Delta$. Also, a confidence number relating strength and quality of the detection is calculated and stored in the CONFIDENCE element of $\Delta$.

In block 421, algorithm 30 is the primary processing algorithm for Step 2. It cycles through all the listed features and applies the Direct Estimation (DEOP) methods used to establish linear coefficient matrix of a vector field that describes the feature. Algorithm 30 utilizes Algorithms 31 through 35 in its processing. Algorithm 33 is applied after the linear coefficient matrix has been assembled by Algorithm 30 for each potential feature in $\Delta_{feat}$. From the 2 by 2 "A" matrix, In block 422, algorithm 33 determines and returns numerical values for TYPE, CURL, DIVERGENCE, and CONDITION (Condition Number); all of which are finally loaded by Algorithm 30 into $\Delta$. Algorithms 31, 32, 34, and 35 are all support algorithms that provide text book matrix and eigenvalue operations. The functions of these support algorithms are described in Table 5, and the pseudo code for implementation included in Appendix A. The functioning of these support algorithms will not be discussed further than the descriptions provided in Table 5.

Detail of Operation

The Smoothed Ridge Angle Map, $\Theta_{smooth}$, from block 170 of FIG. 8, which indicates at each point on the image the orientation of ridge flow, is used to create a vector field representation for the fingerprint image. It was found through experimentation that Core and Delta regions formed patterns that can be identified by employing algorithms which calculate the coefficients for a linear approximation to the vector field.

DEOP (Direct Estimation of Orientated Patterns) methods were adapted and uniquely applied to fingerprint images to detect and measure dynamic flow around Cores and Deltas. (A somewhat different application of DEOP methods was described earlier for ridge angle measurement of ridge flow; a static field detection and measurement application). The DEOP methods are embodied in Algorithm 30. The algorithm performs a least squares minimization of the measured field with respect to the linear approximation.

The resulting coefficients (comprising matrix A) are then used by Algorithm 33 to compute the vector curl, divergence, and deformation, from closed form expressions. These parameters are sufficient to classify the vector field data into one of the following pattern types: Node, Star Node, Improper Node, Spiral, Center, and Saddle. Experimentation with fields generated from $2*\Theta_{smooth}$ data resulted in patterns at feature locations that closely resembled one of the six types. Deltas, for instance, are transformed into saddle points; whorl cores became center patterns; and loop cores were directed to one of the Node or Spiral patterns.

Computation of a reliable confidence measure was a second benefit extracted from the application of DEOP methods. The condition number, COND_NO, of a 2 by 2 Linear Coefficient Matrix, when combined with the feature's QUALITY and GRADIENT measures, produced a value that could be used to filter out false Cores and Deltas. The computation that was established to provide a useable result is:

CONFIDENCE=((QUALITY*GRADIENT)/CONDITION)/1000

Algorithm 34 calculates the condition number, COND_NO, for the 2 by 2 linear coefficient matrix, A. Algorithm 30 performs the calculation to determine CONFIDENCE and enters it and COND_NO into the appropriate elements of Δ.

The output from Algorithm 30 (exit point of Step 2) is $\Delta_{CD}$ and $n_{CD}$. At this stage the check marked entries indicated in FIG. 38, Step 2, have been placed in Δ.

Step 3: Find Associated Pairs and Calculate Pair Separations
Overview:

The third step in the process is described in connection with FIG. 36 and involves associating features and computing ridge counts. Algorithm 36 tailors the number of feature entries kept in Δ. The highest confidence Cores and the highest confidence Deltas are kept and moved to the first rows of Δ in $\Delta_{final}$. Unknown type features are not retained. The very first processing operations of Algorithm 36 performs this culling of the list. A maximum of 3 Cores and 3 Deltas are kept. The Cores are placed ahead of the Deltas in the list.

The first operation is computation of pairing associations for each of the three largest confidence Cores and Deltas found in the fingerprint. A feature pair is considered associated when they can be traced to one another along a path characterized by a zero and 180 degree ridge angle values in the Smoothed Ridge Angle Map. Delta to Core associations are first searched for, and then Core to Core associations. The following operation is to calculate the ridge counts between associated feature pairs. This is accomplished by calculating the line integral of the vector frequency along a straight line from one feature to the next, FIG. 37. The line integral can yield a value with a decimal component (FIG. 37), when a visual counting yields an integer number of ridges counted. The accuracy of the calculated value is ±0.5 ridge counts. The number is kept in decimal format because truncating or rounding would increase the potential error.

Detail of Operation:

In block 431 of FIG. 36, Algorithm 36 is the main processing algorithm for Step 3. Algorithm 36 loops through all the $n_{CD}$ features of $\Delta_{CD}$ and determines which Delta/Core and which Core/Core are of the class defined as Associated Feature Pairs.

In block 432 Algorithm 39, TRACE GRADIENT, is utilized by Algorithm 36 to trace a path of constant value ridge angle (reading from the Ridge Angle Map, $\Theta_{smooth}$) while traversing across the ridges from one feature to the other. The trace path must connect the two features. The zero to 180 degree angular discontinuity is the constant value ridge angle of choice used. As earlier explained the jet black to white transition line runs from the Delta to the Core in FIG. 33, illustrates successful trace establishment between a Core and a Delta, that results in declaring them an Associated Feature Pair. The line is the trace line for constant Smoothed Ridge Angle of 0/180 degrees. A total of 5 data index storage locations for each feature has been set aside in the data structure of Δ for saving the identities of the mating feature of each Associated Feature Pair. The output of Algorithm 39 is the row and column location index numbers of $\Theta_{smooth}$ where the trace of the path ends.

Figure 37:
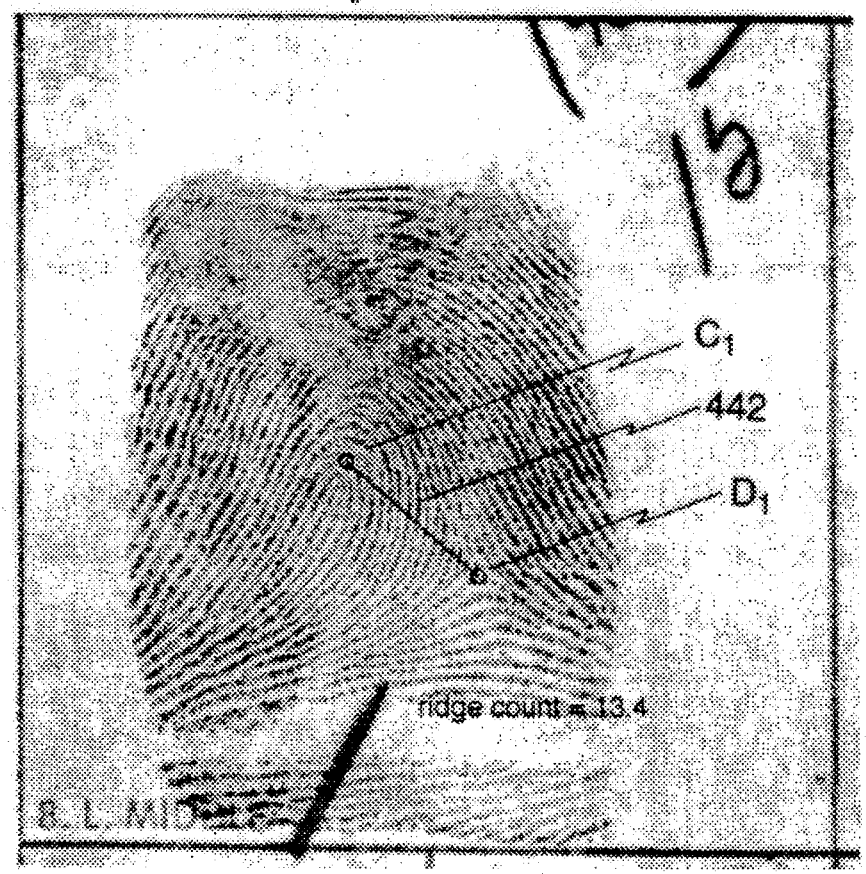
FIG. 37 is the fingerprint of FIG. 3 with an associated core and delta pair identified, and a straight line drawn connecting the pair for use in deriving ridge count therebetween.

With the trace ending data from Algorithm 39 returned, Algorithm 36 in block 431 invokes Algorithm 37 in block 432, CHECK ASSOCIATION. The sequence which Algorithm 36 follows is first to look for Delta to Core associated pairings that exist, and then to look for Core to Core associated pairings. Algorithm 37 compares the XPOS, and YPOS location of all other features in $\Delta_{CD}$ to determine if they are in the vicinity (within 1 wavelength) of the trace ending(s) found by Algorithm 39. For identified Associated Feature Pairs, Algorithm 39 calculates the pixel count distance between the paired features and then invokes Algorithm 38, RIDGE COUNT in block 440 to obtain the ridge count distance between them. The ridge count taken across a straight line 442 drawn between the two features is illustrated in FIG. 37.

Algorithm 38 determines the ridge count between two associated features. It utilizes $\Theta_{smooth}$, $\Omega_{smooth}$, and column and row location information to yield "ridge_count" as a returned value to Algorithm 37. In performing its calculations Algorithm 38 is supported by Algorithm's 40 and 41, each text book level support functions as described in Table 5.

Algorithm 36 is returned the determination of associations and accompanying ridge and pixel counts from Algorithm 37. It is returned this information with the "Associated Feature" elements of Δ, as illustrated in FIG. 38 for Step 3, filled with the extracted data. The N_ASSOC element indicates the total number of associations found, and the number of ASSOC_#, RDGCNT_#, and PXLCNT_# locations data will appear in. The ASSOC_# entries are integer numbers that point to the IDX index number of the associated features.

The output from Algorithm 36 (exit of Step 3) is $\Delta_{final}$ and $n_{final}$ for which the associated feature data as illustrated in FIG. 38 has been added to Δ. For each feature the element "$n_{assoc}$" indicates the total number of other features found to be associated. For a given feature and numeric value of its $n_{assoc}$ there are a corresponding number of entries in the ASSOC_#, RDGCNT_#, and PIXCNT_# elements of Δ (where # is 1 to 5). This is illustrated in FIG. 38. Any element ASSOC_# entry contains an integer number which points to the IDX element number of the associated feature. The corresponding numbered elements RDGCNT_# and PIXCNT_# contain the ridge count and pixel count to the associated feature.

STORE DATA FOR LATER USE

A Products File is the file that retains the Advanced Encoder results as a readable record for later use by the Matcher 80. For a person of record (criminal or other offender of note) whose fingerprint products data is going to be retained, the Products File goes to the repository device (disk drive, optical drive, etc.) that is designated as the repository for the Products File database. The data so retained is then used by the Search Filter, and the Matcher over and over again in the future whenever search's are conducted to identify individuals arrested or at the Scene of the Crime. For a Search Candidate's fingerprints processed through the Advanced Encoder, the Products File data is sent to a storage device where it can be retained until the workload queue of the Search Filter and Matcher stage of the system are free, and a search against the Products Files stored in the repository database can be initiated.

The Products File in some cases contains data exactly as extracted and used by the Advanced Encoder. The Minutiae data is an example. In other cases the data is down-sampled to conserve storage capacity requirements, and to make searching and matching proceed faster; Ridge Angle and Ridge Frequency Coarse Maps are examples. In still other cases multiple pieces of Advanced Encoder data are combined into one Products File data element in order to provide some unique and fast processing capability to the Search Filters or Matcher. The Coarse Map of Image State, $Q_{final}$, or Final Quality Map, is an example.

The Data Elements of the Products File are listed in Table 1. Fingerprint card textual data and/or any operator data is loaded into the Products File early on via optical character reader, or manual input device. Only one data element comprising the fingerprint characteristics comes from the Classifier; it is Pattern Class that includes primary and subordinate class identification.

Figure 39:
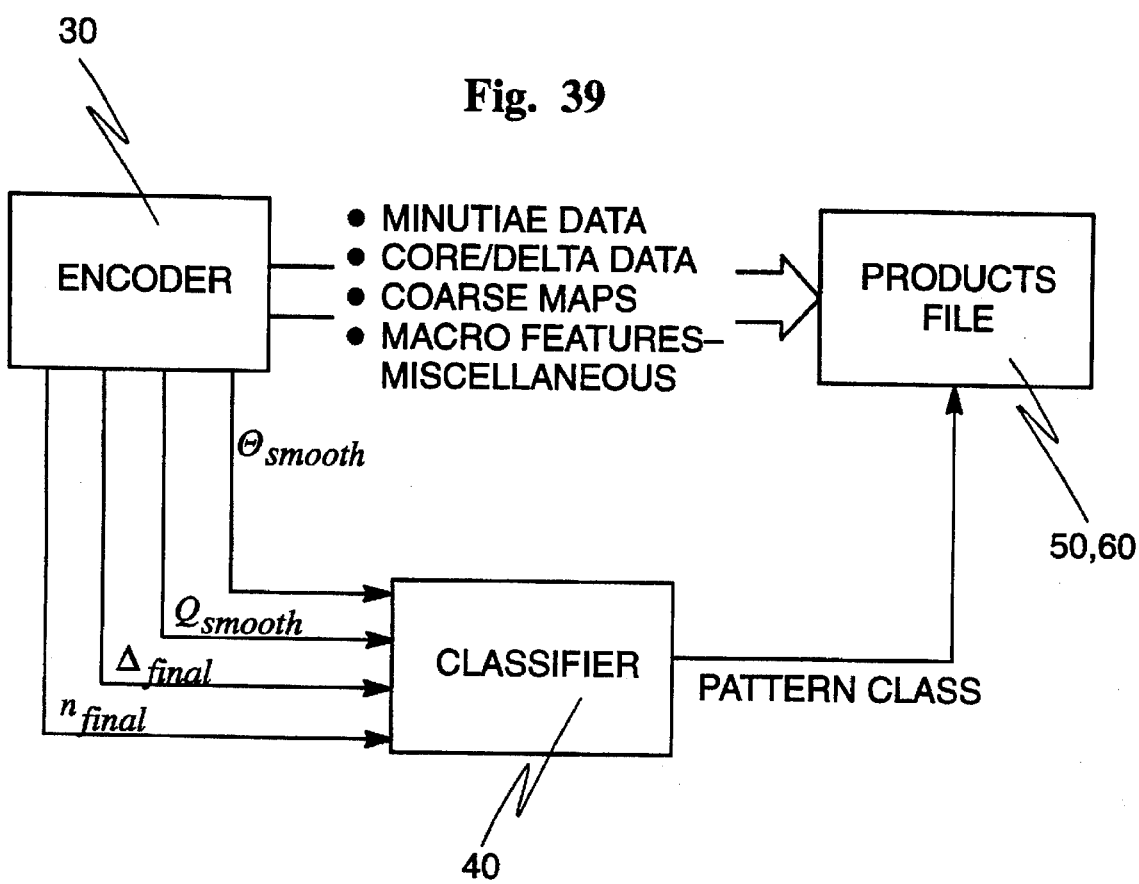
FIG. 39 is a simplified block diagram showing transfer of data from the Encoder and Classifier to the Products File, and transfer of Encoder data for use in the Classifier.

Certain Data from the Advanced Encoder's processing of an individual's 10 print cards or a set of latents is temporarily retained for use by the Classifier, whose evaluation of the fingerprint images directly follows that of the Advanced Encoder. This transfer of data for temporary retention and use by the Classifier is illustrated in FIG. 39.

The transition of data from the Advanced Encoder Data to the elements of the Data Products file is illustrated in FIGS. 40 and 41. The creation of Products File data proceeds as follows:

For Minutiae Lists

The data is directly transferred to the corresponding Products File elements.

For Map Matrices

The column ($n_{col}$) and row ($n_{row}$) dimensions of $\Theta_{smooth}$, $\Omega_{smooth}$, $Q_{smooth}$, $f_g$ and $f_m$ are each purposefully established so that they are each an integral multiple of 16. Where control of the column by row dimensions of the full scale image is possible it would be adjusted to insure this correspondence. Where it is not possible, and the down sampled image does not support the integral division by sixteen, then the 5 matrices and $I_{DSCE}$ are set to nearest next larger $n_{col}$ by $n_{row}$ dimensions which are divisible by 16. The extra cells in $I_{DSCE}$ created to accomplish this are filled out with null information (i.e. data that is characteristic of the background, the fingerprint card with no inking).

Looking to FIG. 40, it is seen that the Products File matrices $\Theta_{final}$, $\Omega_{final}$ and $Q_{final}$ are each formed from a combination of data, rather than just the smoothed source matrices of similar name. The objective is to form matrices that enhance the decision process, and the efficiency of processing in the Matcher 80. As illustrated in Table 1, $\Theta_{final}$, and $\Omega_{final}$ have been defined to be coarser by a factor of 16 than their source matrices. $Q_{final}$ has been designated not to be as coarse, it is coarser by a factor of 8, compared to its source matrices. The matrix $Q_{final}$ is determined from data held in 4 source matrices. These matrices map the fingerprint and are very powerful support to the Matcher operation and performance.

In order to form the data inputs for $\Theta_{final}$, $\Omega_{final}$, and $Q_{final}$, an intermediate and temporary matrix is first formed. It is $Q_{coarse}$, which has the dimensions of $$\frac{n_{col}}{16} \times \frac{n_{row}}{16}.$$

For a full size gray scale image of dimension 512×512, the "smooth" matrices have the dimensions 256×256, and the dimension of $Q_{coarse}$ is 16×16. The 256 cells of $Q_{coarse}$ are filled by sequentially considering the data within each of 256 16×16 cell submatrices of $Q_{smooth}$ that in total comprise all the cells of it. Each of the 16 cells within a submatrix are examined to determine if the stored cell value is below a fixed poor quality threshold. If 75% of the cells are below a quality of 0.5 for $Q_{coarse}$, then the cell is dubbed as poor quality.

If 75% (12 cells) are below the threshold then: the corresponding $Q_{coarse}(i,j)$ is set to 0; otherwise $Q_{coarse}(i,j)$ is set to 1.

where:

$$i = 1,2 \ldots, \frac{n_{row}}{16} \text{ and } j = 1,2 \ldots, \frac{n_{col}}{16}$$

The submatrix starts at row=$(i-1)*16+1$ and col=$(j-1)*16+1$.

Forming the Coarse Ridge Angle Map, $\Theta_{final}$:

With the cells of $Q_{coarse}$ all determined and loaded with 0, or 1 as data, the $\Theta_{final}$ matrix cell data can be formed. The process is as follows:

Sequentially select each of 256 16×16 submatrices of $\Theta_{smooth}$. Each submatrix maps to a cell of $Q_{coarse}$.

If $Q_{coarse}(i,j)=0$ (i.e. poor quality), then set $\Theta_{smooth}(i,j)=255$;

Otherwise determined the entry data for $\Theta_{smooth}(i,j)$ by average from the 256 cells of the corresponding submatrix as follows $$\bar{c} = \frac{\sum_{i=1}^{16} \sum_{j=1}^{16} \cos\left(\frac{\pi}{90} \Theta_{smooth}(r_0+i, c_0+j)\right)}{16^2}$$

$$\bar{s} = \frac{\sum_{i=1}^{16} \sum_{j=1}^{16} \sin\left(\frac{\pi}{90} \Theta_{smooth}(r_0+i, c_0+j)\right)}{16^2}$$

Where: $(r_0+1, c_0+1)$ is the top left hand corner of a submatrix.

Then:

$$\Theta_{final}(i,j) = \frac{90}{\pi} \tan^{-1}(\bar{s}, \bar{c})$$

Where: $\tan^{-1}$ is the 4 quadrant arctangent

Then: Round $\Theta_{final}(i,j)$ to nearest degree

Note: then resultant angular range is 0 to 180 to the nearest degree

Forming Coarse Ridge Frequency Map $\Omega_{final}$:

Like $\Theta_{final}$, $\Omega_{final}$ is also a $$\frac{n_{col}}{16} \times \frac{n_{row}}{16}$$

matrix. To build $\Omega_{final}$, we simply sample every 16th point of $\Omega_{smooth}$, and set $\Omega_{final}(i,j)=\Omega_{smooth}(i,j)$ and then scale all of $\Omega_{final}$ with fixed scale factor. The scale factor is 1,000 with a maximum limit on the result set at 255. The scale factor was chosen so that the range of occurring frequency values across the population of all fingerprints are represented within the range of 0 to 255.

Forming Final Quality Map $Q_{final}$:

For the Products File map, Final Quality, a set of algorithms are employed that combine Quality data and minutiae data outputs of the Advanced Encoder. This process is described in the descriptions of operation of Algorithms 25, 26, and 27 that are described in with the Minutiae finding and recording description. The map is a unique product that is very effective in the Minutiae Matcher for speeding the matching evaluations, incorporating Quality level in the matching evaluations, and implementing dual hypothesis matching into the matching process. The following provides a summary level description of the process of entering data into the cells of $Q_{final}$:

The size of the matrix is $$\frac{n_{row}}{8} \times \frac{n_{col}}{8}$$

The value for entry data into each of the 1024 cells is determined by applying the following rules:
1. Initially set all cells of $Q_{final\_}=0$. In $Q_{final}$, zero represents that the 16×16 pixel area of the full resolution gray scale image is either fingerprint card background, or poorly inked, where it cannot be determined if there is ridge flow or minutia
2. Following the next sequence:
   If the average Gabor Filter value stored in the 8×8 region of $f_g$>fixed threshold of 12,000;
   and, if the average quality value in the 8×8 region of $Q_{smooth}$ is >a fixed threshold value of 10; and, if maximum ratio of $$\frac{|f_m|}{|f_g|},$$

or $\mathfrak{R}$, in the 8×8 region is <1 then set $Q_{final\_}(i,j)$ to −1, signifying a strong determination has been established that the 8×8 region is of an area of good image quality which has no minutiae
3. Sequentially loop through the Minutiae List, matrix $M_{final}$. Considering the position in the image (XPOS and YPOS) of each minutia, set each cell of $Q_{final\_}$ to +1 if its placement in the image is within one unit of the minutia's position. The +1 is defined as signifying a minutia's neighborhood.

Figure 30:
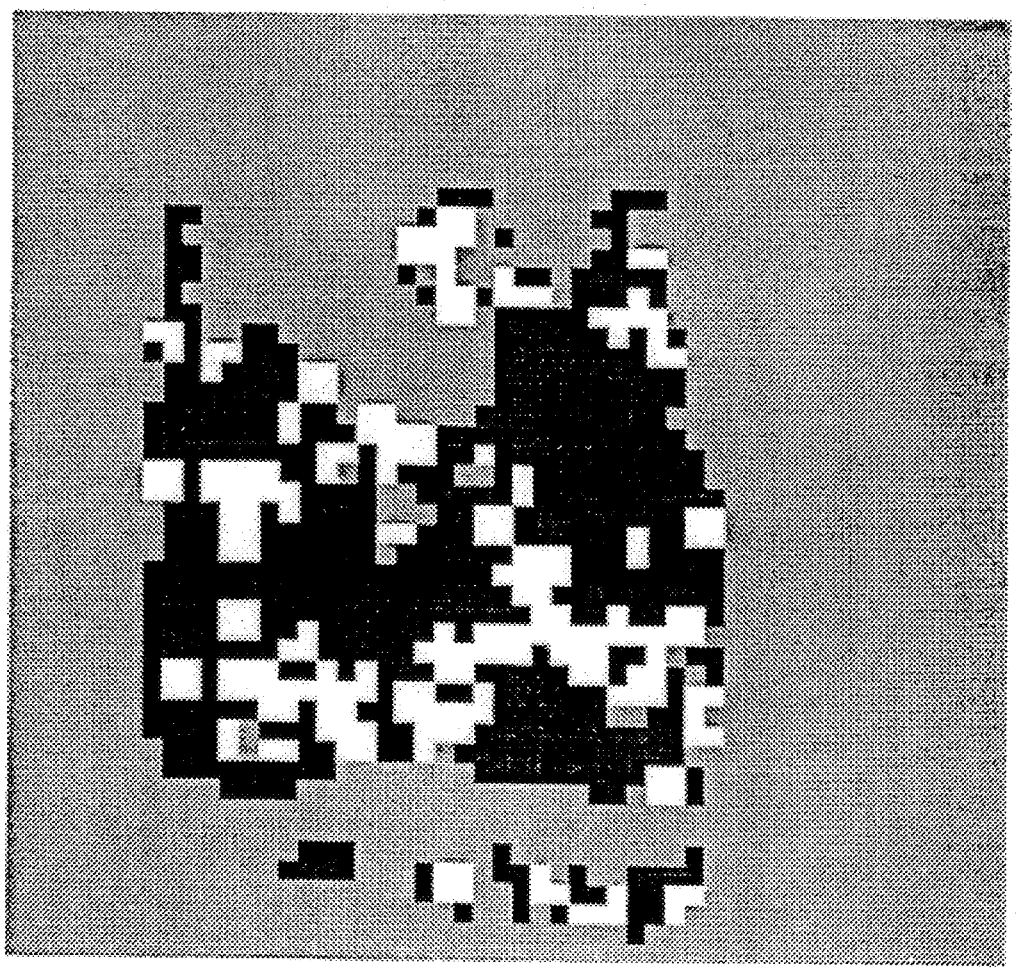
FIG. 30 is a Final Quality, or Image State, map of the fingerprint of FIG. 3.

The result of these operations is the matrix of $Q_{final\_}$ which provides the Final Quality Map which is actually a composite Image State Map of the fingerprint with both quality, minutiae area, and non minutiae area information contained in it. This three state image map is illustrated in FIG. 30. The white areas are the +1 valued cells, the black are 0 valued cells, and the gray are the −1 valued cells.

Figure 31:
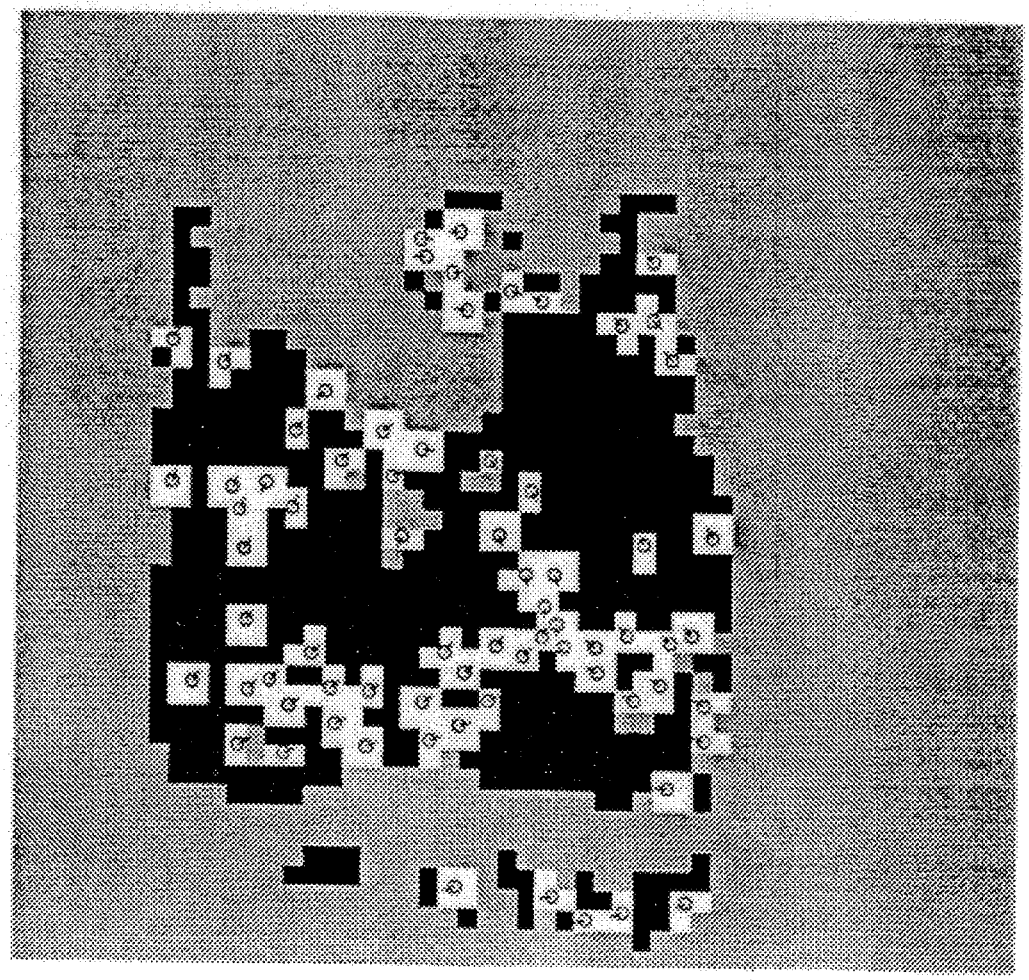
FIG. 31 is a Image State Map of the fingerprint of FIG. 3, with minutiae overlaid thereon.

The three states are conveyed into the matrix in the above operations through a layering process, starting out with the $Q_{final\_}$ cells at first all set to 0 or low (poor/unusable) image quality. Step B changes areas from poor image Quality, 0, to −1 indicating good image quality areas containing no minutiae. Step 3 further sets poor image quality "0" cells to +1 reflecting good image quality areas that contain minutia of high confidence. As a result of this process "0" takes on an additional meaning. The 0 cells left in the zero state for lack of ability to qualify for the other two states, are not necessarily just of the state of poor image quality, as a result of being remaindered. They could also represents areas where there is some indication of a good quality of the image where minutiae were detected, but by not above the threshold established to consider their existence with confidence. The definition in Table 3 delineates the three states. FIG. 31 shows the Image State map of FIG. 30 overlaid with minutiae Products File data elements associated with Core and Delta data comes directly from retention of the data of $\Delta_{final}$ from the Advanced Encoder. CONFIDENCE is transferred to the Products File element CD_QUALITY.

Finger Summary Products

There are three Products File Data Elements that are used to provide a global characterization of each fingerprint. They are 1) Average Print Quality (item C.1.b. in Table 1); 2) Dominant Mode Ridge Frequency (C.1.c.); and 3) Feature Area Count (C.1.d.). They have been defined as global level descriptors of the data available for each fingerprint image.

There are a total of 10 entries, one for each of ten fingers. In the Matching phase, they assist the decision process of which sets of fingers to use between Search and File 10 prints (or multiple latents) based on the consideration of best quality of available data. They are derived in the following ways:

Average Print Quality (Table 1, C.1.b.):
This Products File element is obtained by averaging all the values stored in all of the cells of $Q_{smooth}$, that exceed the fixed threshold of value 0.5.

Dominant Mode Ridge Frequency (Table 1, C.1.c.):
A histogram is calculated for all the elements of $\Omega_{smooth}$ whose corresponding cells in $Q_{smooth}$ exceed the fixed threshold of value 0.5. The frequency that has the maximum count occurring in the histogram is the value that is stored as being the Dominant Mode Ridge Frequency.

Feature Area Count (Table 1, C.1.d.):
This Product File element is equal to the count of cells in $Q_{final}$ that are non-zero.

THE SEARCH FILTER 70

The Search Filter selects those File Candidates for the Matcher which are a close likeness of the Search Candidate with regard to personal descriptive data and pattern classification (primary and subordinate class). A new additional sort, or down selection, criteria is used as a result of the Dominant Mode Ridge Frequency which is calculated and saved to the Products File by the Advanced Encoder for each of the 10 fingerprints on the ten-print card. When Dominant Mode Ridge Frequency is not near the same value for each of the ten fingerprints, with each finger Average Print Quality (also calculated and saved by the Advanced Encoder) showing "good quality" then the Search Candidate and File Candidate are not the same person and the Matcher is not employed.

DYNAMIC FINGER SELECTION FOR MATCHING UTILIZING BEST AVAILABLE DATA

After the Search Filter has produced a list of File Candidates for matching, with prior art systems the matching process begins and proceeds to perform the comparison by matching one to ten fingers, dependent on the number set by the system operator. Prior art systems proceed to use the specific finger numbers for the comparison as identified by the system operator, or programmed into the system. The specific fingers used are fixed set from one File Candidate to the next. The current system considers the quality of available data as stored in the Products File of the Search Candidate and each File Candidate. It functions to automatically adapt from File Candidate to File Candidate Products File so that finger numbers are designated for comparison such as to insure the use of the best quality and quantity of data available to conduct the total "n" finger comparisons on. It selects the "n" number of fingers as set by the operator, but it chooses the exact finger numbers to be used based on "best available data" between the one to ten search fingerprints and the corresponding file fingerprints.

Two data elements calculated and saved to the Products File by the Advanced Encoder provide for this capability. They are Average Print Quality and Feature Area Count. For each file there are ten pieces of data (one each finger). What is sought is that for each of the "n" fingers chosen to be used, that the Average Print Quality is simultaneously of high or good value for both the search print and the file print. Additionally the fingers are sought for inclusion on the basis that they are the set of fingers that have the most feature area for comparison, i.e.—that Feature Area values when added for all fingers on an assembled list of "to be matched finger numbers" are as high as possible and that feature area in Search Print and corresponding File Print fingers be as high and be similar valued so that there is a like area of features available from each to conduct the comparison.

In prior art systems it is unknown and uncontrollable whether the comparisons between a search fingerprint and file fingerprint are being performed with good or poor data. The dynamic selection process of the current embodiment provides for knowledge and control with regard to quality of data available in search and File Candidate's Products Files and regard to the extent of feature data available.

Selection of a specific finger number for comparison when, for instance, the Search Print is of good quality and the File Print of poor quality is avoided. However, a good quality ratings for both Search and File Prints is not taken as the sole discriminant for inclusion of a numbered finger on the list of fingers to be used in comparisons. The set of fingers that will yield the highest confidence comparisons are sought for inclusion on the comparison list. The availability of the Features Area Count Metric for each finger provides an additional discriminant to identifying the fingers which can yield high confidence comparisons. For example, using a finger having good quality data and great extent of feature area over which to conduct the comparison provides higher confidence in the results than a finger with good quality data but a limited feature area over which to compare. The occurrence of reduced feature area from fingerprint to fingerprint can be due to major scars, poor inking, or ink smudges.

THE MATCHER 80

The Matcher 80 includes two matching elements, a Coarse Matcher 81 and a Fine Matcher 82. Each Search and File Candidate Fingerprint pair to be compared are first processed through the Coarse Matcher 81, which scores the closeness of match between prints. Data from the Coarse Matcher is stored in a Coarse Matcher Products File 83.

The Fine Matcher 82 utilizes data produced by the Coarse Matcher as first order inputs to its matching algorithms. The Fine Matcher also scores the closeness of match. The processes used by the Coarse Matcher and the Fine Matcher have been determined to be fairly orthogonal in the mathematical sense, that is, they are fairly independent determinations or measures of the closeness of the match between prints.

Figure 42:
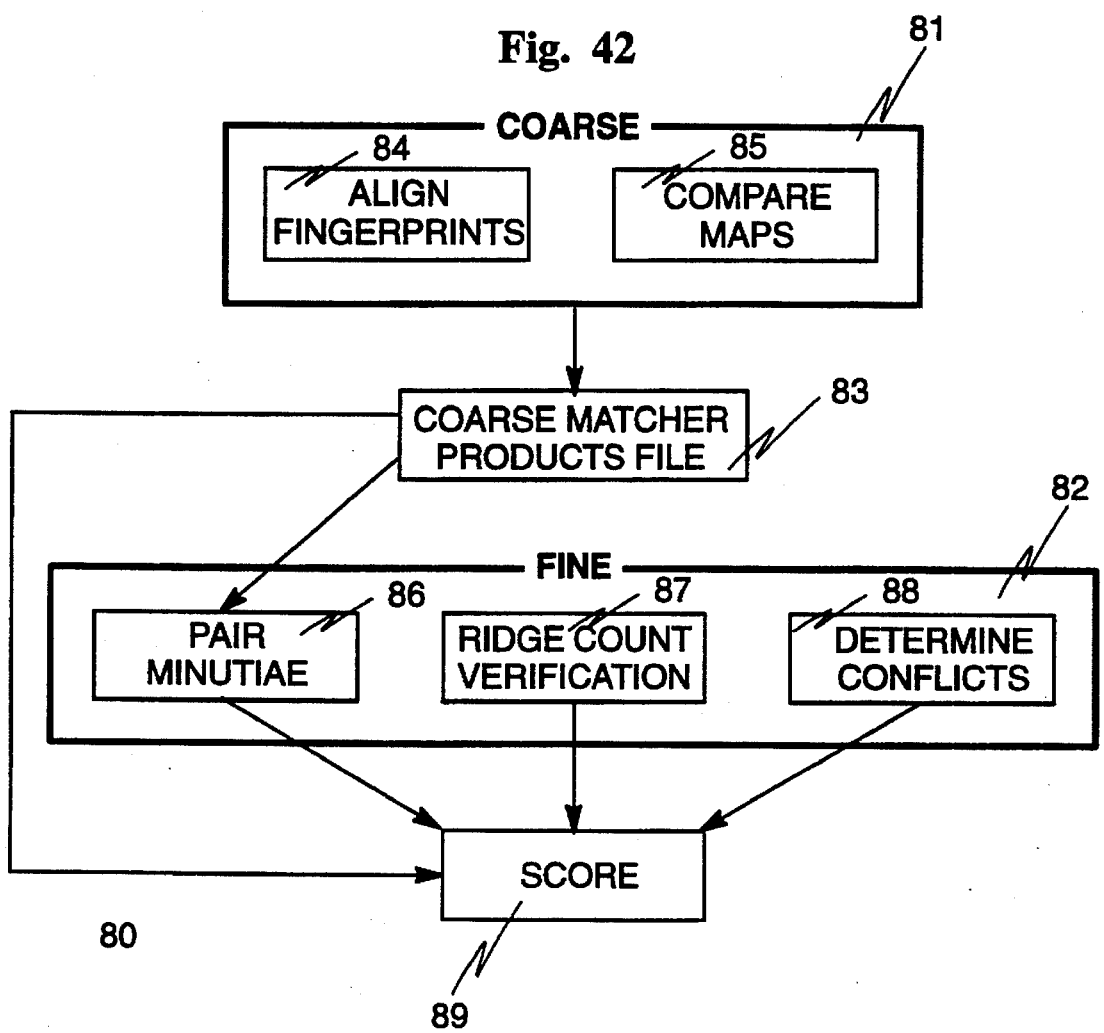
FIG. 42 is a simplified block diagram of the matcher component, including a Coarse Matcher and a Fine Matcher.

FIG. 42 shows the major components of the Coarse Matcher 81 and the Fine Matcher 82. The algorithms for both the Coarse Matcher and the Fine Matcher have been implemented in MATLAB and/or in C programming language. These algorithms are documented in Appendix B. A brief description of the algorithms precedes a step by step description of the algorithmic process that follow.

COARSE MATCHER 81

The Coarse Matcher 81 reads the file and search fingerprint data from the Advanced Encoder Products File 50, 60 and performs an alignment of the fingerprints in block 84 from which a search quality map in block 85 is refined. Section B-1 of Appendix B lists the algorithms that form the process of Coarse Matching of the fingerprints. Outputs of the Coarse Matcher are placed in a Coarse Matcher Products File 83 for later use by the Fine Matcher and use in collectively scoring the results of both the Fine Matcher and Coarse Matcher.

FINE MATCHER 82

The Fine Matcher 82 includes three components: 1) a Minutiae Pairer 86, 2) a Ridge Count Verifier 87, and 3) a Conflict Identifier/Resolver 88. The Minutiae Pairer 86 utilizes the refined quality map from the Coarse Matcher Products File 83 and data from the Products File 50, 60. The algorithmic processes employed pair up the minutiae using search fingerprint and file fingerprint data; the minutiae data being from the elements of $M_{final}$. The pairing of the minutiae between the file and search data is achieved by employing a relaxation method. The relaxation method pairs minutiae based on Support Functions, which provide a measure of the consistency of each minutiae pair with all other pairs, from which the most consistent set of pairings are extracted. Section B-2 of Appendix B describes the algorithmic processes of the Minutiae Pairer 86.

The remaining two components 87 and 88 of the Fine Matcher develop the metric of the scoring of the closeness of all minutiae matching evaluations performed between minutiae in good quality areas of the file fingerprint and corresponding overlapping areas of good quality in the search fingerprint. Those good quality areas known with high confidence to not contain minutiae (referred to as non minutiae areas) are also used in the scoring process based on the containment of such data stored in the image state map, $Q_{final}$, of the Products File 50, 60.

Non Minutiae Areas of one fingerprint (search or file) are compared to the corresponding area in the other fingerprint. If they are like areas (both minutiae bearing, or both non minutiae) then the scoring that measures "a match" is adjusted to strengthen the "good match" indication. If they are not like areas, then the scoring is adjusted to weaken the possibility of a "good match" indication. The comparison scoring of closeness of fingerprint match based on both knowledge of non minutiae and minutiae content we refer to as Dual Hypothesis Matching.

The Ridge Count Verifier component 87 forms constellations for the minutiae appearing in the Search Fingerprint and File Fingerprint. It can be said to dynamically form constellations because the selected group of minutiae from the search print will be different from one file fingerprint data record comparison to the next. (i.e. the constellation of the search fingerprint may change from one file fingerprint to the next) A different constellation results from always using minutiae from only those areas of the fingerprint that are of good quality in both the search fingerprint and the file fingerprint. It compares the closeness of match of the constellations to one another by counting the ridges between neighboring minutiae within each constellation.

Two ridge counts are obtained, one for the File Fingerprint and one for the Search Fingerprint. Ridge counting is accomplished using data stored in the Products File 50, 60 and an algorithmic process developed in Advanced Encoder for finding ridge counts between associated feature pairs of Core and Delta and Core and Core (Appendix A, Algorithms 38). The sequence of minutiae in each constellation having been previously established by the Minutiae Pairer 86 component of the Fine Matcher. A score of one is given if the ridge count difference is zero or one for each matched paired minutiae; if the ridge count difference is greater than one, then decrement the score by one. The score is recorded in block 89. Section B-3 of Appendix B describes the algorithmic process.

The Conflict Identifier 88 determines where conflict exists between minutiae of the Search Fingerprint and Minutiae in the same area neighborhood of the File Fingerprints. Conflicts which naturally arise due to plastic distortion and other factors are handled by degrading the score output in block 89 by the Ridge Count Verifier 87. This component utilizes the Image State Map, $Q_{final}$, from the produced Products File 50, 60, particularly those areas on both prints where there are no minutiae. The minutiae captured by the relaxation method are those that are in common on both print images.

On matching images, there are generally a number of unpaired minutiae because one print has poor quality in an area where the other print was clear, or because part of one print was not inked where the other was, etc. In the scoring algorithm, the unpaired minutiae on the search fingerprint are mapped to the file fingerprint using a least mean squares to refine the fit, or by simple rotation. If the unpaired minutiae from the search fingerprint maps to an area of the file fingerprint known to have no minutiae, subtract one from the score. Similarly, the unpaired minutiae from the file print is mapped to the search fingerprint and the score is adjusted as required. Section B-4 of Appendix B provides the detail of this algorithmic process.

FINAL SCORER 89

Scoring occurs throughout processing of a fingerprint in both the Coarse Matcher 81 and the File Matcher 82, but the score is finalized at the end of the process in the scoring block 89 of FIG. 42. A final score is derived using the score outputs of both matchers 81 and 82, using the scoring method of algorithm B-5 of Appendix B. The scores from each matcher element are statistically combined to take advantage of the fact that scores from either matcher 81 or 82 are mathematically orthogonal.

The coefficients necessary for statistical combination such as to take maximum advantage of the orthogonal properties are obtained by analyzing the scores from both the Coarse Matcher 81 and the Fine Matcher 82 across a population of fingerprints (such as NIST9) for known "matched" pairings and for known "unmatched." A distribution of scores is obtained for matched and unmatched condition for both the Coarse Matcher and the Final Matcher. The two score distributions are plotted with abscissa of each being the Coarse Matcher score and the ordinate the Fine Matcher score. Distribution plots on the match and non-match coordinate systems may overlap at points. Proper statistical combination will minimize the overlap, i.e., maximize the score separation between match and non-match for the final combined score. The coefficients that achieve minimum overlap will be different for latents than for ten-print cards, so a limited set of maximizing coefficients would be determined and stored for appropriate application in scoring the particular kinds of fingerprints being compared.

Appendices A (relating to the Encoder 30) and B (relating to the Matcher 80) lists the Algothrims mentioned in the specification are contained in a microfiche attached to this application. These computer algothrims are described as a combination of mathematical symbolic expressions and computer pseudocode.

While the form of apparatus herein described constitutes a preferred embodiment of this invention, it is to be understood that the invention is not limited to this precise form of apparatus and that changes may be made therein without departing from the scope of the invention, which is defined in the appended claims.

TABLE 1

| FEATURE | BITS PER ENTRY | ENTRIES PER FINGER | TOTAL BITS |
|---|---|---|---|
| A. Time Stamps (per card) | | | |
| 1. Date Added | 32 | N/A | 32 |
| 2. Last Update | 32 | " | 32 |
| B. Descriptors (per card) | | | |
| 1. FBI # (ten-print) Case # (latent) 80 | 1 | N/A | |
| a. Contributor ID | 400 | " | 400 |
| b. Geographical Area (1 per state) | 50 | " | 50 |
| c. Year of Birth (min/max range) | 16 | " | 16 |
| d. Eye Color | 4 | " | 4 |
| e. Hair Color | 4 | " | 4 |
| f. Height (min/max range) | 16 | " | 16 |
| g. Race | 3 | " | 3 |
| h. Sex | 3 | " | 3 |
| i. Weight (min/max range) | 16 | " | 16 |
| j. Type of Crime (personal, property, both) | 2 | " | 2 |
| C. Macro Features | | | |
| 1. Miscellaneous | | | |
| a. Pattern Class (1 per class) | 15 | 1 | 150 |
| b. Average Print Quality | 2 | 1 | 20 |
| c. Dominant Mode Ridge Frequency | 7 | 1 | 70 |
| d. Feature Area Count | 10 | 1 | 100 |
| e. Possible Finger Number(s) for latents | 10 | 1 | 100 |
| 2. Feature List, Cores & Deltas Up to 3 each, Cores in List First | | | |
| a. XPOS | 16 | 6 | 960 |
| b. YPOS | 16 | 6 | 960 |
| c. TYPE | 2 | 16 | 120 |
| d. CD Quality | 2 | 6 | 120 |
| e. NASSOC | 3 | 6 | 180 |
| f. ASSOC_1 | 3 | 6 | 180 |
| g. RDGCNT_1 | 6 | 6 | 360 |
| h. ASOC_2 | 3 | 6 | 180 |
| i. RDGCNT_2 | 6 | 6 | 360 |
| j. ASSOC_3 | 3 | 6 | 180 |
| k. RDGCNT_3 | 6 | 6 | 360 |
| l. ASSOC_4 | 3 | 6 | 180 |
| m. RDGCNT_4 | 3 | 6 | 180 |
| n. ASSOC_5 | 6 | 6 | 360 |
| o. RDGCRT_5 | 3 | 6 | 180 |
| p. DIVIRGENCE | 16 | 6 | 960 |
| q. CURL | 16 | 6 | 960 |
| r. GRADIENT | 16 | 6 | 960 |
| s. CONFIDENCE | 16 | 6 | 960 |
| t. Average Local IMAGE Quality | 16 | 6 | 960 |
| D. Coarse Maps | | | |
| 1. $\Theta_{final}$ Ridge Angle | 7 | 400 | 28000 |
| 2. $\Omega_{final}$ Ridge Frequency | 7 | 400 | 28000 |
| 3. $Q_{final}$ Final Quality (Image State) | 2 | 1600 | 32000 |
| E. Minutia Data | | | |
| 1. X | 16 | 150 | 24000 |
| 2. Y | 16 | 150 | 24000 |
| 3. θ | 8 | 150 | 12000 |
| 4. Minutia Quality | 8 | 150 | 12000 |
| 5. $n_{found}$ | 8 | 1 | 80 |

TABLE 2

| FUNCTION | INPUT | OUTPUT |
|---|---|---|
| 1. Enhance image | $I_{FS}$ | $I_{FSCE}$ |
| 2. Down sample image | $I_{FSCE}$ | $I_{DSCE}$ |
| 3. Create Ridge Angle and Quality Maps | $I_{DSCE}$ | $\Theta_{raw}, Q_{raw}$ |
| 4. Smooth Ridge Angle and Quality Maps | $\Theta_{raw}, Q_{raw}$ | $\Theta_{smooth}, Q_{smooth}$ |
| 5. Create, Ridge Frequency Map | $I_{DSCE}$ $\Theta_{smooth}, Q_{smooth}$ | $\Omega_{raw}$ |
| 6. Smooth Ridge Frequency Map | $\Omega_{raw}, \Theta_{smooth}$ | $\Omega_{smooth}$ |
| 7. Apply Gabor and Minutia filters | $I_{FSCE}$ $\Theta_{smooth}, \Omega_{smooth}$ | $f_G, f_M$ |
| 8. Detect minutiae & form Final Quality Map | $f_G, f_M, Q_{smooth}$, $\Theta_{smooth}, \Omega_{smooth}$ | $M_{final}, n_{found}$, $Q_{final}$ |
| 9. Locate Cores and Deltas | $Q_{final}, \Theta_{smooth}$ | $\Delta_{CD}, n_{CD}$ |
| 10. Associate Cores & Deltas and compute Ridge Counts | $Q_{final}, \Theta_{smooth}$, $\Omega_{smooth}, \Delta_{CD}, n_{CD}$ | $\Delta_{final}, n_{final}$ |
| 11. Prepare Products File | See FIGS. 39, 40, 41 | Table 1 Items: C.1.b, C.1.c, C.1.d C.2 = $\Delta_{final}, n_{final}$ D = $\Theta_{final}$, $\Omega_{final}, Q_{final}$ E = $M_{final}, n_{found}$ |

TABLE 3

| ITEM # | SYMBOL | DEFINITION |
|---|---|---|
| 1 | R | the set of real numbers |
| 2 | C | the set of complex numbers |
| 3 | $R^{n \times m}$ | a matrix whose elements are real valued and that has n rows and m columns |
| 4 | $C^{n \times m}$ | a matrix whose elements are complex valued and that has n rows and m columns |
| 5 | Re(z) | the real part of z $\in$ C |
| 6 | Im(z) | the imaginary part of z $\in$ C |
| 7 | sgn(x) | signum function: x $\in$ R, sgn(x) = 0 if x = 0, sgn(x) = 1 if x > 0, and sgn(x) = −1 if x < 0. |
| 8 | $n_{row}$ | number of rows in the full sized gray scale image |
| 9 | $n_{col}$ | number of columns in the full sized gray scale image |
| 10 | $I_{FS}$ | $R^{n_{row} \times n_{col}}$ matrix that is the full sized scale image, where 1" is 512 pixels (512 by 512 element matrix) |
| 11 | $I_{FSCE}$ | $R^{n_{row} \times n_{col}}$ matrix of full sized contrast enhanced image |
| 12 | $I_{DSCE}$ | $R^{\frac{n_{row}}{2} \times \frac{n_{col}}{2}}$ matrix of down sampled, contrast enhanced image |
| 13 | $\Theta_{raw}$ | $R^{\frac{n_{row}}{2} \times \frac{n_{col}}{2}}$ matrix of measured, i.e., raw or unsmoothed ridge angles |
| 14 | $Q_{raw}$ | $R^{\frac{n_{row}}{2} \times \frac{n_{col}}{2}}$ matrix of measured image quality values |
| 15 | $\Theta_{smooth}$ | $R^{\frac{n_{row}}{2} \times \frac{n_{col}}{2}}$ matrix of smoothed ridge angles (256 by 256 elements) |

TABLE 3-continued

| ITEM # | SYMBOL | DEFINITION |
|---|---|---|
| 16 | $Q_{smooth}$ | $R^{\frac{nrow}{2} \times \frac{ncol}{2}}$ matrix of smoothed image quality values |
| 17 | $Q_{coarse}$ | $R^{\frac{nrow}{16} \times \frac{ncol}{16}}$ intermediate, temporary matrix used to formulate Products File elements |
| 18 | $\Omega_{raw}$ | $R^{\frac{nrow}{2} \times \frac{ncol}{2}}$ matrix of measured ridge frequency |
| 19 | $\Omega_{smooth}$ | $R^{\frac{nrow}{2} \times \frac{ncol}{2}}$ matrix of smoothed ridge frequency |
| 20 | $f_G$ | $C^{\frac{nrow}{2} \times \frac{ncol}{2}}$ matrix of Gabor filter values |
| 21 | $f_M$ | $C^{\frac{nrow}{2} \times \frac{ncol}{2}}$ matrix of minutiae filter values |
| 22 | $\Re$ | the ratio of Minutiae Filter output over Gabor Filter output |
| 23 | $\Gamma$ | Gradient Map matrix named "grmap" of fingerprint image |
| 24 | $\Delta$ | Matrix named "Feature" with data structure containing Core and Delta feature data |
| 25 | $\Delta_{empty}$ | Initial empty state of $\Delta$ |
| 26 | $\Delta_{feat}$ | State of $\Delta$ after Step 1, all potential features identified |
| 27 | $n_{feat}$ | Total number of potential features contained in $\Delta_{feat}$ |
| 28 | $\Delta_{CD}$ | State of $\Delta$ after Step 2, all Cores, Deltas, and Unknowns identified |
| 29 | $n_{CD}$ | Total number of entries contained in $\Delta_{CD}$ |
| 30 | $\Delta_{final}$ | State of $\Delta$ after Step 3, contains all high confidence Cores & Deltas kept (max of 3 each) |
| 31 | $n_{final}$ | Total number of Cores & Deltas contained in $\Delta_{final}$ |
| 32 | $Q_{final}$ | $R^{\frac{nrow}{16} \times \frac{ncol}{16}}$<br><br>A matrix referred to as Final Quality Map which contains image quality data obtained from $Q_{smooth}$. In addition to quality this map contains minutiae knowledge data for the image. It can be thought of as an Image State matrix, a map representation of the image that identifies three image states:<br>    a. Areas of good quality containing minutiae<br>    b. Areas of good quality containing no minutiae<br>    c. Areas of poor quality (for which there may or may not be detected and recorded minutiae), or areas of high quality where minutiae below acceptable threshold have been detected<br>1 cell = $6^2$ pixels in full scale image, this is a coarser map (32 by 32 elements) than $\Theta_{smooth}, \Omega_{smooth}, Q_{smooth}$ |
| 33 | $M_{final}$ | $R^{150\ rows \times 4\ cols}$ matrix of final minutiae list, columns = x, y, $\theta$, Minutia Quality |
| 34 | $n_{found}$ | Number of Minutiae found and entered in list $M_{final}$ |
| 35 | $\Delta_{final}$ | List of Core & Deltas and associated data, Items C.2 in Table 1 |
| 36 | $n_{final}$ | Number of Cores & Deltas detected and in final list |
| 37 | $\Theta_{final}$ | $R^{\frac{nrow}{32} \times \frac{ncol}{32}}$ matrix referred to as Coarse Ridge Angle Map,<br><br>1 cell = $32^2$ pixels in the full scale image. This is a much coarser map (16 by 16 elements) than $\Theta_{smooth}, \Omega_{smooth}, Q_{smooth}$ |
| 38 | $\Omega_{final}$ | $R^{\frac{nrow}{32} \times \frac{ncol}{32}}$ matrix referred to as Coarse Ridge Frequency Map,<br><br>1 cell = $32^2$ pixels in the full scale image. This is a much coarser map (16 by 16 elements) than $\Theta_{smooth}, \Omega_{smooth}, Q_{smooth}$ |

TABLE 4

| Column # | Matrix Element Name in Δ | Description |
| --- | --- | --- |
| 1 | IDX | Index number assigned to feature (row number in matrix) |
| 2 | XPOS | Horizontal position of feature within the fingerprint image |
| 3 | YPOS | Vertical position of feature within the fingerprint image |
| 4 | TYPE | Type feature is (Loop Core, Whorl Core, Delta, or Unknown) |
| 5 | CONFIDENCE | Feature confidence measure of feature determination |
| 6 | CONDITION | Condition number for DEOP matrix A (2 × 2 linear coefficient matrix) representing vector field about the feature |
| 7 | DIVERGENCE | Divergence measured for the DEOP vector field about the feature |
| 9 | CURL | Curl measured for the DEOP vector field about the feature |
| 9 | GRADIENT | Maximum gradient value related to the feature location |
| 10 | QUALITY | Average quality in a FEAT_SIZE by FEAT_SIZE region about the feature point |
| 11 | ASSOC_1 | IDX entry of associated feature number 1 |
| 12 | ASSOC_2 | IDX entry of associated feature number 2 |
| 13 | ASSOC_3 | IDX entry of associated feature number 3 |
| 14 | ASSOC_4 | IDX entry of associated feature number 4 |
| 15 | ASSOC_5 | IDX entry of associated feature number 5 |
| 16 | RDGCNT_1 | Ridge count to feature identified by ASSOC_1 |
| 17 | RDGCNT_2 | Ridge count to feature identified by ASSOC_2 |
| 18 | RDGCNT_3 | Ridge count to feature identified by ASSOC_3 |
| 19 | RDGCNT_4 | Ridge count to feature identified by ASSOC_4 |
| 20 | RDGCNT_5 | Ridge count to feature identified by ASSOC_5 |
| 21 | PIXCNT_1 | Pixel distance to feature identified by ASSOC_1 |
| 22 | PIXCNT_2 | Pixel distance to feature identified by ASSOC_2 |
| 23 | PIXCNT_3 | Pixel distance to feature identified by ASSOC_3 |
| 24 | PIXCNT_4 | Pixel distance to feature identified by ASSOC_4 |
| 25 | PIXCNT_5 | Pixel distance to feature identified by ASSOC_5 |
| 26 | N_ASSOC | Number of associations to feature (# of ASSOC columns filled) |

TABLE 5

| Algorithm # | Name | Textbook Function Performed |
| --- | --- | --- |
| 31 | x_4by4_inv | Returns Inverse of input matrix, up to 4 by 4 |
| 32 | x_4by4_eig | Returns eigenvector associated with the minimum eigenvalue of the input matrix, up to 4 by 4 |
| 34 | x_2by2_cond | Returns condition number of input matrix, up to 2 by 2 |
| 35 | x_3by3_det | Returns determinant of input matrix, up to 3 by 3 |
| 40 | angle_interp2d | Returns angle value interpolated 2 dimensionally |
| 41 | interp2d | Returns value interpolated 2 dimensionally |

What is claimed is:

1. A method of detecting minutia in a fingerprint image comprising the steps of scanning a gray scale image of a fingerprint, determining the direction of fingerprint ridges at multiple, spaced apart locations within the fingerprint, determining the spacing of fingerprint ridges at said multiple, spaced apart locations, orienting a pair of filters over each of said multiple locations by reference to said ridge direction at each of said locations, adjusting the area of said filters by reference to the spacing of said ridges at each of said locations whereby said filter observes a predetermined number of ridges, one of said filters having a high level output when observing parallel fingerprint ridge flow and a low output when the ridge flow in not parallel, the other of said filters having a low level output when observing parallel fingerprint ridge flow and a high output when the ridge flow is not parallel, monitoring the outputs of said filters at each of said locations, locating a minutia by reference to simultaneous changes in the outputs of both filters, and recording those locations indicating non-parallel ridges as an indication of a minutia.

2. The method of claim 1 further comprising the step of determining the ratio of magnitude of the output of one filter relative to the other filter as an indication of the presence of a minutia.

3. The method of claim 1 wherein one of said filters is a Gabor Filter and the other of said filters is a Minutia filter.

4. The method of claim 1 further including the steps of determining the quality of the image at each location, identifying areas of good quality containing minutiae, separately identifying areas of good quality without minutiae, and identifying areas that are either poor quality or indeterminant as to the presence of minutia.

5. A method of detecting and recording the location of minutia in a fingerprint image comprising the steps of scanning a gray scale image of a fingerprint, determining the direction of fingerprint ridges at multiple, spaced apart locations within the fingerprint, determining the spacing of fingerprint ridges at said multiple, spaced apart locations, orienting a filter over each of said multiple locations by reference to said ridge direction at each of said locations, adjusting the area of said filter by reference to the spacing of said ridges at each of said locations whereby said filter observes a predetermined number of ridges, said filter having an output level which is a function of relative angle of ridges adjacent the location being observed, and recording those locations indicating non-parallel ridges as an indication of minutia.

6. Apparatus for locating minutiae contained in a fingerprint image comprising means for determining the direction of fingerprint ridges at multiple locations, means for determining the spacing of said fingerprint ridges at each of said multiple locations, means responsive to said direction determining means and said spacing determining means for detecting a phase discontinuity in the ridge flow of the fingerprint image at each of said multiple locations, wherein said means for determining the phase discontinuity in the ridge flow of fingerprint image, which indicates a ridge ending or bifurcation, comprises a Gabor filter having a high level output when observing parallel fingerprint ridge flow and a low output when the ridge flow is not parallel, a Minutiae Filter having a low level output when observing parallel fingerprint ridge flow and a high output when the ridge flow is not parallel, means responsive to said direction determining means for aligning said Gabor Filter and said Minutiae Filter with the fingerprint at each of said multiple locations, means responsive to said spacing determining means for adjusting the size of said Gabor Filter and said Minutiae Filter calculation kernel to view a predetermined number of fingerprint ridges, and means for determining the ratio of the outputs of said filters as they are aligned at each of said multiple locations to identify minutiae, and means for recording the location of said phase discontinuities.

7. A method for creating and recording for future use an image state map containing image quality and areas of minutiae locations of a fingerprint image comprising the steps of converting a fingerprint image into a digitized gray scale image comprising a plurality of individual pixels, determining the quality of the fingerprint image at regularly spaced individual pixels, determining the quality of minutiae located on said fingerprint image, determining the location of minutiae within said fingerprint image, recording on said state map those areas where no minutiae are detected, identifying on said state map those areas where minutiae are present, and recording on said state map those areas where the quality of the image is too poor to reliably determine the presence or absence of minutiae or where minutiae were detected having a quality value below a predetermined value.

8. A method of determining the location of core and delta features in an image of a fingerprint comprising the steps of scanning a gray scale image of a fingerprint, measuring and mapping ridge angle and ridge frequency and associated image quality, computing a gradient map, finding and rank ordering gradient features and measuring and recording associated image quality, and applying vector field mathematics of Direct Estimation of Orientated Patterns to said gradient map to determine core and delta type to each gradient feature.

9. The method of claim 8 further including the step of detecting an associated pair of deltas and cores, or cores and cores, by tracing a path of constant value ridge angle between said deltas and cores, or cores and cores.

10. The method of claim 9 further including the step of determining the ridge count between associated cores and deltas.

11. The method of claim 10 wherein the step of determining ridge count includes the step of calculating the line integral of the vector ridge frequency along a straight line from one feature to another.

12. Apparatus for recording in machine readable form the existence and location of cores and deltas in an image of a fingerprint, said apparatus including means for converting a fingerprint image into a digitized gray scale image comprising a plurality of individual pixels, means for determining the ridge angle and quality of the fingerprint image at regularly spaced individual pixels to create a Ridge Angle Map and an image quality map, means for computing the gradients of said Ridge Angle Map to derive the location of possible cores and deltas, means for sorting the gradients according to size, means for creating a vector field representation of said fingerprint image, means for detecting and measuring the curling of said vector field, and means responsive to said detecting means for identifying cores and deltas.

13. The apparatus of claim 12 further comprising means for detecting an associated pair of deltas and cores, or cores and cores, by tracing a path of constant value ridge angle between said deltas and cores, or cores and cores.

14. The apparatus of claim 13 further including means for calculating the number of fingerprint ridges between associated deltas and cores.

15. The apparatus of claim 14 wherein said means for calculating the number of fingerprint ridges includes means for calculating the line integral of the vector frequency along a straight line from a delta to an associated core.

* * * * *